United States Patent [19]
Tabuchi

[11] Patent Number: 6,112,002
[45] Date of Patent: Aug. 29, 2000

[54] OPTICAL COUPLER OPTICALLY COUPLING A LIGHT BEAM OF A SEMICONDUCTOR LASER SOURCE WITH A SINGLE MODE OPTICAL WAVEGUIDE OR FIBER

[75] Inventor: Haruhiko Tabuchi, Sagamihara, Japan

[73] Assignee: Fujitsu Limited, Kawasaki, Japan

[21] Appl. No.: 09/075,834

[22] Filed: May 12, 1998

Related U.S. Application Data

[63] Continuation-in-part of application No. 08/979,667, Nov. 26, 1997.

[30] Foreign Application Priority Data

Nov. 29, 1996 [JP] Japan ..................................... 8-319314

[51] Int. Cl.⁷ ...................................................... G02B 6/26
[52] U.S. Cl. ................................ 385/50; 385/49; 385/52; 385/124; 385/130; 385/143; 385/145
[58] Field of Search ........................... 385/50, 52, 88–94, 385/49, 122–126, 129–132, 141–147

[56] References Cited

U.S. PATENT DOCUMENTS

| 5,857,049 | 1/1999 | Beranek et al. | 385/91 |
| 5,909,524 | 6/1999 | Tabuchi | 385/49 |

*Primary Examiner*—Phan T. H. Palmer
*Attorney, Agent, or Firm*—Staas & Halsey LLP

[57] ABSTRACT

A semiconductor laser and an optical waveguide of an optical coupler, formed on a substrate are optically coupled with each other by aligning their positions horizontally by using a plurality of laser elements and cores for the laser and the waveguide respectively and arranging them in an array respectively so that a difference between their pitches is less than double of tolerance tolerated for optically coupling with each other, the waveguide having partially a composite core composed of: a main core; a sub core surrounding the main core and having a refractive index lower than that of the main core; and a cladding layer surrounding the sub core and having a refractive index lower than that of the sub core.

46 Claims, 62 Drawing Sheets

FIG. 14

| SHIFT AMOUNT | DEVIATION ($\Delta_1 \sim \Delta_{11}$) | | | | | | | | | | |
|---|---|---|---|---|---|---|---|---|---|---|---|
| | $\Delta_1$ | $\Delta_2$ | $\Delta_3$ | $\Delta_4$ | $\Delta_5$ | $\Delta_6$ | $\Delta_7$ | $\Delta_8$ | $\Delta_9$ | $\Delta_{10}$ | $\Delta_{11}$ |
| $-11T_0 \sim -9T_0$ | $\pm T_0$ | $-3T_0 \sim -T_0$ | | | $-9T_0 \sim -7T_0$ | $-11T_0 \sim -9T_0$ | $-13T_0 \sim -11T_0$ | | | | $-21T_0 \sim -19T_0$ |
| $-9T_0 \sim -7T_0$ | $T_0 \sim 3T_0$ | $\pm T_0$ | | | $-7T_0 \sim -5T_0$ | $-9T_0 \sim -7T_0$ | $-11T_0 \sim -9T_0$ | | | | $-19T_0 \sim -17T_0$ |
| $-7T_0 \sim -5T_0$ | $3T_0 \sim 5T_0$ | $T_0 \sim 3T_0$ | $\pm T_0$ | | $-5T_0 \sim -3T_0$ | $-7T_0 \sim -5T_0$ | $-9T_0 \sim -7T_0$ | | | | $-17T_0 \sim -15T_0$ |
| $-5T_0 \sim -3T_0$ | $5T_0 \sim 7T_0$ | $3T_0 \sim 5T_0$ | | $\pm T_0$ | $-3T_0 \sim -T_0$ | $-5T_0 \sim -3T_0$ | $-7T_0 \sim -5T_0$ | | | | $-15T_0 \sim -13T_0$ |
| $-3T_0 \sim -T_0$ | $7T_0 \sim 9T_0$ | $5T_0 \sim 7T_0$ | | | $\pm T_0$ | $-3T_0 \sim -T_0$ | $-5T_0 \sim -3T_0$ | | | | $-13T_0 \sim -11T_0$ |
| $\pm T_0$ | $9T_0 \sim 11T_0$ | $7T_0 \sim 9T_0$ | | | $T \sim 3T_0$ | $\pm T_0$ | $-3T_0 \sim -T_0$ | | | | $-11T_0 \sim -9T_0$ |
| $T_0 \sim 3T_0$ | $11T_0 \sim 13T_0$ | $9T_0 \sim 11T_0$ | | | $3T_0 \sim 5T_0$ | $T_0 \sim 3T_0$ | $\pm T_0$ | | | | $-9T_0 \sim -7T_0$ |
| $3T_0 \sim 5T_0$ | $13T_0 \sim 15T_0$ | $11T_0 \sim 13T_0$ | | | $5T_0 \sim 7T_0$ | $3T_0 \sim 5T_0$ | $T_0 \sim 3T_0$ | $\pm T_0$ | | | $-7T_0 \sim -5T_0$ |
| $5T_0 \sim 7T_0$ | $15T_0 \sim 17T_0$ | $13T_0 \sim 15T_0$ | | | $7T_0 \sim 9T_0$ | $5T_0 \sim 7T_0$ | $3T_0 \sim 5T_0$ | | $\pm T_0$ | | $-5T_0 \sim -3T_0$ |
| $7T_0 \sim 9T_0$ | $17T_0 \sim 19T_0$ | $15T_0 \sim 17T_0$ | | | $9T_0 \sim 11T_0$ | $7T_0 \sim 9T_0$ | $5T_0 \sim 7T_0$ | | | $\pm T_0$ | $-3T_0 \sim -T_0$ |
| $9T_0 \sim 11T_0$ | $19T_0 \sim 21T_0$ | $17T_0 \sim 19T_0$ | | | $11T_0 \sim 13T_0$ | $9T_0 \sim 11T_0$ | $7T_0 \sim 9T_0$ | | | | $\pm T_0$ |

FIG. 46A
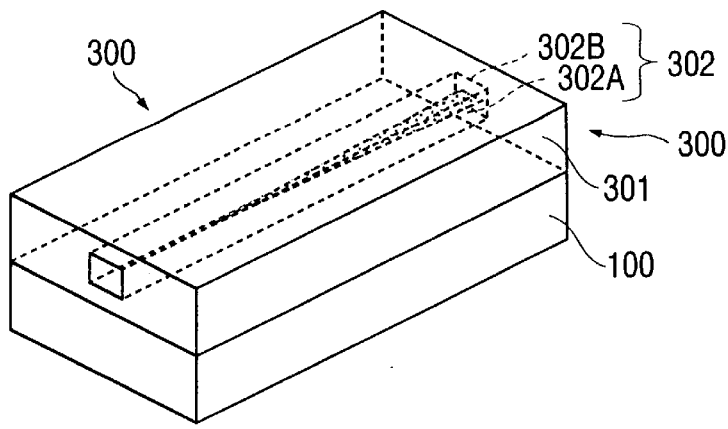
FIG. 46B
FIG. 46C
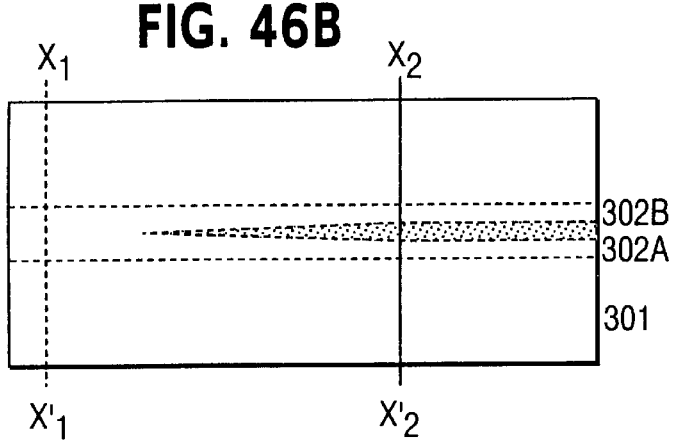
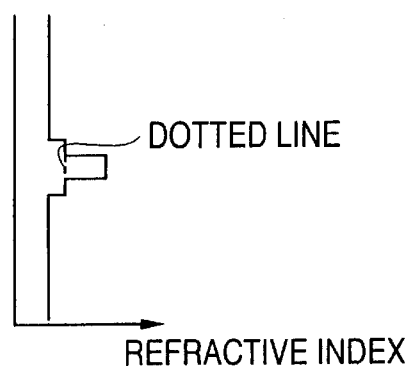
FIG. 46D
FIG. 46E
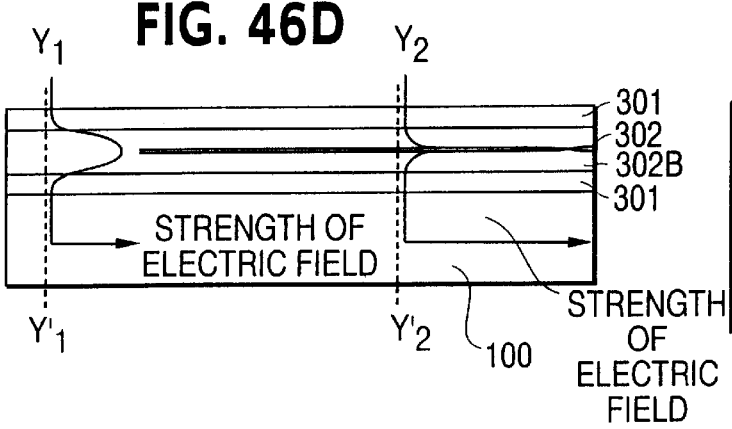
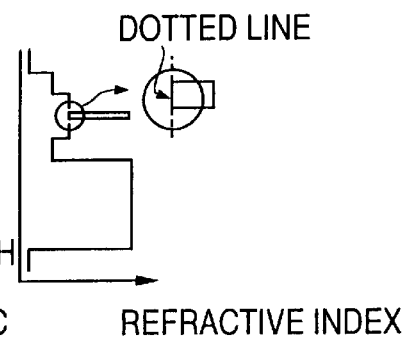

OPTICAL COUPLER OPTICALLY COUPLING A LIGHT BEAM OF A SEMICONDUCTOR LASER SOURCE WITH A SINGLE MODE OPTICAL WAVEGUIDE OR FIBER

The subject application is a continuation-in-part application of application Ser. No. 08/979,667, filed Nov. 26, 1997.

BACKGROUND OF THE INVENTION

1. Field of the Invention

The present invention relates to an optical coupling structure, which will be called simply "optical coupler" hereinafter, used in an optical communication apparatus or an optical information processor. In particular, the present invention relates to an optical coupler for optically coupling a light beam emitting semiconductor device, such as a semiconductor laser, with a single-mode optical waveguide or a single-mode optical fiber.

2. Description of the Related Art

In order to optically couple two pieces of single-mode type optical components to each other at high efficiency, it is required to perform mode matching and optical axis alignment between the two optical components. Herein, the mode matching is to make optical intensity distributions (which is also called "mode size") in the single-mode type optical components equal to each other, and the optical axis alignment is to make optical ales of the optical components coincide with each other. FIGS. 1, 2A, 2B, 3, 4, 5, 6, 7A, 8A, 9A, and 10A are schematic diagrams for showing several methods of the axis alignment in the prior art.

FIG. 1 is a schematic diagram of an optical coupler of the prior art in a case where a light emitting semiconductor device 200 like a semiconductor laser is optically coupled to an optical fiber 3 by using first and second lenses 41 and 42. There will be cases hereinafter where the light emitting semiconductor device 200 is called "semiconductor laser 200" or simply "laser 200". In FIG. 1, the laser 200 and the optical fiber 3 are placed on a center line, or axis, 4 so as to be opposite to and aligned with each other. The first lens 41 gathers light emitted from the laser 200, producing a light beam almost in parallel with the center line 4, and the second lens 42 converges the light beam on the fiber 3, giving a proper size. For example, at an entrance of the fiber 3, a spot size (1.2 μm×1.7 μm~2.1 μm×3.2 μm) of the light beam is magnified 4~6 times by the lens 42, so as to be matched with a mode size (approximately 10 μm) of the fiber 3. As described above, by virtue of the first and second lenses 41 and 42, the mode matching can be performed between the semiconductor laser 200 and the optical fiber 3 at high coupling efficiency.

FIGS. 2A and 2B respectively show a case where a laser 200 is hermetically sealed in a housing, or box, 600, for preventing the laser 200 from being damaged due to moisture and oxidation. In FIGS. 2A and 2B, the same reference numerals as used in FIG. 1 designate the same parts as in FIG. 1. In FIGS. 2A and 2B, the laser 200 is mounted on a sub-mount 603 placed on a mounting block 601, and the laser 200, the sub-mount 603 and the mounting block 601 are installed in the airtight box 600 having an optical window 607. Light emitted from the laser 200 is gathered to form a light beam by the first lens 41 and the light beam arrives at the second lens 42, passing through the optical window 607. The light beam is converged on the optical fiber 3 by the second lens 42, so as to have a size proper to the mode matching. The optical fiber 3 is inserted into a fiber coupling unit 32, supported by a ferrule 31.

FIG. 3 is another optical coupler using a tapered optical fiber having a spherical tip at an end thereof opposite to a semiconductor laser. In FIG. 3, the same reference numerals as in FIG. 1 designate the same device as in FIG. 1. In FIG. 3, an optical fiber 3A is tapered near its end and a tip of the tapered end has small lens structure. When the optical fiber 3A is placed so that the tip is optically coupled to a light emitting active layer 201, which will be simply called "active layer 201" hereinafter, of the laser 200, the mode size of the light beam emitted from the active layer 201 is decreased by the small lens structure so as to coincide with the mode size of' the optical fiber 3A. This results in increasing the coupling efficiency between the laser 200 and the optical fiber 3A.

FIG. 4 shows a case where the laser 200 is sealed in an air-tight box, or housing, 600. In FIG. 4, the same numerals as in FIGS. 1 and 2A designate the same parts as in FIGS. 1 and 2A. In FIG. 4, the surface of the optical fiber 3A is metal-coated (not depicted in FIG. 4) and the optical fiber 3A is fixed to the mounting block 601 with solder 611, in the airtight box 600.

Hereupon, in case of the optical couplers shown in FIGS. 1, 2A and 2B, the position adjustments are precisely performed throughout the laser 200, the lenses 41 and 42 and the optical fiber 3. In case of the optical couplers shown in FIGS. 3 and 4, the position adjustment is precisely performed between the laser 200 and the optical fiber 3A. The position adjustments are performed in FIGS. 1, 2A, 2B, 3 and 4 by actually operating the laser 200 and measuring intensity of the laser light beam, passing through the optical couplers, while carefully changing the relative positions of the semiconductor laser, the lenses and the optical fiber, until the measured light intensity becomes maximum.

In order to avoid performing the careful position adjustment, the position adjustment has been improved in the prior art by several ways as shown in FIGS. 5, 6, 7B, 8A, 9A and 10A.

FIG. 5 is a schematic perspective view for illustrating a typical example of an improved position adjustment in the prior art. In FIG. 5, the same reference numerals as in FIG. 1 designate the same parts as in FIG. 1. In FIG. 5, a V-shaped groove 181, bonding pads and positioning mars are formed on a silicon substrate 180. The bonding pads and the positioning marks on the silicon substrate are not depicted in FIG. 5, but are depicted in FIGS. 11A and 11B with reference numbers 102 and 107 respectively. The V-shaped groove 181 is fabricated on the surface of the silicon substrate 180 in a photo-lithography process, for guiding the optical fiber 3. By virtue of applying the V-shaped groove 181 to an optical coupler 1B, the position adjustment of the optical fiber 3 can be performed smoothly.

Meanwhile, in order to position the laser 200 on the silicon substrate 180, other bonding pads and positioning marks are formed on the laser 200 so as to be connected with the bonding pads 102 and to be corresponded to the positioning marks 107 on the silicon substrate 180 respectively. The positioning marks and the bonding pads on the laser 200 are not depicted in FIG. 5; however, they are similar to the positioning marks 204 and bonding pads 202 shown in FIGS. 11A and 11B. The position adjustment of the laser 200 is carried out by using all alignment apparatus (not depicted in FIG. 5), using a groove 182 formed oil the silicon substrate 180. The alignment apparatus moves the laser 200 so that the positioning marks on the laser 200 coincide precisely with the positioning marks on the silicon substrate 180. After the position adjustment is over, the laser 200 is fixed to the silicon substrate 180 by bonding. The above position adjustment is detailed in IEEE TRANSACTIONS ON COMPONENT, HYBRIDS, AND MANUFACTURING TECHNOLOGY, VOL. 15, NO. 6, pp.944–955 (1992). The optical coupler having the V-shaped groove, positioning marks and bonding pads as shown in FIG. 5 will be numbered "1B" hereinafter.

FIG. 6 shows another optical coupler of the prior art, which is similar to the optical coupler in FIG. 5 except that the optical fiber is a tapered optical fiber 3A. The optical coupler is numbered as "1C" in FIG. 6.

FIGS. 7A and 7B show another optical coupler of the prior art in a case where a semiconductor laser is in an air-tight sealed enclosure. In FIGS. 7A and 7B, the same reference numeral as in FIG. 5 designates the same component or part as in FIG. 5. FIG. 7A shows the optical coupler 1B before being sealed air-tight, and FIG. 7B shows the optical coupler 1B after being sealed air-tight air-tightened].

The optical coupler 1B is sealed air-tight by: placing the optical coupler 1B in a space formed by a protruded frame formed on a substrate 700, providing a notch at a side of the frame 702 for passing the optical fiber 3 therethrough, as shown in FIG. 7A; and applying an epoxy base adhesive on and around the frame 702 and putting a cover 400 on the substrate 700, and air-tight sealing the optical coupler 1B by filling up a gap between the cover 400 and the substrate 700, as shown in FIG. 7B. When the epoxy base adhesive such as a plastic material is used, the air-tight sealing is hard to be realized in the strict sense of the word. However, "air-tight sealing" is used hereinafter in a sense that the laser component can be protected from corrosion due to the moisture or a corrosive gas by the sealing performed by the epoxy base adhesive.

FIGS. 8A and 8B show another optical coupler of the prior art, including a multimode optical waveguide. FIG. 8A is a schematic perspective view of the optical coupler and FIG. 8B is an elevation view of the optical coupler, looked from the left-down side of the optical coupler in FIG. 8A. In FIGS. 8A and 8B, the same reference numerals as in FIG. 1 designate the same parts as in FIG. 1. In FIGS. 8A and 8B, an optical waveguide 300 and four projected objects 300A, which will be called "a stand-off 300A" hereinafter, are formed on a substrate in a two layer structure consisting of a cladding layer and a core for forming the optical waveguide 300. That is, the optical waveguide 300 and the stand-off 300A are formed on the substrate 100 at the same time. The optical waveguide 300 is a multimode waveguide, so that the thickness of the cladding layer 301 is more than 50 $\mu$m. The stand-off 300A is used for settling and positioning the laser 200 on the substrate 100. In order to settle the laser 200 onto the stand-off 300A, a cut off portion is formed at every corner on the down side of the laser 200. The optical waveguide 300 and the stand-off 300A are formed by IC fabrication technology, so that they can be placed precisely in correct position on the substrate 100. Therefore, when the laser 200 is settled to the stand-off 300A, the optical coupling between the optical waveguide 300 and the laser 200 could be performed in high coupling efficiency. However, there is a problem that the laser 200 is hard to be settled in a correct position because the cut off portions 205 are hard to be formed precisely.

FIGS. 9A and 9B show another optical coupler of the prior art, including a different type of single mode optical waveguide 300. FIG. 9A is a schematic perspective view of the optical coupler and FIG. 9B is an elevation view of the optical coupler, looked from the left-down side of the optical coupler in FIG. 9A. In FIGS. 9A and 9B, the same reference numerals as in FIG. 8A designate the same parts as in FIG. 8A. In FIGS. 9A and 9B, the substrate 100 is made of silicon, and the cladding layer 301 and the core 302 are made of quartz. When a single mode optical waveguide is used in the optical coupler as shown in FIGS. 9A and 9B, high optical coupling efficiency can be obtained when the following ratio, called "a relative refractive index difference", is satisfied between the refractive index ($n_1$) of the cladding layer 301 and the refractive index (n2) of the core 302:

$$\{(n_2-n_1)/n1\}\times 100 = 0.3\% \sim 0.75\%,$$

and the size of the core is within 5×5 $\mu$m~8×8 $\mu$m. In FIGS. 9A and 9B, the cladding layer 301 and the core 302 are formed on the silicon substrate 100 so that a thickness (t) of the cladding layer 301 placed between an upper surface of the silicon substrate 100 and a bottom surface of the core 302 becomes more than 30 $\mu$m.

FIGS. 10A and 10B show an optical coupler including the single mode optical waveguide 300, which is the same as in FIGS. 9A and 9B except that a spacer is inserted between the silicon substrate 100 and the laser 200. The spacer 5 is used to raise an optical axis of the laser 200 $\mu$p for making the optical axis of the laser 200 coincide with an optical axis of the optical waveguide 300 consisting of the cladding layer 301 and the core 302.

As described with reference to FIGS. 1 to 10 (A and B), many methods and apparatus have been used for the optical couplers in the prior art, for obtaining good optical coupling between the optical components. However, there have been the following problems in the position adjustment: the alignment apparatus must be used for precisely adjusting the positions of the lens, the semiconductor laser and the optical fiber; the V-shaped groove must be formed on the substrate for firmly positioning the optical fiber; the positioning marks must be formed on the semiconductor laser and the substrate for correctly positioning the semiconductor laser; the stand-off must be formed on the substrate for positioning the semiconductor laser correctly; and the spacer must be formed on the substrate, for achieving the correct coupling between the semiconductor laser and the optical waveguide.

However, besides the above problems, there have been other problems as described below.

In case of the optical couplers shown in FIGS. 1 to 4, the following problems will occur: it takes a lot of time to perform the position adjustment because the position adjustment must be performed individually between the semiconductor laser and the lens, the lens and the optical fiber, and the semiconductor laser and the optical fiber; and the semiconductor laser is apt to be deteriorated or damaged by a faulty operation which could happen during the position adjustment.

In case of the optical couplers shown in FIGS. 5 to 7A and 7B, there is a merit that the semiconductor laser is not required to be operated during the position adjustment, however, there has been a problem that the mechanical position adjustment is not easy to be performed between the semiconductor laser and the optical fiber. In an optical coupler generally, there is a tolerance, called "coupling tolerance", for keeping the coupling efficiency higher than a designated value, such as 80%, of the maximum coupling efficiency. When an optical fiber has a lens structure, as in the case of the optical fiber 3A in FIG. 6, the coupling tolerance is required to be less than 0.5 $\mu$m, and when a tip of an optical fiber is flat as in the case of the optical fiber 3 in FIG. 5, the coupling tolerance is required to be less than 1 μm. From the above, it can be said that the position adjustment is not easily performed mechanically. In particular, when the laser 200 is bonded on the substrate 180 as shown in FIGS. 5 and 6, it is not easy to perform the optical coupling between the optical fiber 3 (or 3A) and the laser 200 with a desirable coupling tolerance. In case of FIG. 5, there has been another problem that the mode mismatching increases between the laser 200 and the optical fiber 3, resulting in increasing the coupling loss as much as 7 dB at least.

In case of the optical coupler shown in FIGS. 8A and 8B, there has been a problem that the cut off portions 205 are not easy to be formed with high accuracy, which produces a problem of decreasing the coupling efficiency.

In case of the optical coupler shown in FIGS. 9A and 9B, there has been a problem as described below.

When the optical waveguide 300 is applied to the optical coupler as shown in FIGS. 9A and 9B, and when high refractive index material such as silicon is used as the substrate 100, the cladding layer 301 formed under the core 302 is required to have a proper thickness for decreasing light arriving at the substrate 100 from the core 302. For example, when the relative refractive index difference is 0.3%~0.75% and the size of the core 302 is 5 μm×5 μm–8 μm×8 μm, the thickness of the cladding layer 301 under the core 302 must be more than 30 μm, as described with reference to FIG. 9B. This criterion is adopted also to the optical waveguide 300 in FIGS. 8A and 8B. However, in case of coupling the optical waveguide with the semiconductor laser as shown in FIGS. 8A and 8B or 9A and 9B, there is a problem that it is not easy to make the height of the optical axis of the optical waveguide coincide with the height of the semiconductor laser.

In order to explain the above difficulty, a bonding method applied to the semiconductor laser will be described with reference to FIGS. 11A and 11B, and the constituents and the dimensions of the substrate and the semiconductor laser flip-chip bonded on the substrate through the bonding pads and the height of the optical axis of the semiconductor laser will be discussed concretely with reference to FIGS. 12A and 12B.

FIG. 11A is a schematic perspective view for illustrating that the laser 200 in FIG. 9A is ready to be mounted on a substrate, and FIG. 11B is a schematic elevation view of the laser 200 mounted on the substrate 100. As shown in FIG. 11A, the bonding pads 202 are formed on the underside of the laser 200 as electrodes and a solder bump 203 for bonding is coated on each of the bonding pads 202. The solder bump 203 is formed of a metal having a low melting point such as solder. The laser 200 is bonded to the substrate 100, by setting the bonding pads 202 on the bonding pads 102 formed on the substrate 100 as electrodes with the insertion of solder bumps 203 therebetween. Then, the laser 200 is bonded to the substrate 100 as shown in FIG. 11B, through the process of heating and cooling the bonding pads 202 and 102 with the solder bump 203.

FIGS. 12A and 12B illustrate minute layer structure of the laser 200 and the silicon substrate 100 described with reference to FIGS. 11A and 11B, respectively. In FIGS. 12A and 12B, the same reference numerals as in FIGS. 11 and 11B designate the same parts as in FIGS. 11A and 11B. In FIGS. 12A and 12B, a wiring pattern connected with the bonding pads 102 is 0.3 μm, an insulation layer is 0.3 μm, the bonding pad 102 is 0.35 μm, the solder bump 203 is 2~6 μm, the bonding pad 202 is 0.5 μm, an insulation film 26 is 0.3 μm, a cladding layer 231 is 1.5 μm, and the active layer 201 is 0.14 μm, respectively, in thickness. In the above layer structure, when the laser 200 shown in FIG. 12A is bonded with the silicon substrate 100 shown in FIG. 12B, the height from the upper surface of the silicon dioxide film 101, which will be called "silicon dioxide film or layer 101" hereinafter, on the silicon substrate 100 to the center of the active layer 201 is 5.32~9.32 μm. The above height is nothing but a height of the optical axis of the laser 200, which teaches that the height of the optical axis is too low in comparison with the height of the center of the core 302 in FIG. 9A or 9B. In other words, when the laser 200 and the optical waveguide 300 are directly mounted on the substrate 100 as shown in FIG. 9A, a problem occurs that it is very hard to make the optical axes of the laser 200 coincide with the core 302 of the optical waveguide 300.

In order to make the height of the optical axis of the laser 200 coincide with the height of the core 302, the spacer 5 is inserted between the laser 200 and the substrate 100 as shown in FIG. 10A. However, the insertion of the spacer 5 may produce a positional deviation between the optical axes of the laser 200 and the core 302 because of fabrication errors in the spacer 5 and the optical waveguide 300 having the core 302. The amount of the fabrication error depends on the height of the optical axis of the core 302 and the thickness of the spacer 5. For example, if the respective fabrication errors in the core 302 and the spacer 5 are ±5%, and when the height of the optical axis of the core 302 is 30 μm, the respective fabrication errors become ±1.5 μm, which results in producing a total positional deviation of ±3 μm between the laser 200 and the core 302. This positional deviation of ±3 μm is too large for the required optical coupling. The above explanation is as an example; however, these amounts of the fabrication errors are frequently produced, so that there is also a problem that it is hard to obtain required coupling efficiency when the spacer is inserted between the semiconductor laser and the substrate.

SUMMARY OF THE PRESENT INVENTION

Therefore, the objects of the present invention are to solve the prior art problems occurring between the semiconductor laser and the optical waveguide in the optical coupler and between the optical coupler and the optical fiber to be connected with the optical coupler.

An object of the present invention is to solve a problem that when the position adjustment is performed between the semiconductor laser and the core of the optical waveguide very precisely, it takes a lot of time.

Another object of the present invention is to solve another problem that the operating laser may be damaged due to an erroneous operation on the axis alignment between the operating laser and the optical waveguide.

Another object of the present invention is to make the mode size of the optical waveguide equal to the mode size of the semiconductor laser.

Another object of the present invention is to solve the problem that the position adjustment of the optical waveguide becomes hard to be performed due to the small alignment tolerance when the mode size of the optical waveguide is made equal to the mode size of the semiconductor laser, wherein the mode size means a mode width of the guided mode of the waveguide or a spot size of the guided mode of the waveguide.

Still another object of the present invention is to solve another problem that when the axis alignment between the semiconductor laser and the optical waveguide is performed, the axis alignment is very hard to be performed in high precision, because the height of the active layer of the semiconductor laser is different from the height of the core of the optical waveguide, each as measured from the substrate.

Another object of the present invention is to make the optical coupling between the optical coupler and the optical fiber easy A further object of the present invention is to increase a production yield and decrease the production cost of the optical coupler, by reducing personnel production expenses and increasing work efficiency.

In the optical coupler, the position adjustment or the optical axis alignment of the semiconductor laser and the optical waveguide is separated into two phases, one of which is to perform the adjustment or the alignment in a horizontal direction and the other of which is to perform same in a vertical direction, wherein the horizontal direction is a direction perpendicular to the optical axes of the semiconductor laser and the optical waveguide and on a plane parallel to the upper surface of the substrate for mounting the semiconductor laser and the optical waveguide, and the vertical direction is a direction perpendicular to the plane.

In order to perform the horizontal alignment easily, respective pluralities of laser elements of the semiconductor laser and cores of the optical waveguide are arranged to form corresponding ones of arrays, such that the laser elements are arranged with a pitch equal to or less than two times the coupling tolerance between the laser element and the core. By virtue of so arranging the optical elements, it becomes easy to perform the axis alignment. That is, in order to select a pair of the laser element and the core optically coupled with each other at the highest coupling efficiency, it is only enough to actuate the laser elements and measure the light emitted from each one of the laser elements and passing through the cores optically connected with the laser elements. Since the array of the cores is treated in the axis alignment, a rotation error due to a rotation of the core on the plane parallel to the upper surface of the substrate can be also decreased. Incidentally, the rotation error has been very hard to be detected and removed in the prior art. The arrays of the semiconductor laser and the optical waveguides are used, however, the number of these elements does not affect the production cost. In the integration technology, the number of elements does not affect the cost so much.

In order to make a mode size of the semiconductor laser coincide with a mode size of the waveguide, the present invention provides an optical waveguide having a function to change its mode size, the mode size meaning a mode width or a spot size of a guided mode of the waveguide. By virtue of adopting such an optical waveguide to the optical coupler, the mode size can be decreased so as to coincide with that of the semiconductor laser. However, when the mode size becomes small, the optical coupling becomes hard to be performed because of small alignment tolerance. In order to solve the problem, the respective pluralities of laser elements of the semiconductor laser and corresponding cores of the optical waveguide are arranged in an array and the arrayed laser elements and the cores are placed so as to be opposite to each other. The respective pitches of the arrays of the laser elements and the cores are set so as to be slightly different from each other. This method may be called "vernier type aligning method". That is, one can assume the array of the laser elements corresponds to the regular scale of a caliper and the array of the cores corresponds to the vernier scale of the caliper. In a caliper, there are positional deviations between respective corresponding graduations of the regular scale and the vernier scale, in general; however, one of the graduations of the regular scale will coincide almost exactly with the corresponding one of the graduations of the vernier scale. The same as the caliper, at least one of the optical element pairs of semiconductor lasers and cores of the optical waveguides will be coupled with each other at very high coupling efficiency, and the selection of the pair can performed quickly, and without wasting time.

In order to make the mode size of the waveguide coincide with the mode size of the semiconductor laser and the waveguide have the function to change its mode size, a composite core consisting of a main core and a sub core is applied to the waveguide. The main core, the sub core or both the main core and sub core has a portion at which the area size, or shape, changes as the place changes. The mode size of the light beam confined and traveling in the waveguide changes with the change of the area size or shape of the waveguide. By acquiring the function of mode size conversion, the mode size of the waveguide can be made equal to both the mode size of the semiconductor laser and the mode size of the optical fiber even though a difference between the mode size of the semiconductor laser and that of the optical fiber is large.

In order to perform the vertical alignment easily, two methods are presented in this invention. The first method is to make the height of the center of the waveguide core, from a disposed position of the semiconductor laser, small. The height of the center of the waveguide core from the disposed position of the semiconductor laser is called "axis level" hereinafter. By introducing a buffer layer having a low refractive index, the total thickness of layers required to compose the waveguide is decreased, making the axis level small. The method to bond the semiconductor laser on a buffer layer is also presented in this invention as the method to decrease the relative height of the axis level. The second method is combination of the following two operations: a first operation for mounting the waveguide and semiconductor laser on individual substrates, respectively; and a second operation for adjusting the relative heights of the two substrates.

In order to make the optical coupling between the waveguide and the optical fiber easy, an waveguide having a bent part is installed in the optical coupler. The respective pluralities of the optical elements in the semiconductor laser array and the waveguide array are disposed with respective pitches less than 125 $\mu$m. Small pitch is suitable for making a small device. But the usual optical fiber is 125 $\mu$m in diameter. Therefore, a waveguide having a bent part is installed for making the waveguide element pitch larger than 125 $\mu$m. Wherein, in order to make the radius of curvature of the bent part small, the waveguide comprises a composite core consisting of a main core and a sub core installed therein. Furthermore, a waveguide including a core having a large width is also installed at the bent part, in the optical coupler.

BRIEF DESCRIPTION OF THE DRAWINGS

FIG. 14 is a table of deviations between the cores and the respective laser elements shown in FIG. 13;

FIG. 46A is a schematic perspective view of an optical waveguide including a main core of a tapered shape and a sub core, in accordance with a thirtieth preferred embodiment of the present invention;

FIG. 46B is a top plan view of the optical waveguide in FIG. 46A;

FIG. 46C is a graph for showing the refractive index distributions in the cross sections of the waveguide shown in FIG. 46B;

FIG. 46D is a slab structure of layers and electric field strength distributions appearing across the slab structure shown in FIG. 46A, at two different points on the optical axis where the main core is included and not included, respectively, and;

FIG. 46E is a graph for showing refractive index distribution appearing across the points shown in FIG. 46D;

DESCRIPTION OF THE PREFERRED EMBODIMENT

Figure 13:
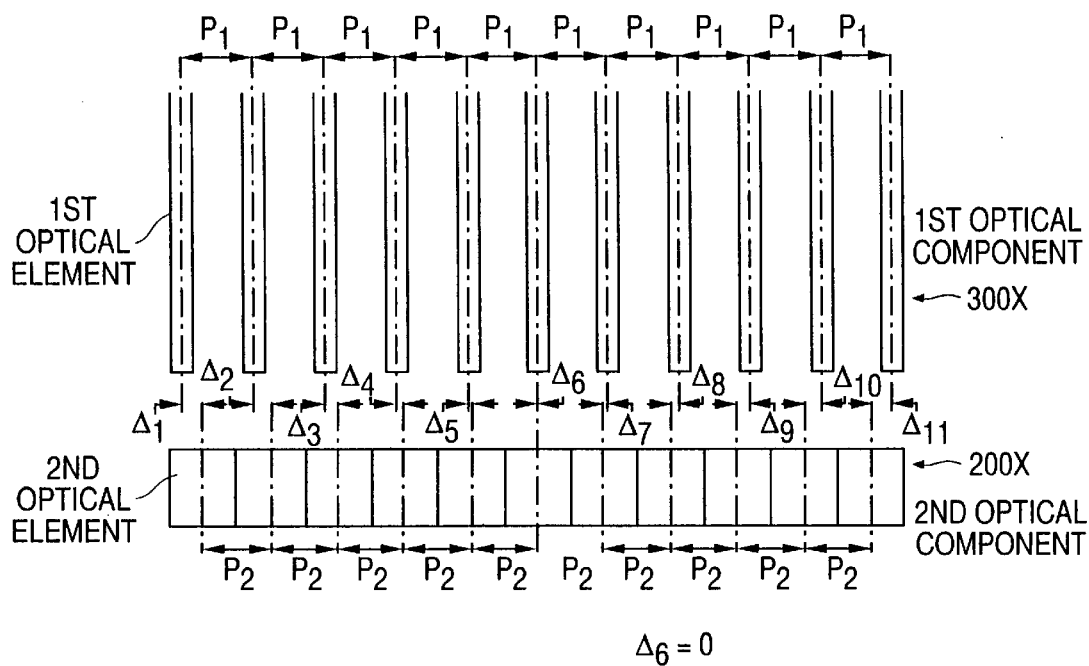
FIG. 13 is a schematic diagram of cores of an optical waveguide and respective laser elements of an optical semiconductor laser, arranged in an array in accordance with a first preferred embodiment of the present invention.

Referring first to FIG. 13, there is shown a schematic diagram of two optical components to be optically coupled to each other in an optical coupler. The schematic diagram in FIG. 13 is a first preferred embodiment of the present invention, for illustrating one aspect of the basic concept of the present invention. In FIG. 13, two kinds of optical components, a first optical component 300X and a second optical component 200X, are placed in the optical coupler so as to be optically coupled to each other. The optical components are composed of respective pluralities of optical elements. The first optical component 300X is composed of a plurality of first optical elements (the first optical element will be called simply "first elements" hereinafter) arranged in an array having an equal (i.e., common) pitch $P_1$ and the second optical component 200X is composed of a plurality of second elements arranged in an array having an equal (i.e., common) pitch $P_2$, and the pitches $P_1$ and $P_2$ have the following relationship:

$$P_2 = P_1 \pm 2 \times T_0 \qquad (1).$$

In the above expression (1), symbol $T_0$ is a tolerance allowed to be held when a first and a second element are coupled to each other singly. The expression (1) is a general expression, and FIG. 13 shows a case where $P_2 = P_1 + 2 \times T_0$.

When the coupling efficiency of a first element and a second element, opposite to the first element, is measured individually throughout the first and second elements, a pair of the first and second elements can be selected so as to have the largest coupling degree. The selected pair of the first and second elements forms a required optical coupler of the first and second optical components 300X and 200X. For example, when the first optical component 300X is an optical waveguide consisting of waveguide elements and the second optical component 200X is a semiconductor laser consisting of laser elements, and when the power of light emitted from an active laser element is measured at a side of a waveguide element on every pair, the largest light power can be obtained from a designated pair. The designated pair of the laser and waveguide elements forms a required optical coupler of the first and second optical components 300X and 200X.

In FIG. 13, the number of the first or the second elements is determined in consideration of manufacturing technique and accuracy of the first and the second elements. In case of the laser and the waveguide elements in FIG. 13, eleven elements are shown as an example. Actually, the number of elements is determined by taking the alignment tolerance and the positioning accuracy in bonding into consideration. For example, when the alignment tolerance is ±1 μm and the accuracy in bonding is ±5 μm, five elements are enough.

FIG. 13 shows a case where a central pair of the first and the second elements forms a required optical coupler of the first and second optical components 300X and 200X, which is explained by formula $\Delta_6 = 0$ in FIG. 13. Wherein, $\Delta$ expresses a deviation appearing between the optical axes of the first and the second element.

When the first and the second element are arranged as shown in FIG. 13, the deviations, $\Delta_1$, $\Delta_2$, - - - and $\Delta_{11}$, produced between the first and second elements become $-10T_0$, $-8To$, $-6T_0$, $-4T_0$, $-2T_0$, 0, $2T_0$, $4T_0$, $8T_0$ and $10T_0$ respectively. Hereupon, ± sign on the deviation is determined on a coordinate provided along the array of the first or second elements. In the coordinate, a direction from left to right is defined as a plus direction and vice versa, and an amount obtained by subtracting a coordinate value of the second element from that of the first element is defined as an amount of the deviation having the ± sign.

FIG. 14 is a table for showing deviations (DEVIATION), $\Delta_1$, $\Delta_2$, - - -, and $\Delta_{11}$, existing between a first element and a second element, opposed to the first element, in a case where the first elements and the second elements are arranged in the pitch of $P_1$ and $P_2$ respectively having the relationship $P_2 = P_1 + 2T_0$ and all first elements are shifted on the right by an amount (SHIFT AMOUNT) in between $-11T_0 \sim 11T_0$ from the positions of the first elements depicted in FIG. 13. In FIG. 14, the shift amounts of the first elements are written in a first column located on the left of the table in FIG. 14, and the deviations, $\Delta_1$, $\Delta_2$, - - - , and $\Delta_{11}$, produced due to the shift amounts of the first element are written in the second, third, - - - , and twelfth column respectively. Therefore, it can be seen that when a shift amount of the first elements is in between $-9T_0 \sim -7T_0$ (see the second row of the first column in FIG. 14) for example, the deviation $\Delta_{11}$ reaches an amount in between $-19T_0 \sim 17T_0$ (see the second row of the twelfth column in FIG. 14). At this time, it will be noticed in FIG. 14 that the deviation $\Delta_2$ becomes the amount of $\pm T_0$ in the second row of the third column. Similarly to the above example, every row has at least one deviation $\pm T_0$ as seen in FIG. 14. As a result, when the degree of optical coupling is measured on every pair of the first and the second element and a pair having the highest coupling efficiency is selected, the selected pair is a couple of the first and the second element having the deviation of $\pm T_0$.

From the above description, it can be said that when two kinds of optical components, that is, the respective one of the first and the second optical components, are optically coupled, the coupling tolerance of the first and the second optical components is increased by N times, by: providing N pieces of the first and the second optical components, called first optical elements and second optical elements, respectively; arranging the first and the second optical elements in accordance with the first preferred embodiment; and selecting a pair of the first and the second optical element from the first and second optical components in accordance with the first preferred embodiment. This signifies that by virtue of applying the basic concept of the present invention, described in the first preferred embodiment, to the optical coupler, the position adjustment of the optical components in the optical coupler becomes extremely easy to be performed, obtaining required high coupling efficiency.

For example, when the second optical component 200X is a semiconductor laser composed of an array of 11 pieces of laser elements as the second elements and the first optical component 300X is an optical fiber composed of an array of 11 pieces of fiber elements as the first elements, $\pm 1$ $\mu$m coupling tolerance can be easily obtained. This is because the coupling tolerance between the first and the second optical component 300X and 200X, in other words, between the semiconductor laser and the optical fiber, is increased to $\pm 11$ $\mu$m. Incidentally, generally, a bonding apparatus used for bonding semiconductor chips such as the laser elements described above produces a positioning deviation less than $\pm 5$ $\mu$m. Therefore, in the above example, the position adjustment becomes very easy to be performed.

Furthermore, in the above example, since the optical components 200X and 300X are fabricated in an array of elements respectively, the width of each component becomes large. As a result, a rotation error is easy to be detected, which results in eliminating the rotation error. The rotation error is an error due to a component rotation occurring around a rotation axis passing through the component in a direction perpendicular to the drawing paper of FIG. 13. When the component is a single element, the rotation error is hard to be detected because the single element is very small in size. However, when the component is an array structure having a large width, the rotation error is easy to be detected, which results in eliminating the rotation error.

Figure 9A:
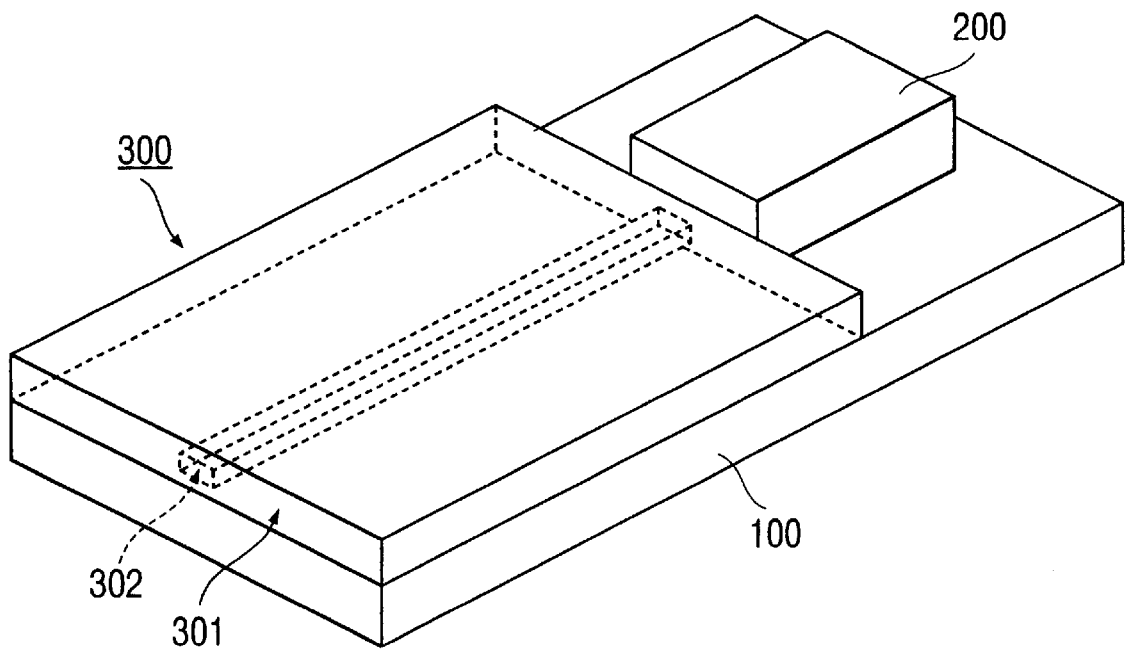
FIG. 9A is a schematic perspective view of an optical coupler of the prior art, having another type of a multimode optical waveguide.
Figure 9B:
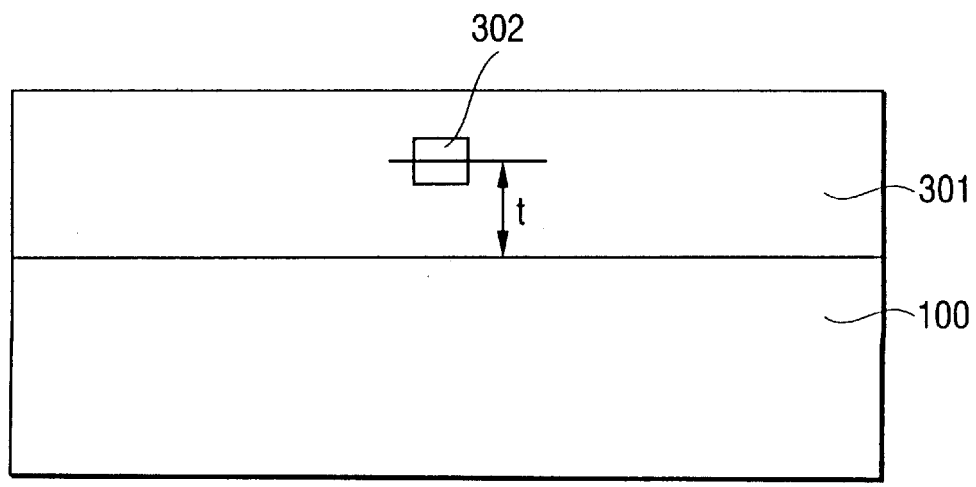
FIG. 9B is a side view of the optical coupler shown in FIG. 9A.
Figure 10A:
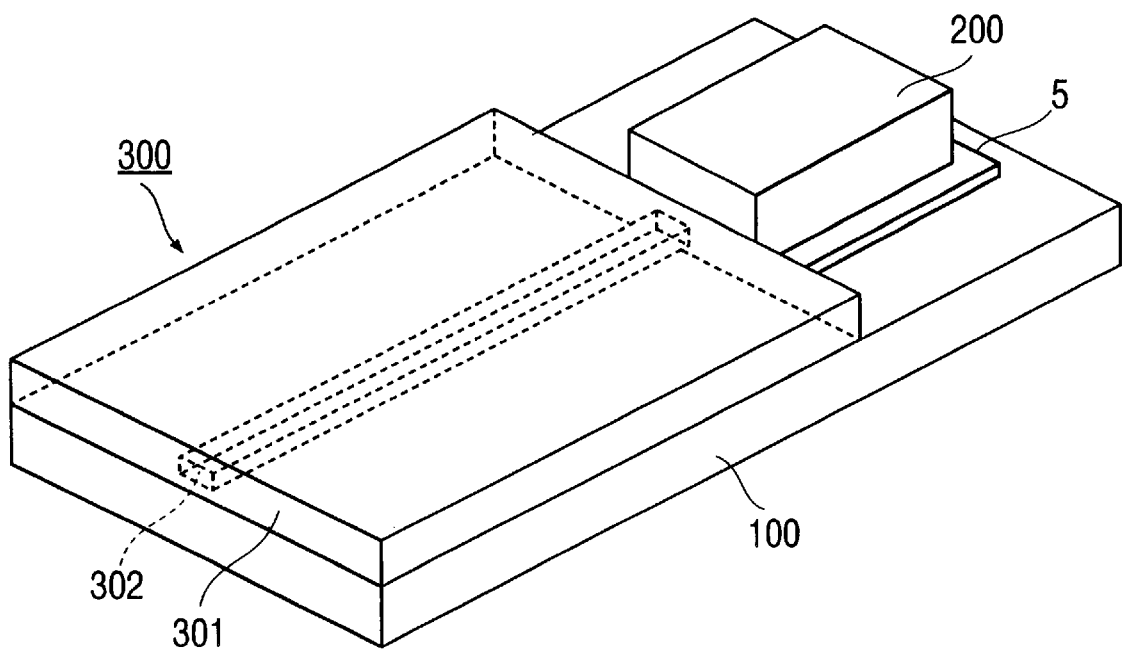
FIG. 10A is a schematic perspective view of an optical coupler of the prior art, having a spacer for raising up the semiconductor laser.
Figure 10B:
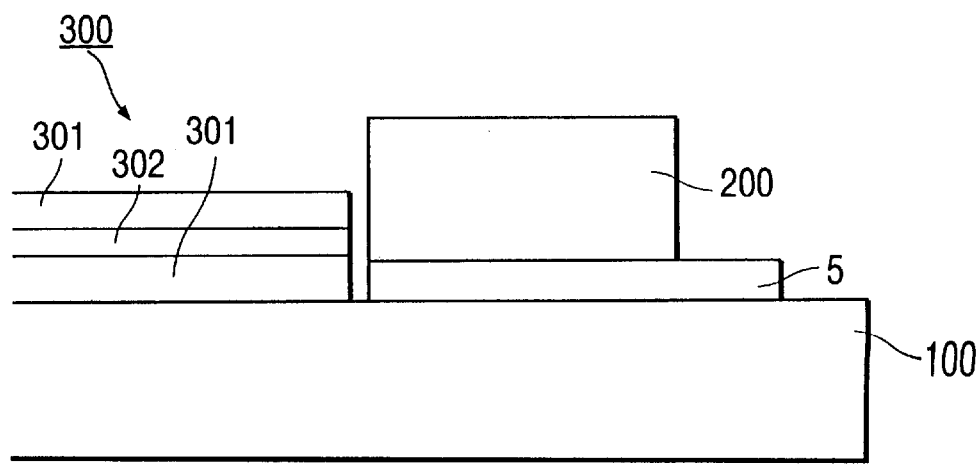
FIG. 10B is a schematic partial side view of the optical coupler shown in FIG. 10A.
Figure 11A:
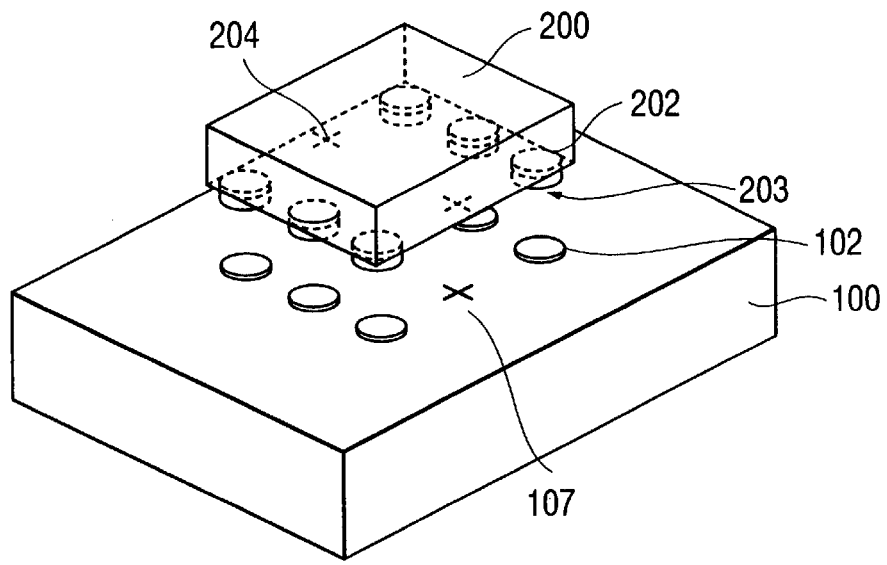
FIG. 11A is a schematic partial perspective view of a semiconductor laser intended to be mounted on a substrate in an optical coupler, in the prior art.
Figure 11B:
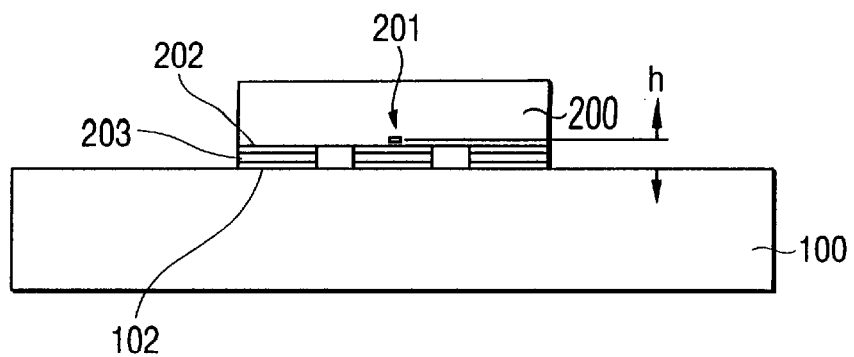
FIG. 11B is a side view of the semiconductor laser mounted on the substrate shown in FIG. 11A.
Figure 15:
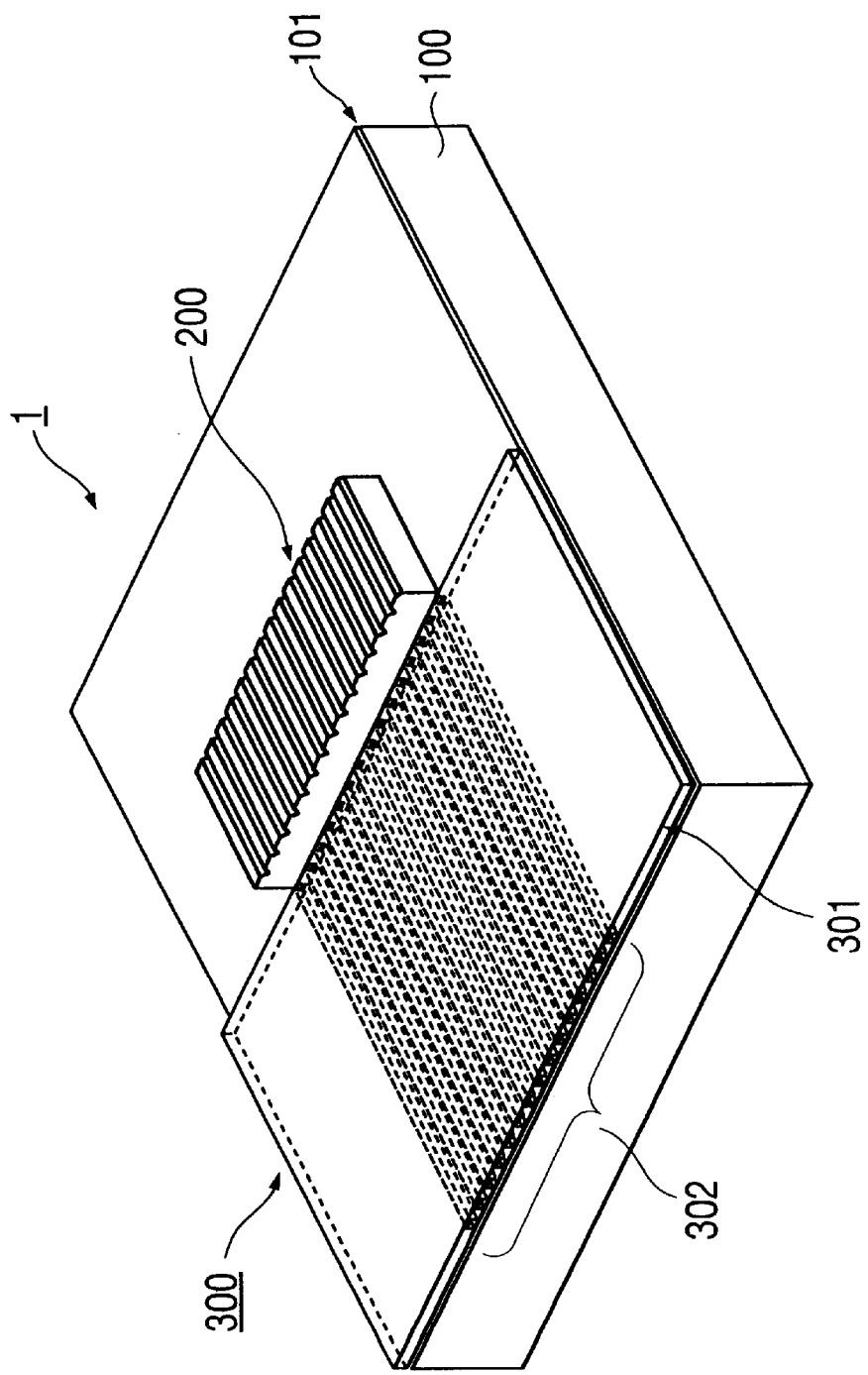
FIG. 15 is a schematic perspective view of an optical coupler in accordance with a second preferred embodiment of the present invention.

FIG. 15 is a schematic perspective view for illustrating an optical coupler for a second preferred embodiment of the present invention. The optical coupler 1 is invented by improving the prior art optical coupler such as described with reference to FIG. 9A, in accordance with the first preferred embodiment. In FIG. 15, the same reference numeral as in FIG. 9A designates the same part as in FIG. 9A. In the optical coupler 1, the semiconductor laser 200 is a laser array consisting of 15 laser elements arranged in 50 $\mu$m pitch, and the optical waveguide 300 is a core array consisting of 15 core elements 302 arranged in 48 $\mu$m pitch. The optical waveguide 300 and bonding pads (not depicted in FIG. 15) are formed on the substrate 100.. The semiconductor laser 200 is bonded to the substrate 100 through the bonding pads so that a central laser element of the semiconductor laser 200 is intended to coincide with a central core element of the optical waveguide 300. The positional deviation of the semiconductor laser 200 from its ideal position is kept to be less than $\pm 15$ $\mu$m in fabrication.

In the second preferred embodiment shown in FIG. 15, the substrate 100 is made of a silicon single crystal waferboard having {100}-surface, which will be called "silicon wafer" hereinafter, and the optical waveguide 300 is made of organic high polymer such as polyimide stated in literature T. Matsuura et. al., "LOW LOSS, HEAT-RESISTANT OPTICAL WAVEGUIDE USING NEW FLUORINATED POLYIMIDES", ELECTRONICS LETTERS Feb. 4, 1993. Vol. 29 No.3, pp 269–271. The bonding pads are made of metal, and the semiconductor laser 200 is an array of specific laser elements. Each of the specific laser elements has a light generating part composed of an active layer and a waveguide part attached to the light generating part for converting a spot-size. The waveguide part will be called "the spot-size conversion part" hereinafter. The specific laser element is laid opened Japanese Patent TOKUKAIHEI 7-663022 and presented in "PROCEEDINGS OF THE 1993 IECE (THE INSTITUTE OF ELECTRONICS, INFORMATION AND COMMUNICATION ENGINEERS) FALL CONFERENCE, pp. 4–262, (1993)". According to the above laid opened patent or paper, the specific laser element is fabricated in monolithic, by integrating the light generating part and the waveguide part including a core having thickness which changes gradually. That is, the light generating part has a thick core to confine light for amplifying light suitably, which is the same as the usual semiconductor laser. However, in the spot-size conversion part, the thickness of the core in the light generating part is gradually decreased as the light propagates through the core, so that the spot size of the light is gradually increased.

The silicon dioxide film 101 having 1 $\mu$m thickness is formed on a surface of the silicon substrate 100, and the bonding pads and the wiring pattern connected with the bonding pads are formed on the silicon dioxide film. (The bonding pads and the wiring pattern are not depicted in FIG. 15.)

The optical waveguide 300 consists of a plurality of cores 302 and a cladding later 301 surrounding the cores 302. The cores 302 are arranged in an array with a pitch of 48 $\mu$m and each core has a cross section of 5 $\mu$m×5 $\mu$m and a refractive index of 1.558. The cladding layer 301 has a refractive index of 1.55 and consists of an under cladding layer laid under the cores 302 and an over cladding layer laid above the cores 302, both with a thickness of 20 $\mu$m.

The semiconductor laser 200 consists of specific laser elements, the same in number as the number of the cores 302 in the optical waveguide 300. The light generating part of each laser element is formed in a stripe having a BH structure and the semiconductor laser 200 is formed by arranging the light generating parts in 50 $\mu$m pitch. In each specific laser element, the width of the stripe is approximately 1.5 $\mu$m at the light generating part and gradually increases to 4.91 $\mu$m as the stripe is extended to the spot-size conversion part. In the specific laser element, the thickness of each layer constructing the light generating part and the refractive index of each of the layers are adjusted so that the confinement factor of light guided in the light generating part is kept to at least 5%, and the spot-size conversion part has the same layer structure as the light generating part only with a difference that the thickness of the core part in the spot-size conversion part is gradually decreased as the stripe is extended to the output end of the specific laser element. A thickness ratio of the thickest part to the thinnest part of the core part is 2.5:1. Wherein, the confinement factor of light is the overlap of the guided anode with the active layer, which is explained in a book "HETEROSTRUCTURE LASERS", PART B, p244, Equation (7.10-10), published by ACADEMIC PRESS".

Generally, the coupling efficiency of a semiconductor laser and an optical waveguide is divided into horizontal coupling efficiency and vertical coupling efficiency for representation. The horizontal coupling efficiency is obtained by overlap integration of horizontal direction electric fields of light beams to be coupled and the vertical coupling efficiency is obtained by overlap integration of vertical direction electric fields of the light beams to be coupled. The coupling efficiency based on the overlap integration is stated in a book "OPTICAL GUIDED WAVES AND DEVICES" P139, equation (6.86), published by MCGRAW-HILL BOOK COMPANY (ISBN 0-07-707425-4).

In the second preferred embodiment. shown in FIG. 15, the horizontal coupling efficiency of the semiconductor laser 200 and the optical waveguide 300 is approximately 100% in the array direction of the specific laser elements and the cores respectively. Incidentally, however, with respect to an individual laser element and core pair of the second preferred embodiment, the horizontal coupling efficiency is decreased to 90%, when the position deviation becomes approximately ±1.15 $\mu$m in the horizontal direction, and if the position deviation is increased to be 5 $\mu$m, the horizontal coupling efficiency would be decreased to as small as 35%.

As described with reference to FIG. 13, the number of the arrayed elements depends on the bonding accuracy of a bonding apparatus for bonding the elements. When the tolerance is ±1.15 $\mu$m and the bonding accuracy is ±5 pm, five elements are enough. That is, the total tolerance becomes ±5.15 $\mu$m which is obtained by: (a half of the pitch difference: 2 $\mu$m/2)×(the number of elements: 5)+(a fabricating margin: 0.15 $\mu$m)=5.15 $\mu$m. When the bonding accuracy is ±10 $\mu$m, ten elements are enough. In the second preferred embodiment (FIG. 15), an example of a case where fourteen is enough as the number of the specific laser elements and the core elements is shown.

A semiconductor laser having an optical waveguide coupled therewith can be obtained by: making the fifteen specific laser elements emit light successively; measuring light intensity at the output of the core elements; and selecting a couple of the specific laser element and the core having the maximum output light.

Figure 16:
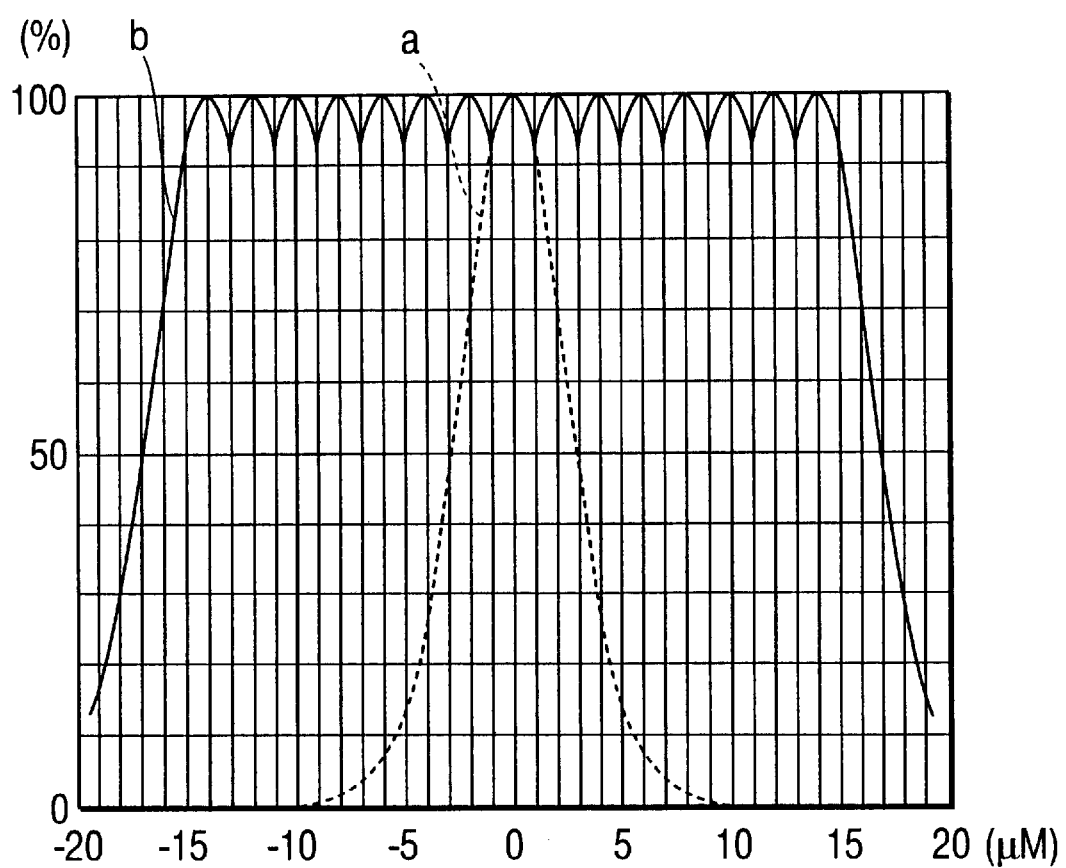
FIG. 16 is a graph for showing changes of optical coupling efficiency between a semiconductor laser and an optical waveguide.

FIG. 16 is a graph for showing changes of the optical coupling efficiency when the semiconductor laser 200 and the optical waveguide 300 are relatively moved in the horizontal direction. In FIG. 16, a curve "a" indicates optical coupling efficiency in case where a semiconductor laser and an optical waveguide are singly coupled, and a curve "'b" indicates optical coupling efficiency, when arrays of the laser elements and cores change their positions in the horizontal direction relatively and each of the fifteen pairs of the laser elements and cores is optically coupled one after another as explained in the second preferred embodiment description.

As shown by the curve "a" in FIG. 16, in case where the semiconductor laser and the optical waveguide consist of single elements respectively, the coupling efficiency is decreased to 90% when the position deviation is ±1.15 $\mu$m. In contrast to the curve "a", in case of the second preferred embodiment shown in the curve "b", a range to keep the coupling efficiency to more than 90% is expanded as much as ±15 $\mu$m. As a result, by virtue of adopting the way of the second preferred embodiment to optical coupling, the semiconductor laser and the optical waveguide can be optically coupled easily without performing the hard optical adjustment as done in the prior art.

In the second preferred embodiment (FIG. 15), the material of the substrate and the optical waveguide is not limited to silicon and high polymer respectively, and the laser element is not necessary to include the spot-size conversion part. For example, silica glass, quartz glass and other kinds of glass and ceramic can be also used for the substrate, material including silicon dioxide or silicon nitride can be used as the main component of the optical waveguide, and a laser element including merely a usual active layer can be used for the laser element of the semiconductor laser.

Figure 1:
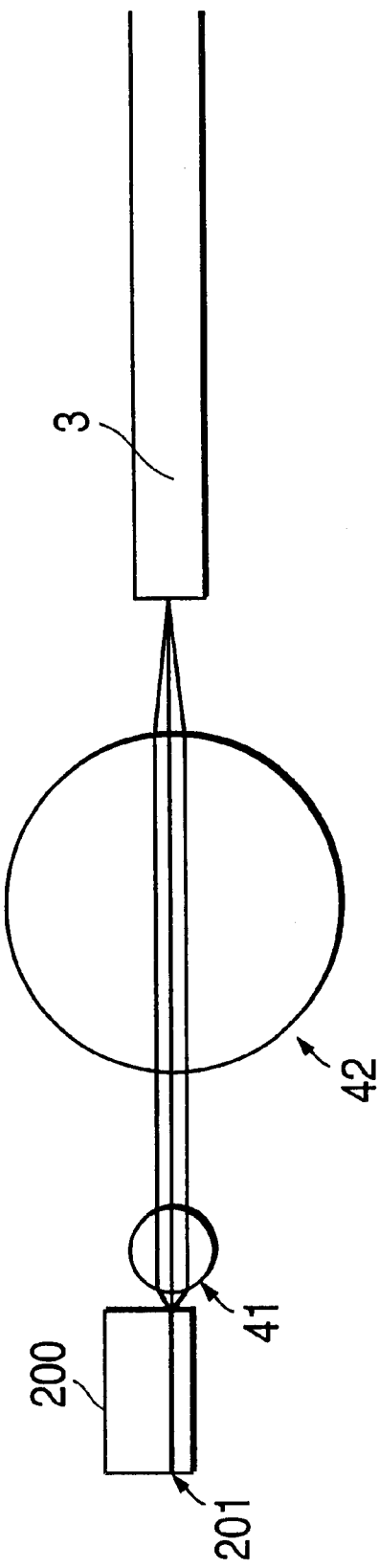
FIG. 1 is a schematic diagram of an optical coupler of the prior art.
Figure 2A:
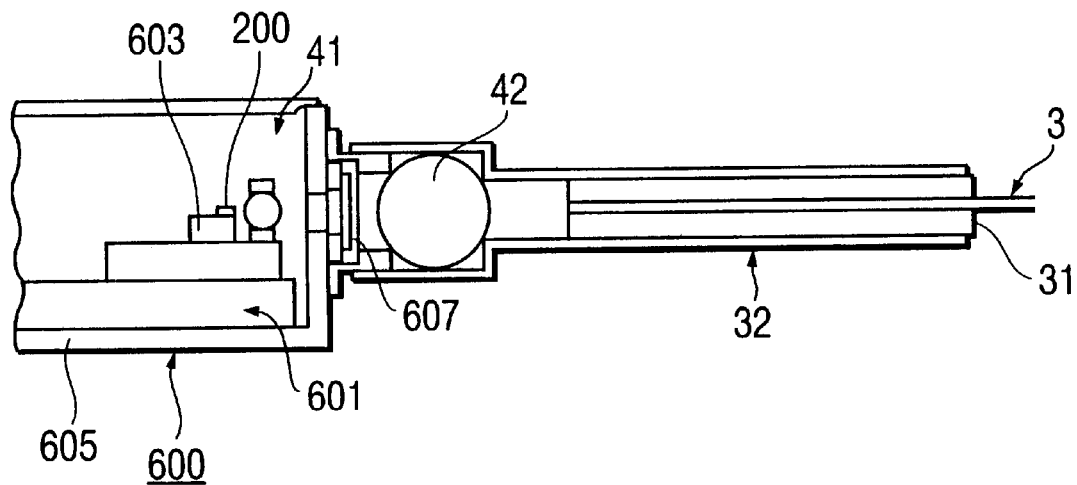
FIG. 2A is a schematic sectional view of an optical coupler of the prior art.
Figure 2B:
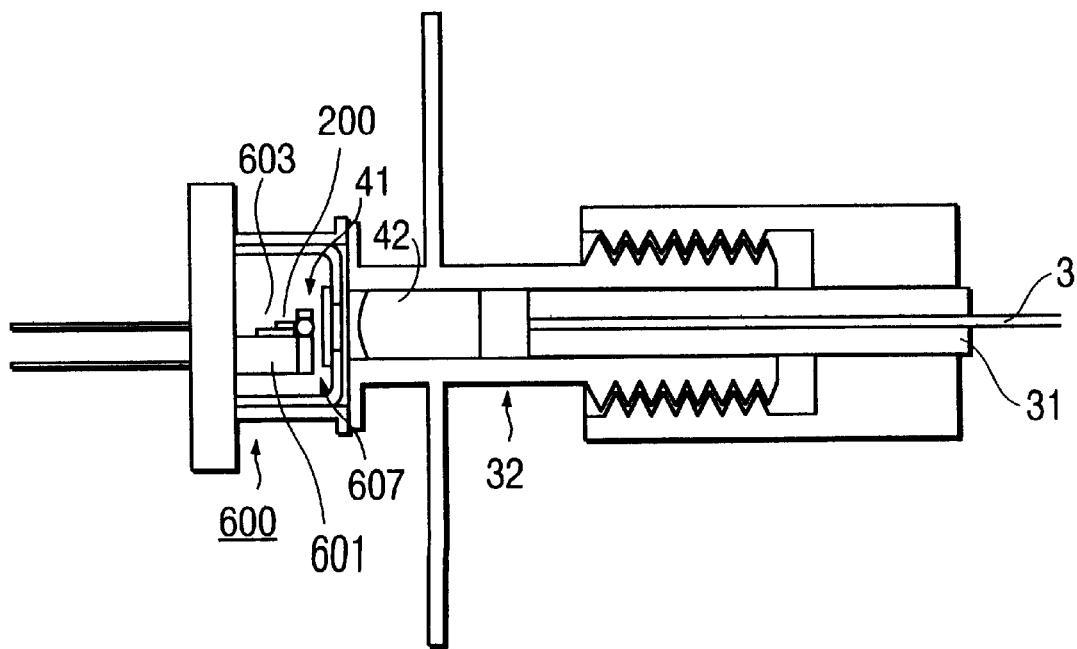
FIG. 2B is a schematic sectional view of another optical coupler of the prior art.
Figure 3:
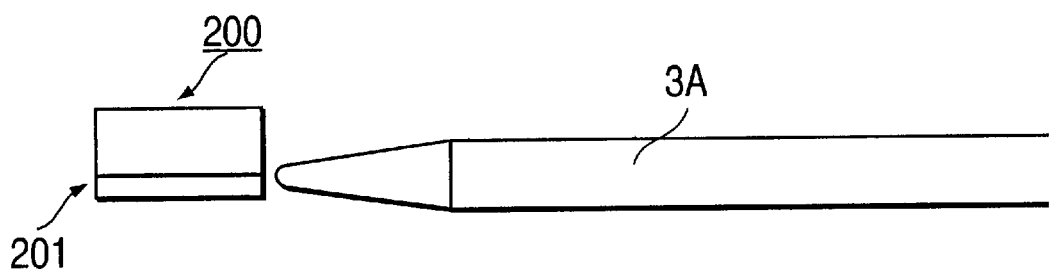
FIG. 3 is a schematic diagram of an optical coupler of the prior art, using a tapered optical fiber.
Figure 4:
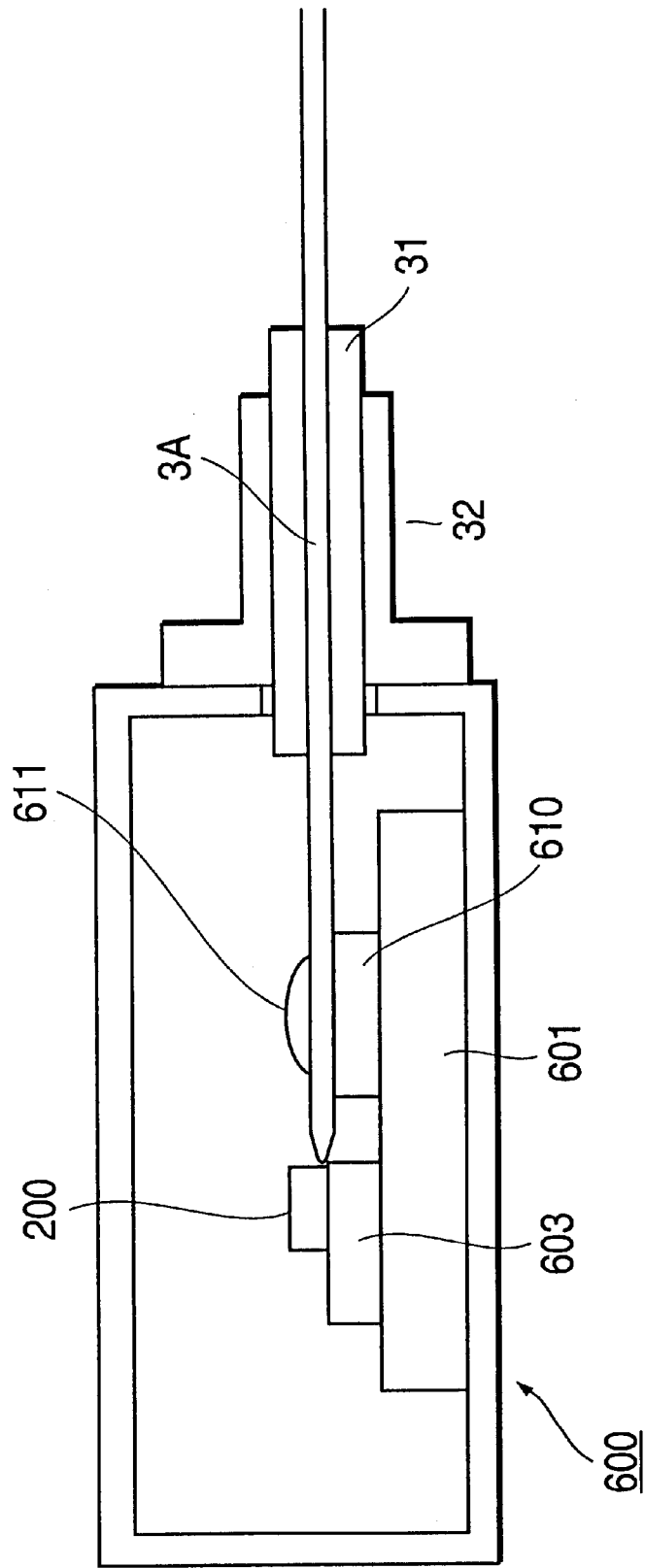
FIG. 4 is a schematic sectional view of an air-tight enclosure of an optical coupler of the prior art.
Figure 5:
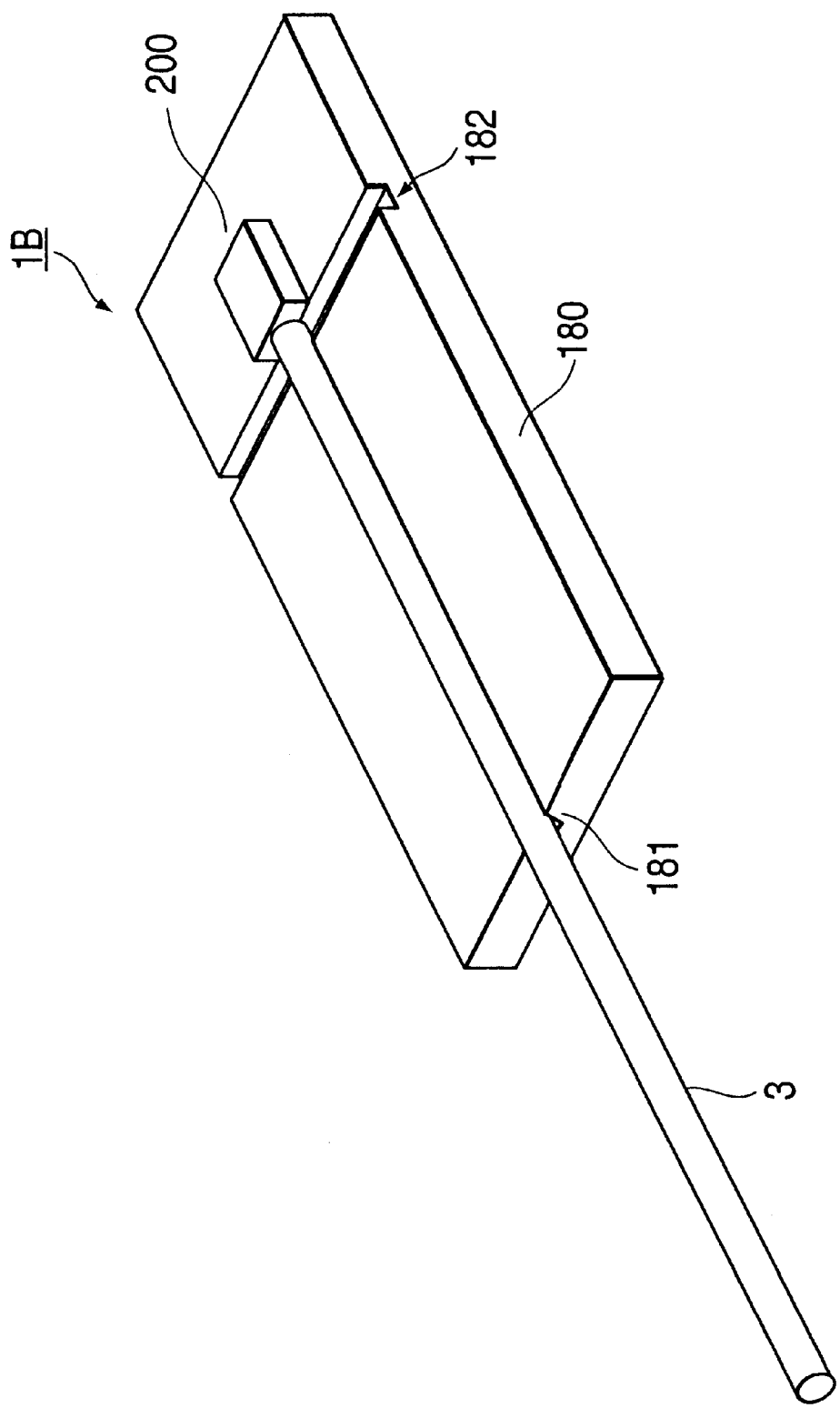
FIG. 5 is a schematic perspective view of an optical coupler of the prior art, for illustrating a typical example of position adjustment.
Figure 6:
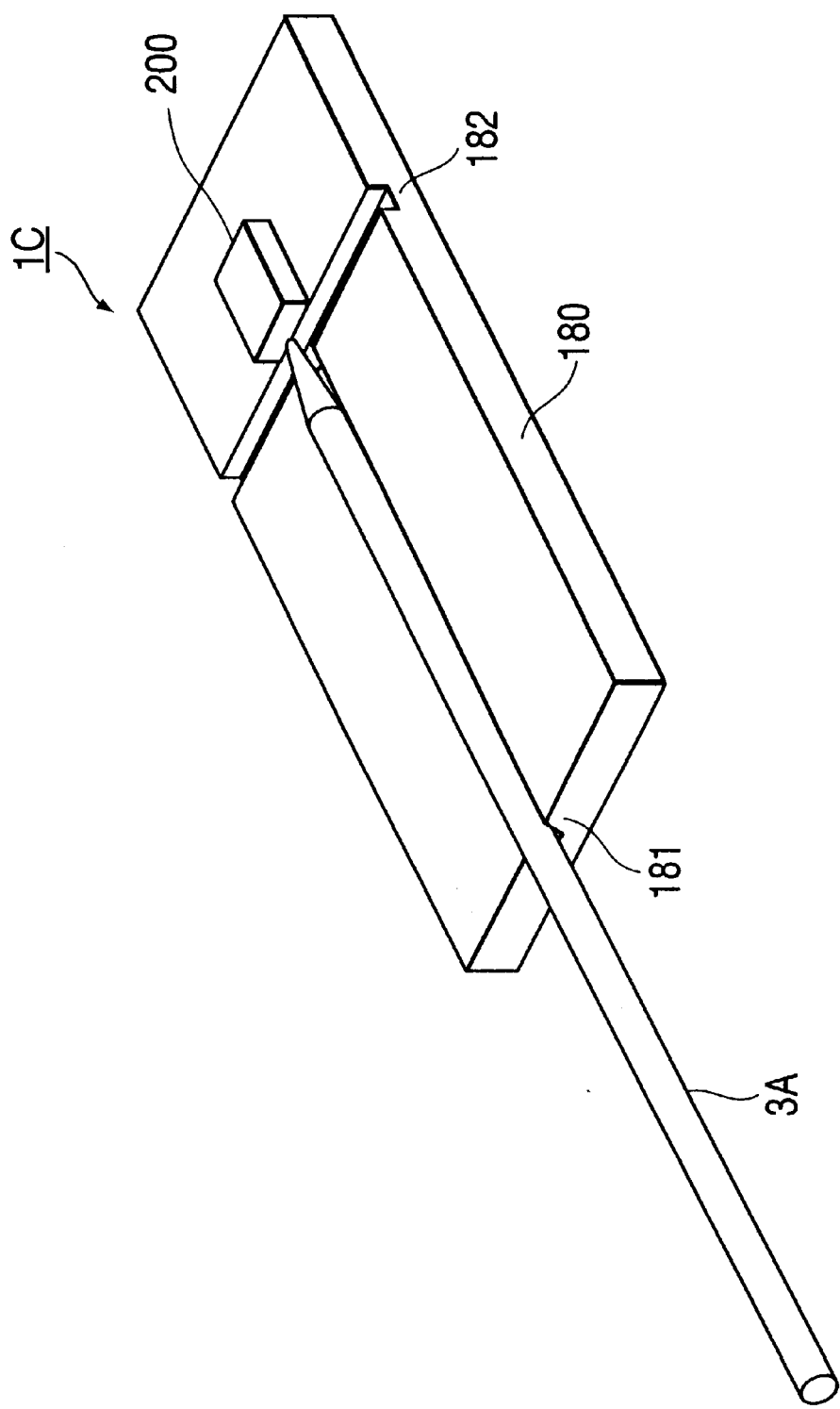
FIG. 6 is a schematic perspective view of another optical coupler of the prior art, for illustrating a typical example of position adjustment.
Figure 7A:
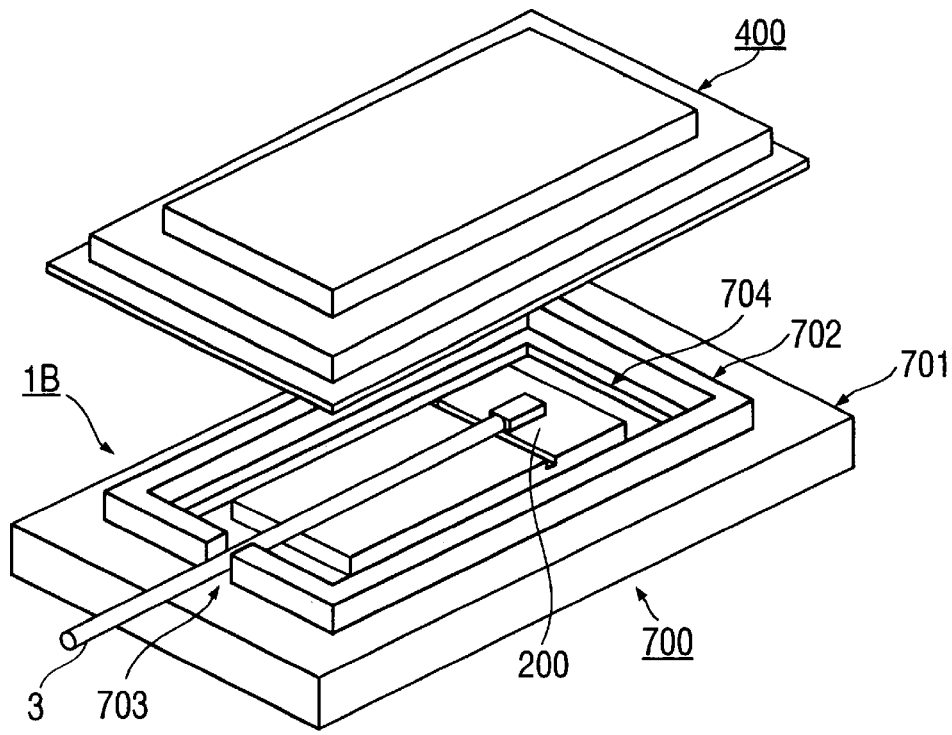
FIG. 7A is a schematic perspective view of an optical coupler of the prior art, before being sealed air-tight (i.e., hermetically sealed)
Figure 7B:
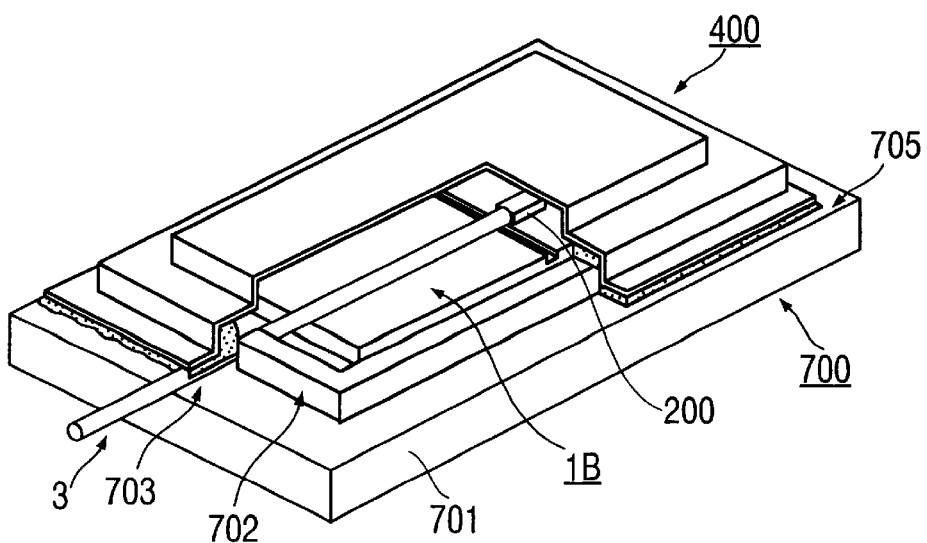
FIG. 7B is a schematic perspective view of the optical coupler shown in FIG. 7A, after being sealed air-tight (i.e., hermetically sealed)
Figure 8A:
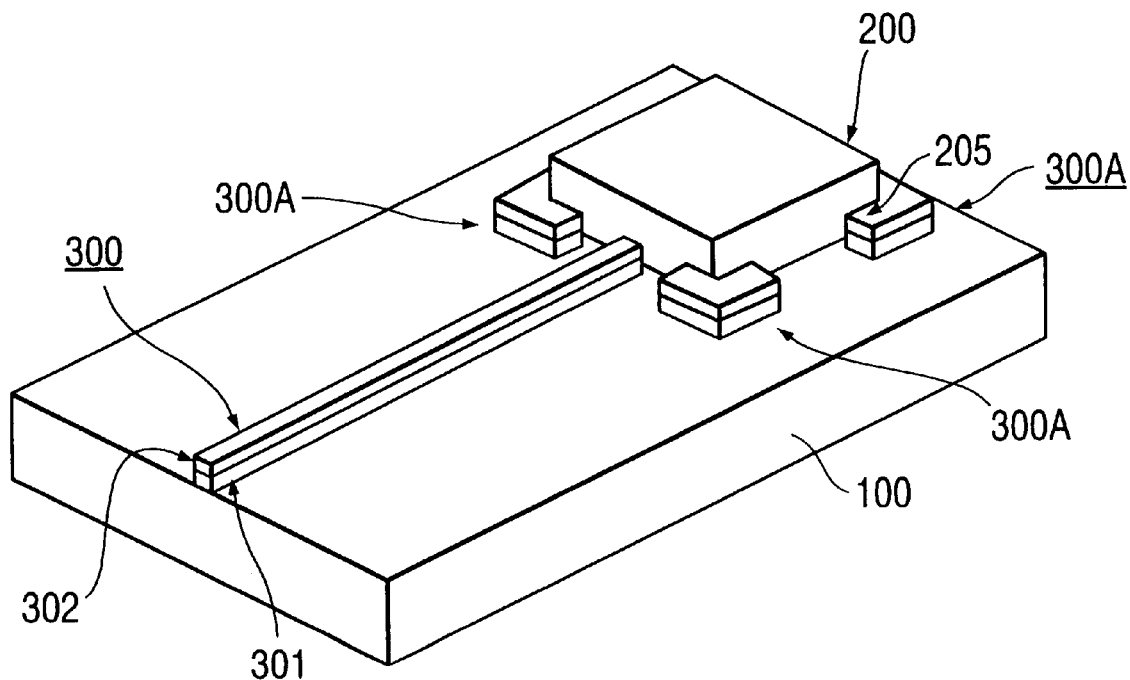
FIG. 8A is a schematic perspective view of an optical coupler of the prior art, having a multimode optical waveguide and a stand off for supporting a semiconductor laser.
Figure 8B:
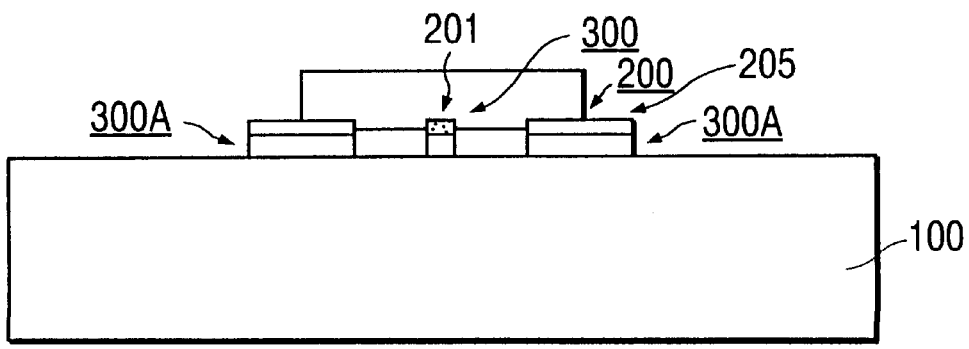
FIG. 8B is a side view of the optical coupler shown in FIG. 8A.
Figure 17A:
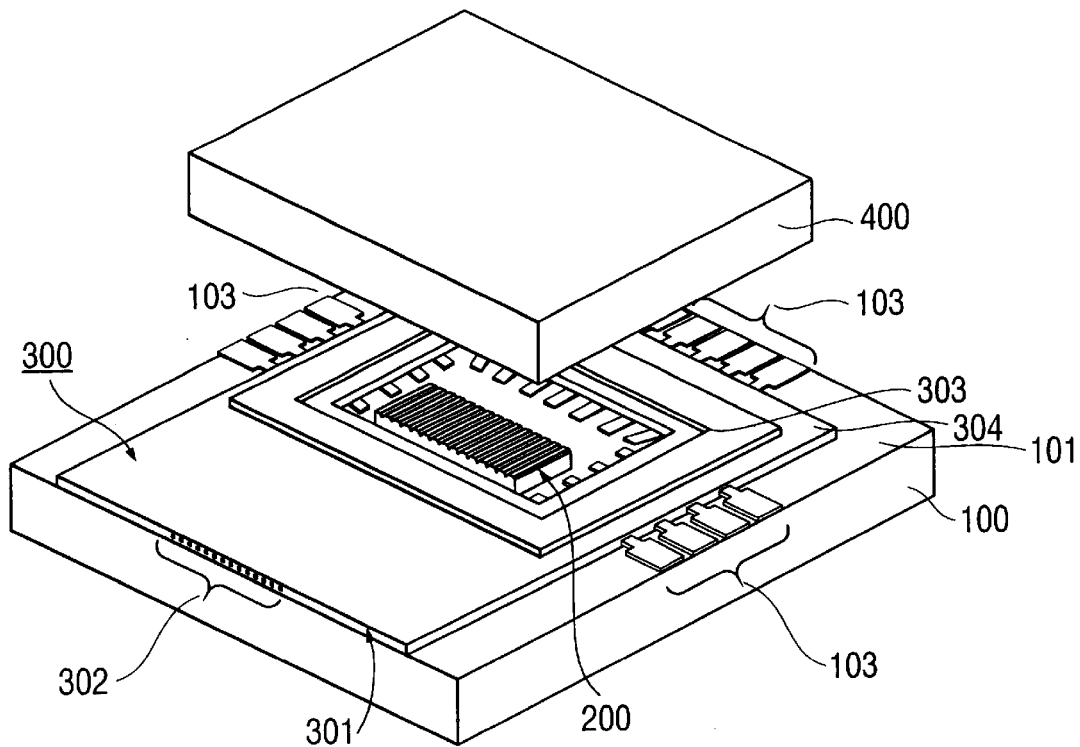
FIG. 17A is a schematic perspective view of an optical coupler before a semiconductor laser is covered and hermetically sealed, in accordance with a third preferred embodiment of the present invention.
Figure 17B:
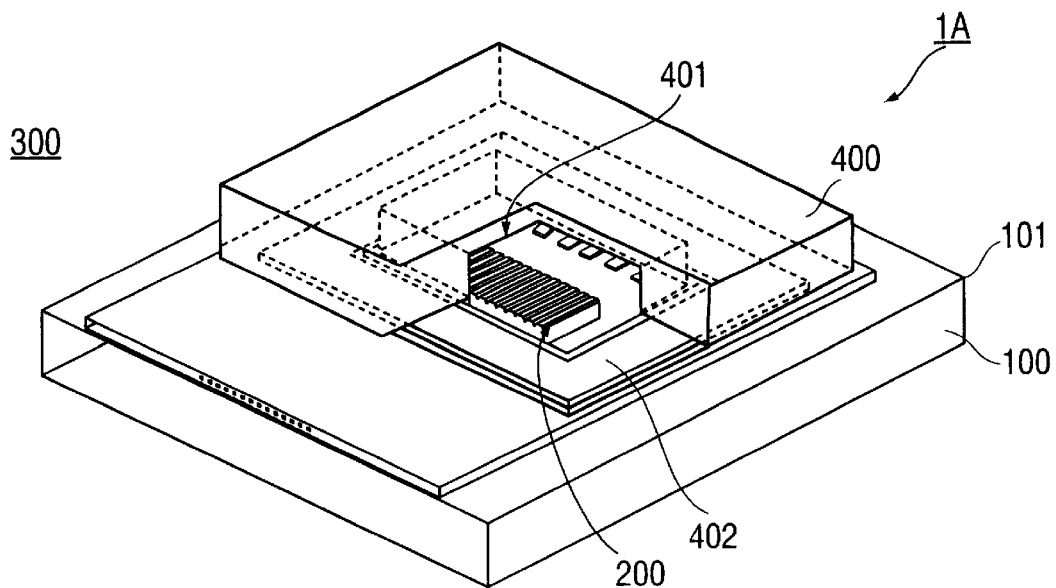
FIG. 17B is a schematic perspective view of the optical coupler shown in FIG. 17A, after the semiconductor laser is hermetically sealed.

FIGS. 17A and 17B are schematic perspective views for illustrating a third preferred embodiment of the present invention. FIG. 17A is a figure before placing a lid 400 for the airtight box and FIG. 17B is a figure after placing the lid 400. In FIG. 17B, inside of the airtight box can be partially seen through. The third preferred embodiment is obtained by applying the way of the second preferred embodiment shown in FIG. 15 to the optical coupler of the prior art including the airtight box for the semiconductor laser which has been described with reference to FIGS. 7A and 7B. In FIGS. 17A and 17B, the same reference numerals as in FIGS. 7A, 7B and FIG. 15 designate the same parts as in FIGS. 7A, 7B and FIG. 15. The optical coupler of the third preferred embodiment has an air-tight (i.e., hermetically sealed) box containing the semiconductor laser 200, and, so that such optical coupler having the air-tight box for the array of the semiconductor laser will be numbered "1A" hereinafter.

In FIGS. 17A and 17B, the optical coupler of the third preferred embodiment is mainly composed of: the silicon dioxide film 101 formed on the surface of the silicon substrate 100; electric wire patterns 103 and the bonding pacts 102, which are covered by the semiconductor laser 200, for bonding the semiconductor laser 200 on the silicon dioxide film 101; and the optical waveguide 300 formed on the silicon dioxide film 101 so that the electric wire pattern 103 are placed under the cladding layer 301 of the optical waveguide 300. The silicon dioxide film 101 is for insulating the electric wire pattern from the substrate 100. The bonding pads 102 are arranged on the silicon dioxide film 101 with the same number of the laser elements formed to the array, and the bonding pad 102 is electrically connected with the electric wire pattern individually or formed together with the electric wire pattern in case where the electric wire pattern is extended under the laser element and the tip of the electric wire pattern operates as the bonding pad. The optical waveguide 300 is composed of the cladding layer 301 made of polyimide and having refractive index 1.55 and the cores 302 made of polyimide and having refractive index 1.558. The shape of the cross section of the array of the cores 302, the pitch of the cores 302 in the array and the thickness of the cladding layer 301 are the same as in FIG. 15. The core array is formed by the following steps: forming a core layer for forming the cores, on the cladding layer 301; and etching the core layer by RIE (Reactive Ion Etching) method, using oxygen gas, so as to produce the core array.

A rectangular hole 303 is formed in the optical waveguide 300 by RIE using oxygen gas plasma, for exposing a surface of the silicon dioxide film 101, the bonding pads 102, and the electric wire pattern 103, as shown in FIG. 17A. The semiconductor laser 200 is bonded on the bonding pads on the silicon dioxide film 101 so as to be opposite to an end face of the cores 302.

A metal frame 304 is formed on the optical waveguide 300 so as to surround the hole 303. The metal frame 304 is made of a metal film formed on the waveguide 300 by evaporating. A metal frame 402, not depicted in FIGS. 17A and 17B, is also made of a metal film formed on a ceramic mother-body of a lid 400 by evaporation. The lid 400 has a hollow (i.e., recess 401) inside as shown in FIG. 17B and the metal frame 402 is provided around the hollow 401. The lid is connected with the metal frame 304 by using indium solder, Pb—Sn solder or other solder.

In FIGS. 17A and 17B, the lid 400 is made of ceramic, however, metal, silicon or plastic material can be used for the lid 400. When metal is used, it is not necessary to use the metal frame 402. When silicon or plastic material is used for the lid 400, the metal frame 402 can be formed on the mother-body by evaporation, plating or sputtering of a metal. Then, the lid 400 can be mechanically connected with the metal frame 304 by using indium, tin or solder. When material having high heat resistance such as silicon or ceramic is used for the lid 400, either one of the following methods can be applied for forming the metal frame 402 on the mother-body of the lid 400 a method for printing paste, which is made by mixing gold filler and binder, possible to be sintered at a low temperature, into ceramic including binder, possible to be sintered at low temperature, onto the mother-body of the lid 400 and sintering it; and a method of pasting the mother-body of the lid 400 with the metal frame 402 by using a glass having a low melting point. When the mother-body of the lid 400 is plastic, the lid 400 can be directly bonded to the surface of the optical waveguide 300 by using high polymeric adhesive, without using the metal frames 402 and 304.

The ring shaped metal frame 304 is formed by bonding a metal sheet such as a stamped metal sheet to the upper surface of the optical waveguide 300 by using high polymeric adhesive or glass having a tow melting point. Furthermore, the same as the lid 400, the metal frame 304 can be formed on the upper surface of the optical waveguide 300 by printing the paste onto the upper surface of the optical waveguide 300 by screen printing technique and sintering the printed paste on the upper surface of the optical waveguide 300. Still further, a metal film formed on the upper surface of the optical waveguide 300 can be used as the metal frame 300. The metal film is formed by evaporating, plating or spattering technique.

After coating metal having a low melting point such as indium, tin or a eutectic alloy of gold-tin on the ring shaped metal film 304, the lid 400 is fixed to the upper surface of the optical waveguide 300 by laying the ring shaped metal layer 402 of the lid 400 on the surface of the coated metal, melting the coated metal by raising temperature to the melting point, and returning the raised temperature to the room temperature. Covering the hole 303 with the lid 400 tightly thus, the semiconductor laser 200 can be hermetically sealed.

In the third preferred embodiment described with reference to FIGS. 17A and 17, the devices such as the bonding pads 102, the wiring pattern 103 and the metal frame 304 are formed on the flat surface of the silicon dioxide film 101 formed on the substrate 100, before the optical waveguide 300 and the hole 303 are formed on the silicon dioxide film 101. Since the devices are formed on the flat surface having no difference in level thus, the technique of photolithography can be easily applied to the formation.

Figure 18A:
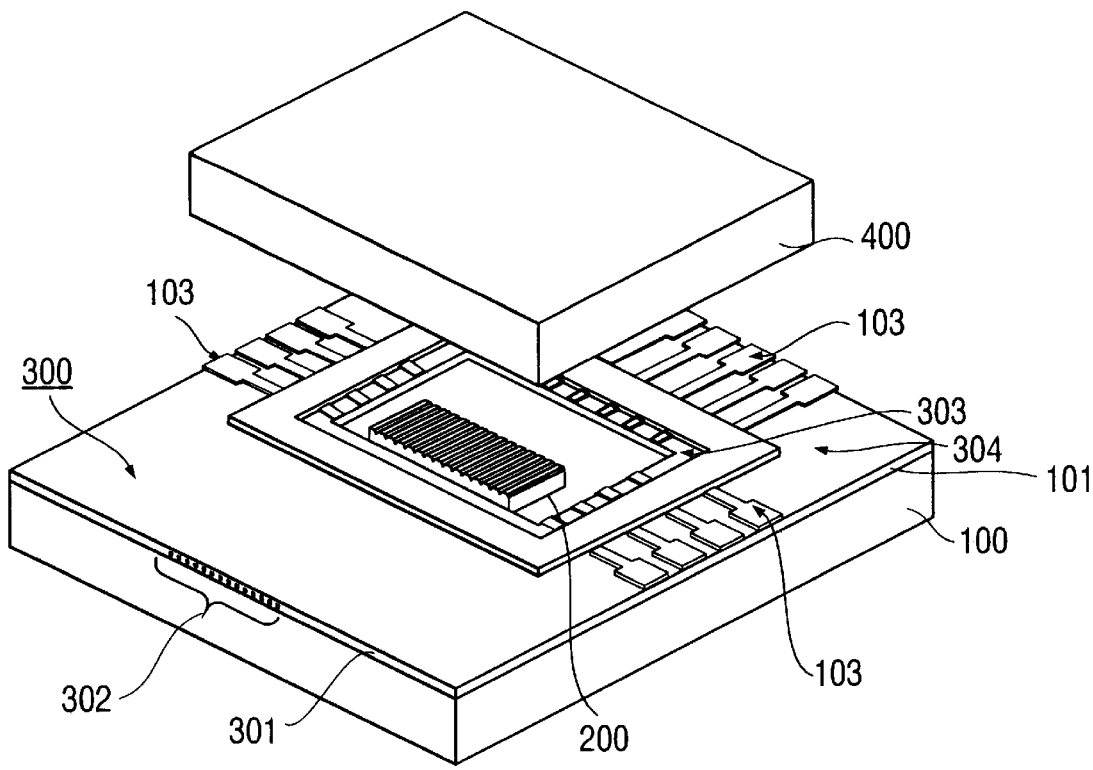
FIG. 18A is a schematic perspective view of an optical coupler before a semiconductor laser is hermetically sealed in accordance with the fourth preferred embodiment of the present invention.
Figure 18B:
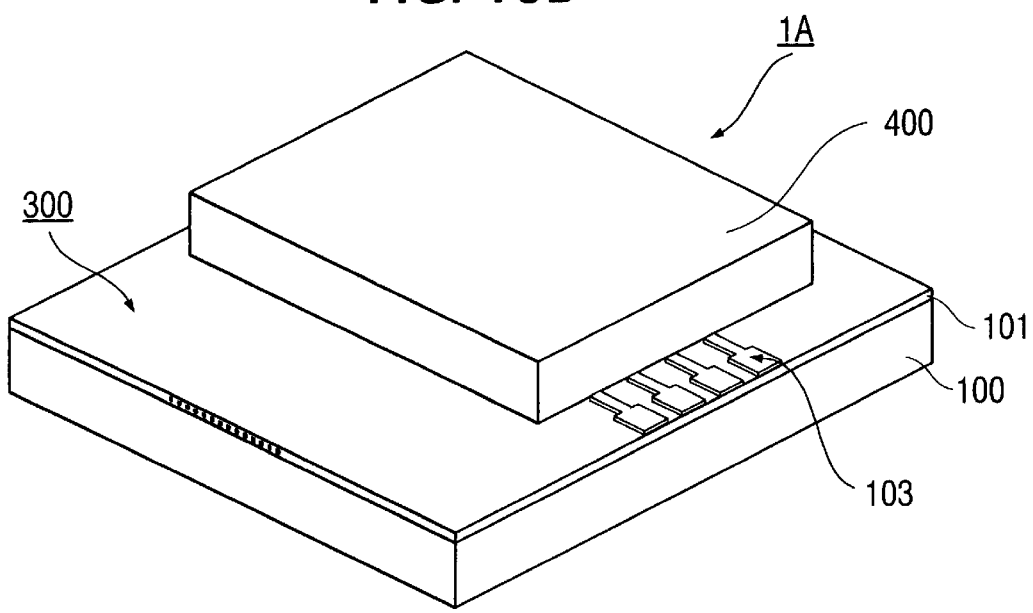
FIG. 18B is a schematic perspective view of the optical coupler shown in FIG. 18A, after the semiconductor laser is hermetically sealed.

FIGS. 18A and 18B are schematic perspective views of the optical coupler 1A, for illustrating a fourth preferred embodiment of the present invention. The optical coupler 1A of the fourth preferred embodiment is similar to that of the third preferred embodiment except that the optical waveguide 300 in the optical coupler 1A is made of quartz. In FIGS. 18A and 18B, the same reference numerals as in FIGS. 17A, 17B designate the same part as in FIGS. 17A, 17B. FIG. 18A illustrates that the lid 400 is not set on the hole 303, and FIG. 18B illustrate that the lid 400 is set on the hole 303.

In order to form an optical waveguide, a heat treatment must be made in a fabrication process at temperature exceeding 1000° C. Therefore, the wiring pattern 103 are formed after forming the optical waveguide 300, so that the wiring pattern 103 are formed on an upper surface of the layer of the optical waveguide300. In the optical waveguide 300, the refractive indices of the cladding layer 301 and the core 302 are 1.46 and 1.4673 respectively, the cross section of the core 302 is 5 $\mu$m×5 $\mu$m rectangular, and the thickness of the under cladding layer and the over cladding layer is 30 $\mu$m respectively.

The wiring pattern 103 and the bonding pads 102 are formed on the silicon dioxide film 101.in the hole 303 and the semiconductor laser 200 is bonded to the bonding pads 102 formed on the silicon dioxide film 101. In the fourth preferred embodiment, the bonding pads 102 are formed after the optical waveguide 300 and the hole 303 are formed. That is, the bonding pads 102 are formed by applying photolithography technique on a surface having a different level due to the hole 303, so that the position deviation of the bonding pads 102 tends to become as large as ±5 $\mu$m. However, since the deviation ±5 $\mu$m is sufficiently small in comparison with the coupling tolerance ±15 $\mu$m between the semiconductor laser 200 and the core 302, the position deviation of the bonding pads 102 produces no problem on the coupling efficiency of the optical coupler 1A.

In the third and fourth preferred embodiments, the optical coupler 1A can be made as small as 2 mm×2 mm×2 mm in size though they are airtight optical couplers. By virtue of the small size, temperature control can be easily performed to the optical coupler 1A by using a thermal element such as a Peltier effect element.

When the optical coupler 1A of the third preferred embodiment described with reference to FIGS. 17A and 17B or of the fourth preferred embodiment described with reference to FIGS. 18A and 18B is coupled to an optical fiber, the optical axes of the optical coupler 1A and the optical fiber must be aligned (optically coupled) with high coupling efficiency in a horizontal direction and a vertical direction. Herein, the horizontal direction is an array direction of the semiconductor laser 200 or the optical waveguide 300 and the vertical direction is a direction perpendicular to a plane including the array of the semiconductor laser 200 or the optical waveguide 300. Methods for aligning the optical axes of the optical coupler and the optical fiber and means for carrying out the methods will be described with reference to FIGS. 20 to 23 regarding the axis alignment in horizontal direction and with reference to FIGS. 24, 26 to 31 regarding the axis alignment in vertical direction. (FIG. 23 partially includes means for carrying out the optical coupling in the vertical direction.)

Figure 19:
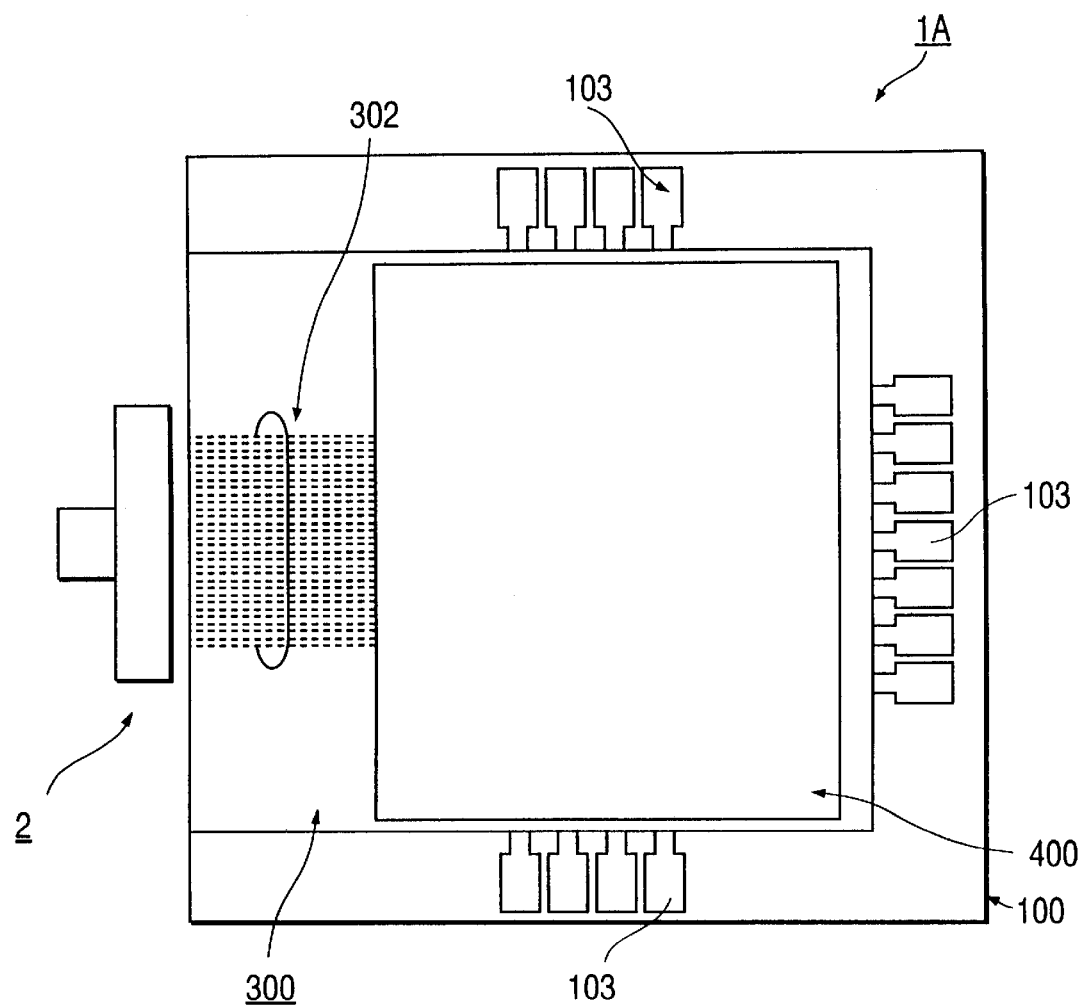
FIG. 19 is a schematic top view of the optical coupler shown in FIG. 17A, optically connected with a photo-diode for detecting the one of the cores of the optical waveguide, the one of the cores being coupled with the corresponding one of the semiconductor lasers having the highest coupling efficiency, in accordance with a fifth preferred embodiment of the present invention.

FIG. 19 is a schematic top view of the optical coupler 1A shown in FIG. 174, for illustrating a fifth preferred embodiment of the present invention. That is, using the fifth preferred embodiment, a means for selecting a coupled core element and laser element, having the highest coupling efficiency, will be explained. In FIG. 19, the same reference numerals as in FIG. 17A designate the same parts as in FIG. 17A. In FIG. 19, intensity of light output from the optical waveguide 300 is measured by a photo-diode (2) having a light-receptive spot of 2 mm diameter. Since the diameter of the light-receptive spot is very large compared with the width (approximately 0.7 mm) of the arrayed cores 302, if the photo-diode 2 is placed approximately at a center of an output terminal of the cores 302, all of light output from the cores 302 can be measured by the photo-diode 2. Therefore, when a constant current is fed through the laser elements of the semiconductor laser 200, not depicted in FIG. 19, in individual succession and the corresponding light outputs from the cores 302 are measured by the photo-diode 2, a coupled laser element and core having the highest coupling efficiency can readily be selected.

Next, a means for optically coupling a optical fiber to the optical coupler 1A shown in FIG. 17A or 17B will be described with reference to FIGS. 20A, 20B, 21, 22A, 22B, 23A and 23B in connection with sixth, seventh, eighth and ninth preferred embodiment of the present invention, respectively.

Figure 20A:
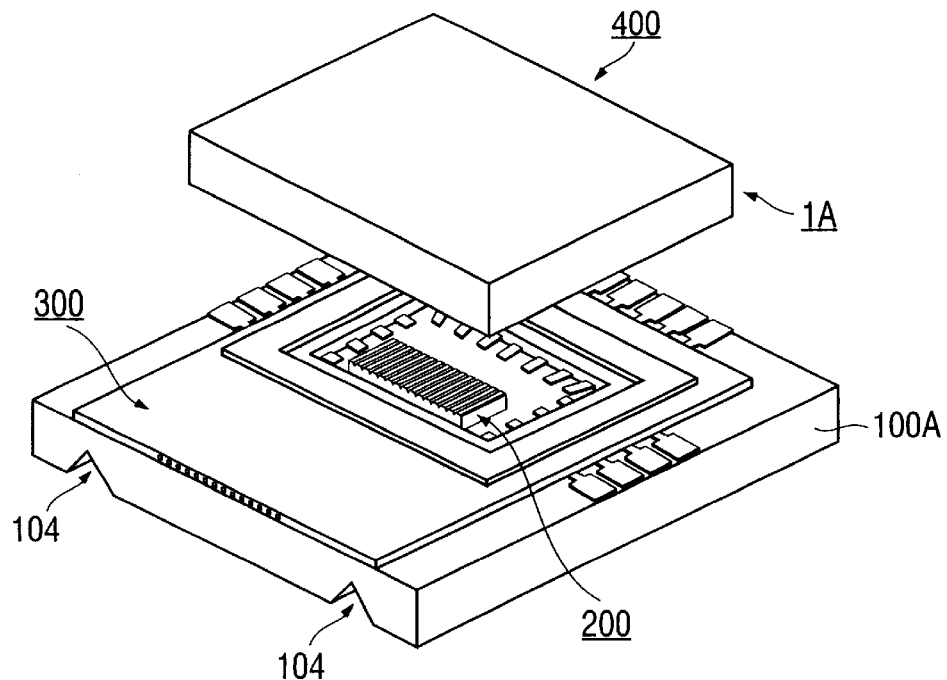
FIG. 20A is a schematic perspective view of an optical coupler having grooves, before being mounted on a substrate and before the semiconductor is covered.
Figure 20B:
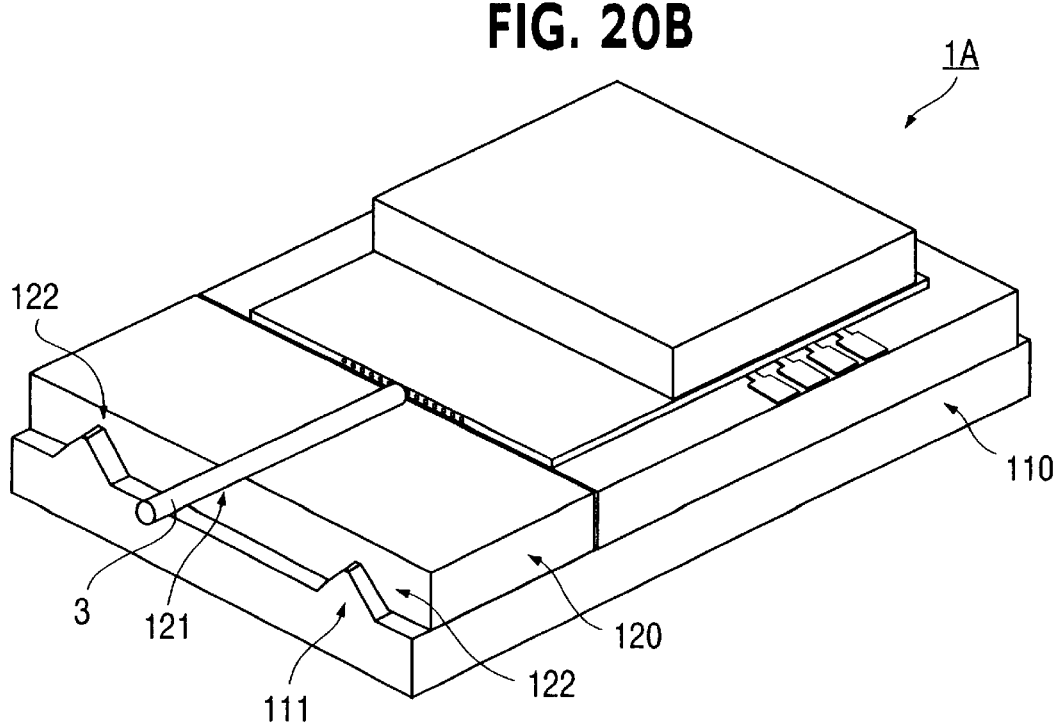
FIG. 20B is a schematic perspective view of the optical coupler, as mounted on the substrate and connected with an optical fiber, in accordance with a sixth preferred embodiment of the present invention.

FIG. 20A is a schematic perspective view of an optical coupler 1A having a substrate 100A partially modified so as to be mounted on a common substrate 110, and FIG. 20B is a schematic perspective view illustrating the sixth preferred embodiment in which the optical coupler 1A can be optically connected with an optical fiber easily. In FIGS. 20A and 20B, the same reference numerals as in FIGS. 17A and 17B designate the same parts as in FIGS. 17A and 17B.

In FIGS. 20A and 20B, the sixth preferred embodiment is composed of: a common substrate 110 having guide rails 111 on an upper surface thereof; a substrate 120 for mounting the optical fiber 3, having grooves 122 on a bottom surface thereof for making the substrate 120 slide on the guide rails 111, and another groove 121, which will be called "fiber guiding groove hereinafter", for guiding the optical fiber 3 thereon, on an upper surface thereof; and the optical coupler 1A including a substrate 100A having grooves 104 a bottom surface therefor for sliding the optical coupler 1A on the guide rail 111.

In FIG. 20B, a silicon wafer having a {100}-surface is used for the common substrate 110, and the rails 111 are formed on the common substrate 110 by: firstly forming a silicon dioxide layer on the common substrate 110; secondly forming an etching mask having a pattern for the rails 111, in the silicon dioxide layer by photolithography technique; and forming the rails 111 through a wet etching process, which is called "anisotropic etching process", performed by using a strongly alkaline etching liquid. When the rails 111 is formed, a stripe shaped etching mask pattern is used. The stripe shaped etching mask pattern is made from the silicon dioxide layer which can be extended in a <110> direction.

The substrates 100A and 120 in FIGS. 20A and 20B are also the silicon wafer having {100}-surface, and the grooves 104 and 122 are formed also through the anisotropic etching process. The grooves 104 and 122 are formed respectively by using etching masks formed by using a both-plane superposing apparatus, so that the relative position relationship between the patterns of the cores 302 (FIG. 19) and the fiber guiding groove 121 is kept constant. The fiber guiding groove 121 is formed so as to lie in front of a core selected from cores in the core array 302. The optical fiber 3 is fitted into the fiber guiding groove 121 and positioned, so that the optical fiber 3 optically couples to a core selected from cores in the core array 302.

Figure 21:
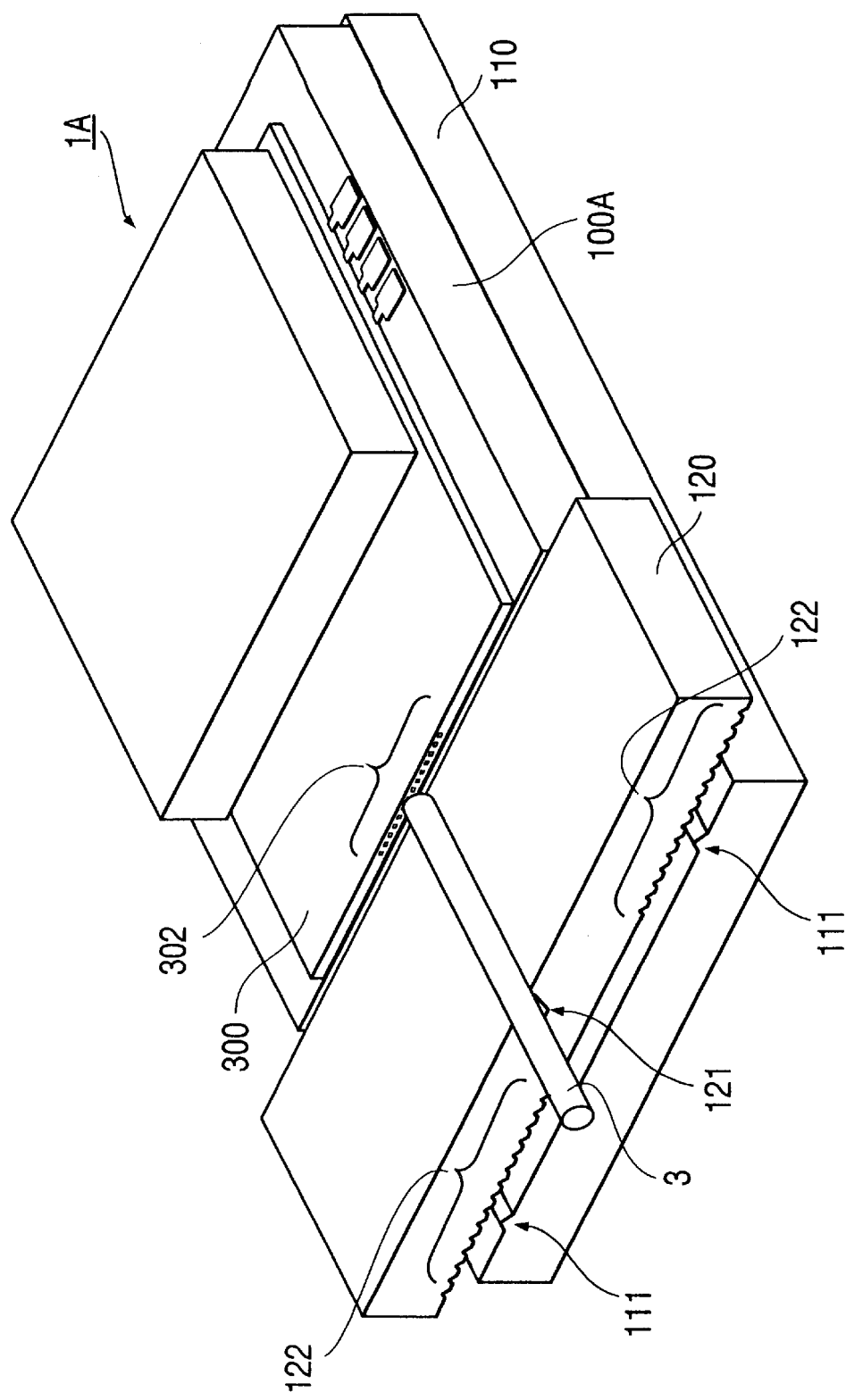
FIG. 21 is a schematic perspective view of an optical coupler mounted on a substrate with an optical fiber, in accordance with a seventh preferred embodiment of the present invention.

FIG. 21 is a schematic perspective view for illustrating the seventh preferred embodiment in which the optical coupler 1A and the optical fiber can be optically connected easily. The seventh preferred embodiment is obtained by partially modifying the sixth preferred embodiment. In FIG. 21, the same reference numeral as in FIG. 20 designates the same part as in FIG. 20.

The seventh preferred embodiment is similar to the sixth preferred embodiment except that a height of the rail 111 from the upper surface of the common surface is low in comparison with that of the sixth preferred embodiment and the number of the grooves 122 is increased and the pitch of the groves 122 is the same as the pitch of the cores 302. By doing thus and applying the selecting way described in the fifth preferred embodiment with reference to FIG. 19, one of the cores 302 can be selected easily so as to be optically-coupled with a laser element of the semiconductor laser 200. The number of the pairs of the grooves 104 (not depicted in FIG. 21) of the optical coupler 1A can be increased. In this case, it is necessary to make an interval of the grooves 104 equal to the pitch of the cores 302. In the case that the number of the pairs of the grooves 104 is increased to seven, the number of the pairs of the grooves 122 can be decreased to nine. Furthermore, in FIG. 21, since the number of the pairs of the grooves 104 is increased, a plurality of pairs of the guide rails 111 can be formed. In this case, it is necessary to make an interval (i.e., spacing) of the guide rails 111 equal to the pitch of the cores 302.

Figure 22A:
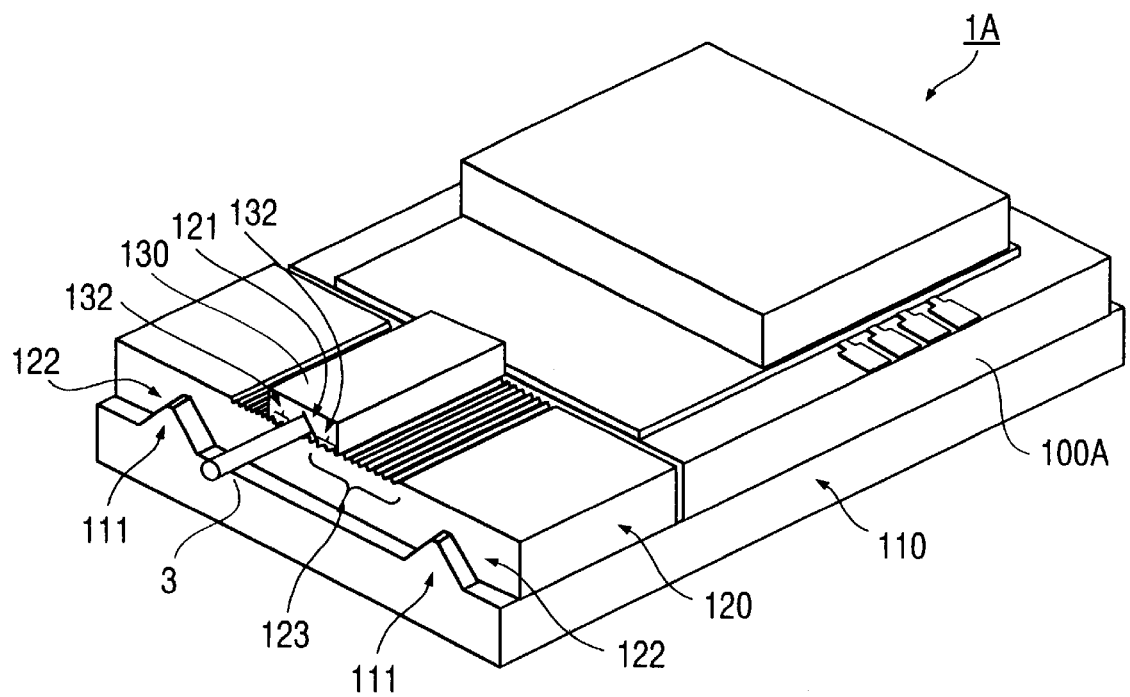
FIG. 22A is a schematic perspective view of an optical coupler connected with an optical fiber and mounted on a substrate, in accordance with an eighth preferred embodiment of the present invention.
Figure 22B:
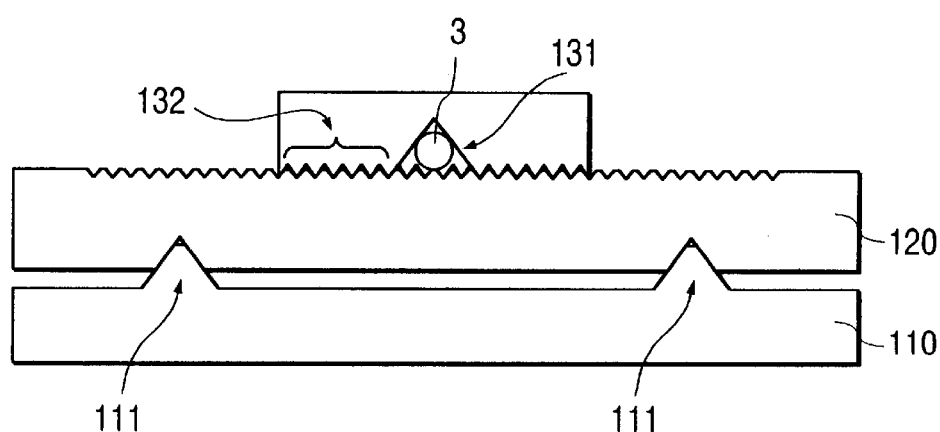
FIG. 22B is a schematic vertical side view of the optical coupler connected with the optical fiber, shown in FIG. 22A.

FIGS. 22A is a perspective view illustrating the eighth preferred embodiment of the invention, obtained by modifying the seventh preferred embodiment described with reference to FIGS. 20A and 20B, and FIG. 22B is a side elevation viewed from the axial direction of the optical fiber 3 in FIG. 22A. In FIGS. 22A and 22B, the same numerals as in FIGS. 20A and 20B designate the same parts as in FIGS. 22A and 22B.

In FIGS. 22A and 22B, a plurality of grooves 123 are formed on the upper surface of the substrate 120 for mounting the optical fiber 3, with a pitch the same as the pitch of the cores 302 (see FIG. 19), and a block 130 is positioned on the substrate 120 for holding the optical fiber 3 down onto the substrate 120. A plurality of grooves 132 are formed on the bottom surface of the block 130 with the same pitch of the grooves 123 so that the grooves 132 are engaged with the grooves 123, and a groove 131 is formed also on the bottom surface of the block 130 approximately at a center of the grooves 132 for holding the optical fiber 3 down onto one of the grooves 123. The grooves 123 are formed on the upper surface of the substrate 120 by performing anisotropic etching of the substrate 120. The block 130 is made from a silicon wafer having a {100}-surface, and the groove 131 and the grooves 132 are formed by performing anisotropic etching of the surface.

One of the cores 302 can be selected so as to be optically coupled to the optical fiber 3 with the highest coupling efficiency by shifting the block 130 horizontally, applying the selecting way described in the fifth preferred embodiment with reference to FIG. 19.

Figure 23A:
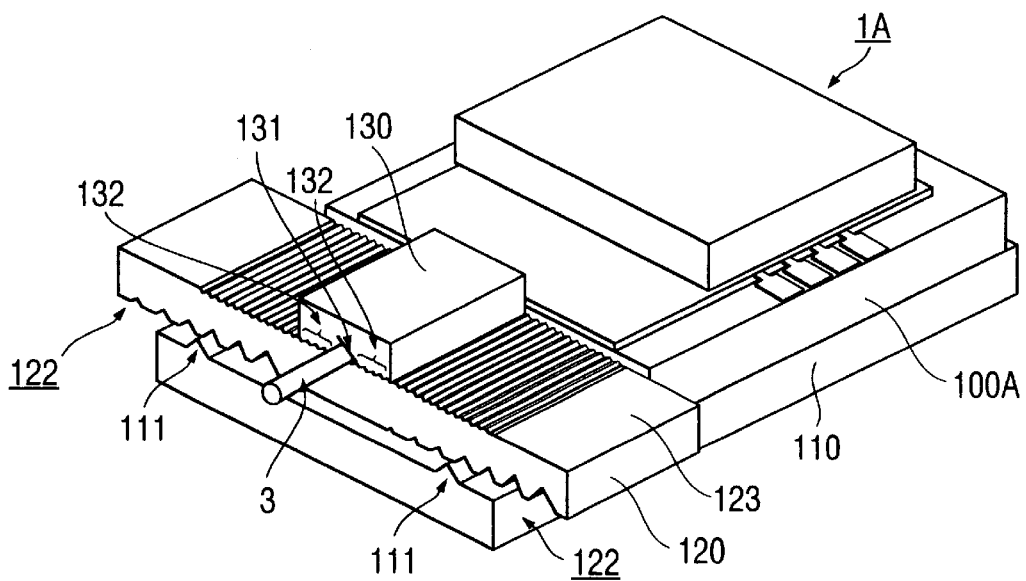
FIG. 23A is a schematic perspective view of an optical coupler connected with an optical fiber and mounted on a substrate, in accordance with a ninth preferred embodiment of the present invention.
Figure 23B:
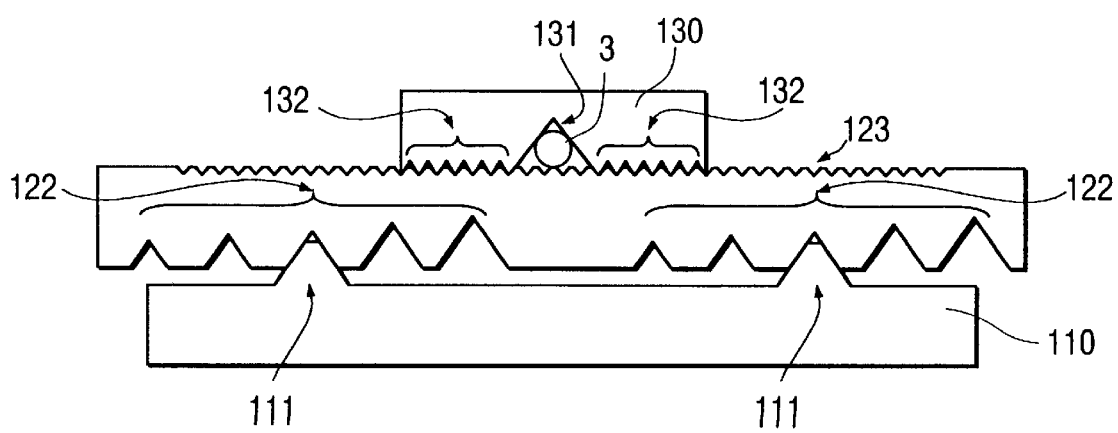
FIG. 23B is a schematic vertical side view of the optical coupler connected with the optical fiber, shown in FIG. 23A.

FIG. 23A is a schematic perspective view illustrating the ninth preferred embodiment obtained by combining the seventh and the eighth preferred embodiments. FIG. 23B is a side elevation viewed from the axial direction of the optical fiber 3. In FIGS. 23A and 23B, the same reference numerals designate the same parts as in FIGS. 21 and 22A. Materials of the block and substrates and formation of the grooves are the swine as those of the eighth and the ninth preferred embodiment respectively. Different from the seventh preferred embodiment (FIG. 21), the grooves 122 in the ninth preferred embodiment (FIGS. 23A and 23B) are formed so that the grooves 122 have respective, different depths and an interval between adjacent grooves in each of the sets is an integer multiple of the pitch of the grooves 123. Herein, the respective ones of the grooves 122 in the sets form a plurality of pairs of the grooves 122, each pair having the same interval, or spacing, as that of the guide rails 111.

By virtue of giving different depths to the grooves 122 as described above, the optical axis of the optical fiber 3 can be changed vertically in position, which allows the axis of the optical fiber 3 to be adjusted vertically relative to the waveguide 300. Furthermore, the same as the eighth preferred embodiment, the optical fiber 3 can be moved horizontally by shifting the block 130 horizontally on the grooves 123. Therefore, in the ninth preferred embodiment, a core 302 can be selected so as to be optically coupled to the laser element with the highest coupling efficiency by: first selecting the set of the grooves 122 for the vertical position adjustment of the optical fiber 3; and second shifting the block 130 on the grooves 123 for the horizontal position adjustment of the optical fiber 3.

In the sixth to the ninth preferred embodiments of the present invention, methods and means for carrying out the optical coupling, between the optical coupler and the optical fiber in the horizontal direction, have been described. However, in the sixth to the ninth preferred embodiments, it is possible to adjust the optical fiber in the vertical direction. Since each groove 122 has inclined surfaces, when the interval of the grooves 122 is changed, for example, the height of the substrate 120 is changed. That is, if the interval of the grooves 122 is made small, the height of the substrate 120 increases and, if the interval of the grooves 122 is made large, the height of the substrate 120 decreases. In the same way, the heights of the substrates 120 and 100A can be relatively changed by varying the interval of the grooves 104, allowing the adjustment of the relative heights between the optical fiber 3 and the cores 302 of the waveguide 300.

In the same manner as the above, it is possible to adjust the optical fiber 3 and the cores 302 of the waveguide 300 in the vertical direction. FIGS. 24A, 24B and 25 to 31 show preferred embodiments for carrying out the axis alignment in the vertical direction.

Figure 24A:
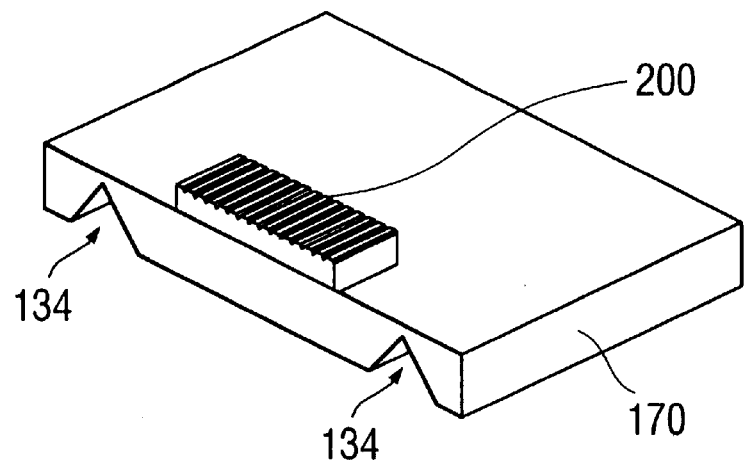
FIG. 24A is a schematic perspective view of a semiconductor laser mounted on a substrate having grooves.
Figure 24B:
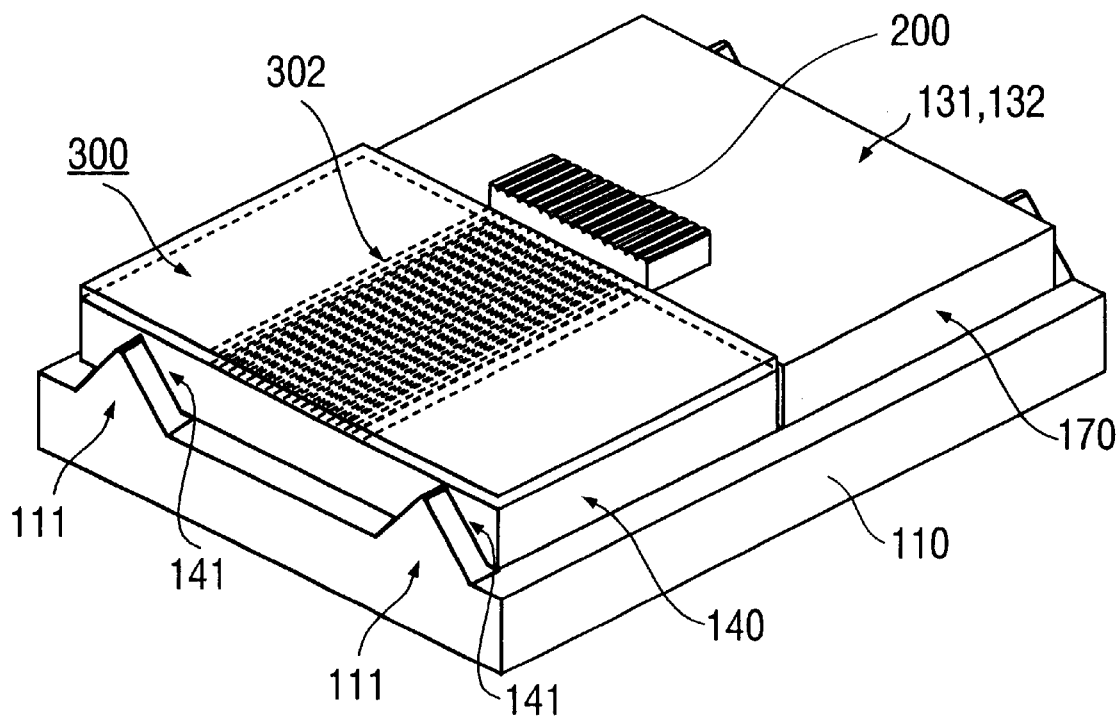
FIG. 24B is a schematic perspective view of an optical coupler including the semiconductor laser shown in FIG. 24A, mounted on a substrate, in accordance with a tenth preferred embodiment of the present invention.

FIG. 24B is a schematic perspective view illustrating an optical coupler of a tenth preferred embodiment of the present invention, obtained by modifying the second preferred embodiment (FIG. 15), taking into consideration the structure of the sixth preferred embodiment (FIG. 20A). FIG. 24A is a schematic perspective view of the semiconductor laser 200 to be mounted on the common substrate 110 of the optical coupler shown in FIG. 24B. In FIGS. 24A and 24B, the same reference numerals as in FIGS. 15 and 20A designate the same parts as in FIGS. 15 and 20A. In FIGS. 24A and 24B, the semiconductor laser 200 and the optical waveguide 300 are mounted on substrates 170 and 140, respectively. Pairs of grooves 174 and 141 are formed on bottom surfaces of the substrate 170 and 140 respectively so that the substrates 170 and 140 can be slid on the rails 111 formed on the common substrate 110.

In the tenth preferred embodiment (FIGS. 24A and 24B), the position of the cores 302 can be adjusted in the vertical direction by changing the width of the grooves 174 and 141 respectively, keeping each groove angle constant. By virtue of changing the width of the grooves 174 and 141 thus, the optical axes of the laser elements of the semiconductor laser 200 and the cores 302 of the optical waveguide 300 can be aligned in vertical direction. Furthermore, in the tenth preferred embodiment, there is a merit that the substrate 170 for bonding the semiconductor laser 200 and the substrate 140 for waveguide 300 can be fabricated independently. Therefore, if a high temperature process is required to fabricate the optical waveguide 300, the process can be handled without giving influence to the semiconductor laser 200 mounted on the substrate 170. When the substrate 120 for mounting the optical fiber 3 is combined with the optical coupler, the optical coupler of the tenth preferred embodiment can be optically coupled with the optical fiber 3, the same as in the seventh (FIG. 21), the eighth 22A and ninth preferred embodiments 23A.

Figure 25:
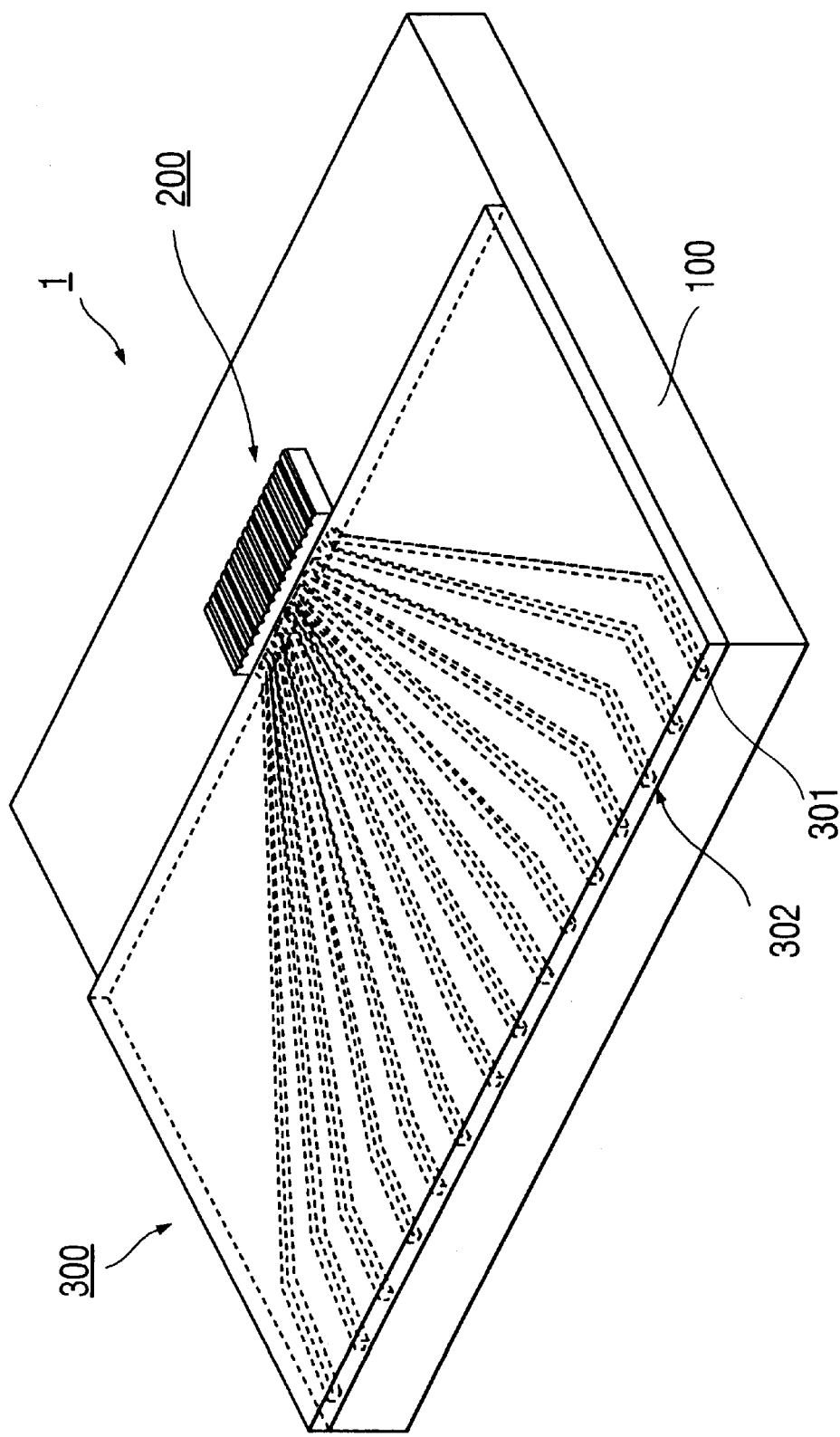
FIG. 25 is a schematic perspective view of an optical coupler including an optical waveguide having cores arranged with an enlarged pitch at an end thereof to be connected with an optical fiber, in accordance with an eleventh preferred embodiment of the present invention.

FIG. 25 is a schematic perspective view of an optical coupler for illustrating an eleventh preferred embodiment of the present invention obtained by modifying a pattern of the cores 302 in the second preferred embodiment (FIG. 15). In FIG. 25, the same reference numerals as in FIG. 15 designate the same parts as in FIG. 15. In FIG. 25, the pitch of the cores 302 is the same as in FIG. 15 at a laser side of the optical waveguide 300, however, the pitch is widened as much as 250 μm at the other side (an output side) of the optical waveguide 300 appear to be bent sharply in FIG. 25. Actually, however, they are curved smoothly. By doing thus, the axis alignment of the optical coupler and an optical fiber becomes easy to be performed as will be described with reference to FIG. 27.

Figure 26:
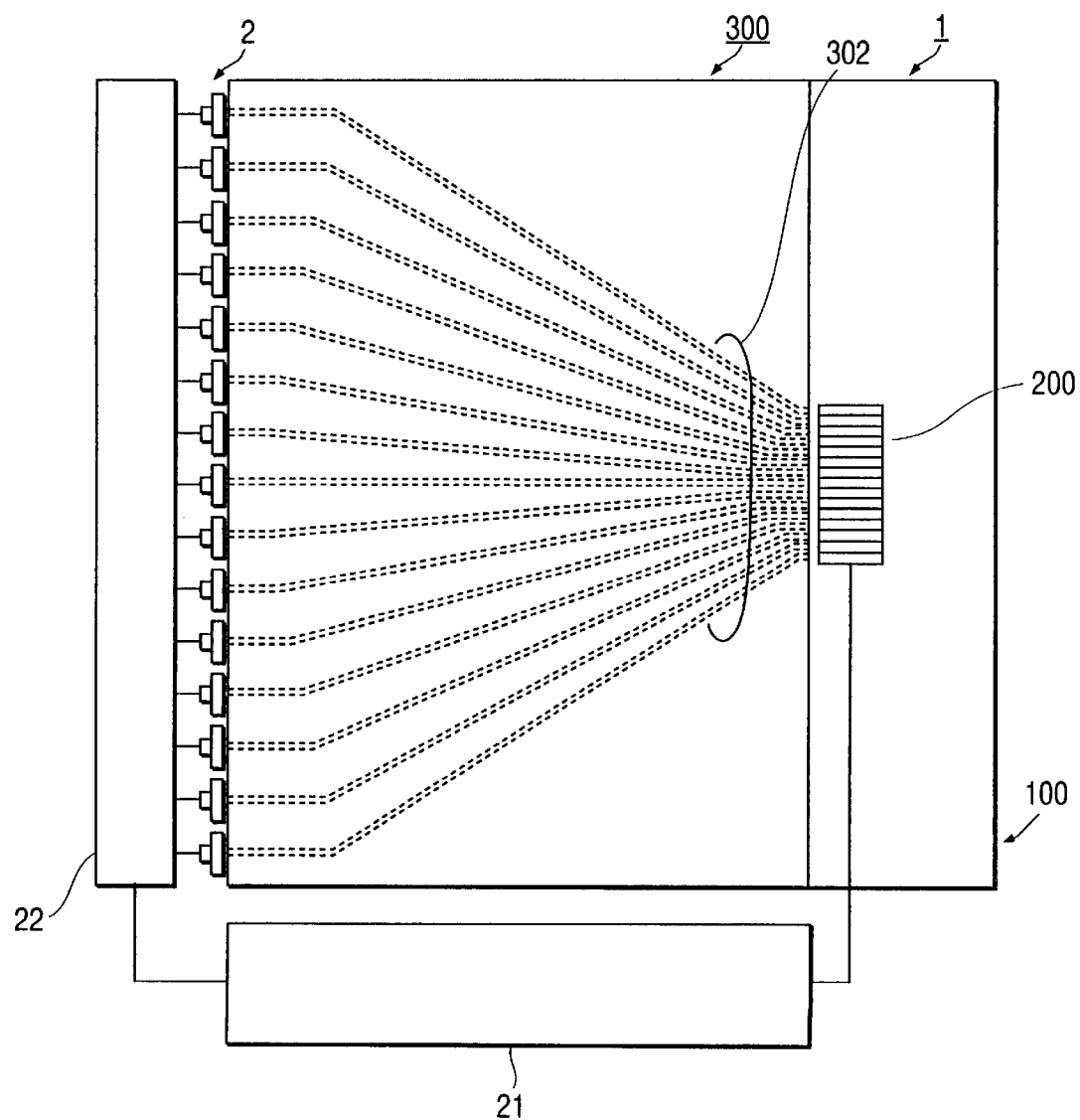
FIG. 26 is a schematic plan view of the optical coupler shown in FIG. 25 connected with a selecting system for selecting one of the coupled cores and respective laser elements, in accordance with a twelfth preferred embodiment of the present invention.

FIG. 26 is a schematic plan view illustrating a twelfth preferred embodiment of the present invention, in which the optical coupler of the eleventh preferred embodiment (FIG. 25) is optically connected with a means (selecting system) for selecting a pair of a laser element and a core optically coupled with each other at peak coupling efficiency. In FIG. 26, the same reference numerals as in FIG. 25 designate the same parts as in FIG. 25. In FIG. 26, at the output side of the cores 302, photo-diodes 2 are optically connected to the cores 302 individually, and a laser driving apparatus (21) for driving the semiconductor laser 200, in succession, and a current measuring apparatus for measuring current from the photo-diodes 2 are provided. A pair of a core 302 and a related laser element optically coupled at the highest coupling efficiency is selected by measuring the current from the photo-diodes 2 in synchronization with the drive of a laser element of the semiconductor laser 200. Since the cores 302 are arranged with a large pitch at the output end, the photo-diodes 2 can be arranged easily, which is a merit of the twelfth preferred embodiment.

After selecting a pair of the core 302 and the laser element in accordance with the twelfth preferred embodiment, the optical coupler in FIG. 26 is optically coupled to the optical fiber 3 as explained in the description of the sixth, the seventh, the eighth and the ninth preferred embodiments.

Figure 27A:
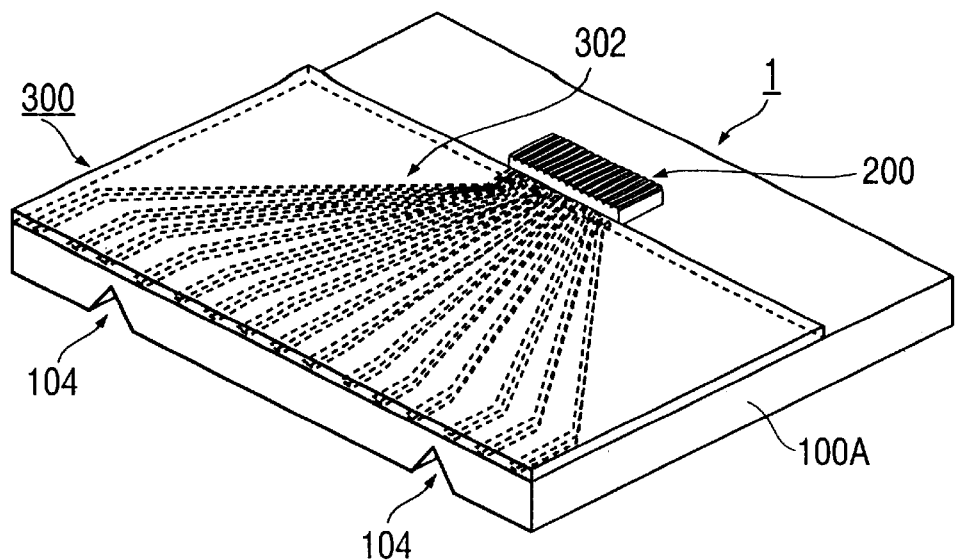
FIG. 27A is a schematic perspective view of an optical coupler such as shown in FIG. 25, but provided with grooves.
Figure 27B:
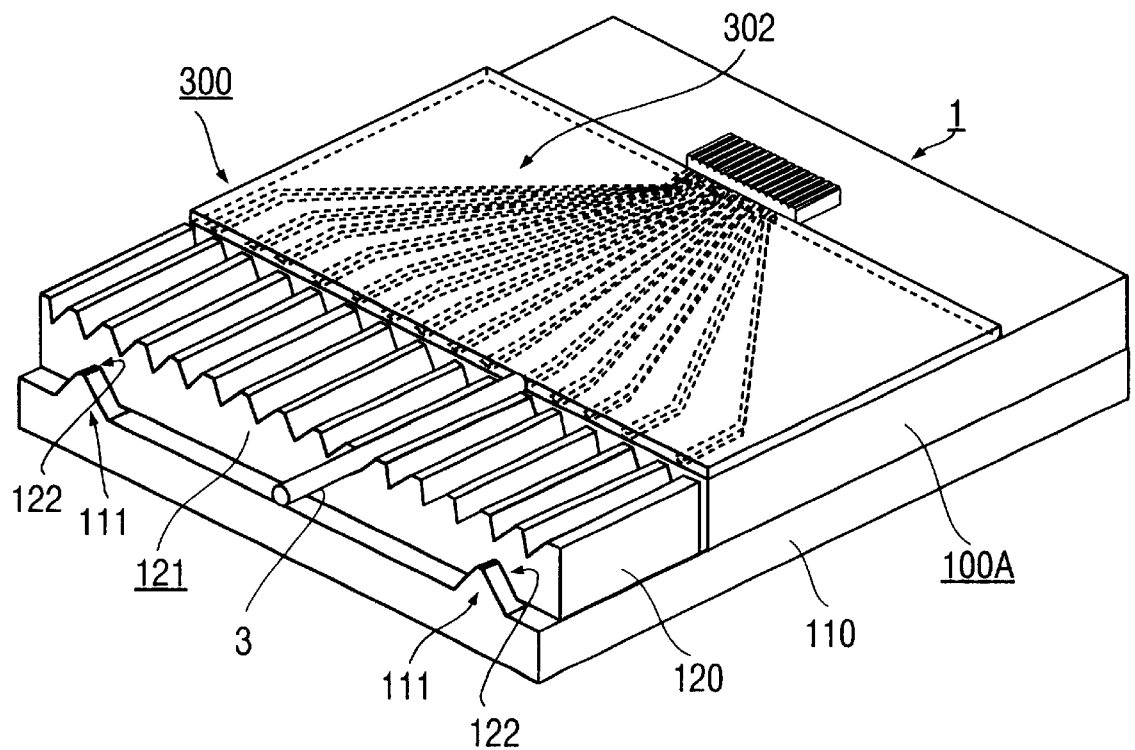
FIG. 27B is a schematic perspective view of the optical coupler shown in FIG. 27A mounted on a substrate with an optical fiber, in accordance with a thirteenth preferred embodiment of the present invention.

FIG. 27B is a schematic perspective view of a thirteenth preferred embodiment of the present invention, in which the optical coupler used in the eleventh preferred embodiment (FIG. 25) is connected with the optical fiber 3. FIG. 27A is a schematic perspective view of the optical coupler which is the same as the optical coupler in the eleventh preferred embodiment (FIG. 25), but having the grooves 104 on the bottom surface of the substrate 100A, the same as in FIG. 20A. In FIGS. 27A and 27B, the same reference numerals as in FIGS. 20A and 20B and 25 designate the same parts as in FIGS. 20A and 20B and 25. In FIGS. 27A and 27B, the rails 111 are formed on the common substrate 110, the grooves 104 are formed on the substrate 100A of the optical coupler, as shown in FIG. 27A, and the grooves 122 are formed on the substrate 120 of the optical fiber 3. As a result, the optical coupler and the optical fiber 3 can be slid on the rails 111, the same as the sixth preferred embodiment (FIG. 20B). In this thirteenth preferred embodiment (FIGS. 27A and 27B), since the pitch of the cores 302 is widened to 250 μm at the output side thereof, the interval of the grooves 121 becomes large, sufficiently so that the optical fiber 3 having a thickness of 125 μm can be mounted in the groove. As a result, there is a merit in the thirteenth preferred embodiment that the optical fiber 3 can be coupled with any one of the cores 302 by using the substrate 120, provided as a common substrate for mounting the optical fiber 3.

Figure 28A:
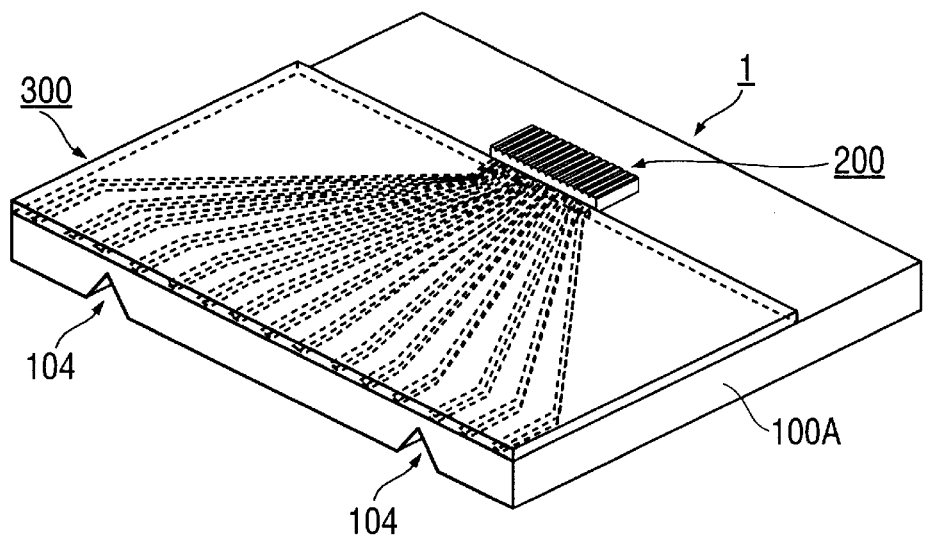
FIG. 28A is a schematic perspective view of another optical coupler such as shown in FIG. 25, but provided with grooves.
Figure 28B:
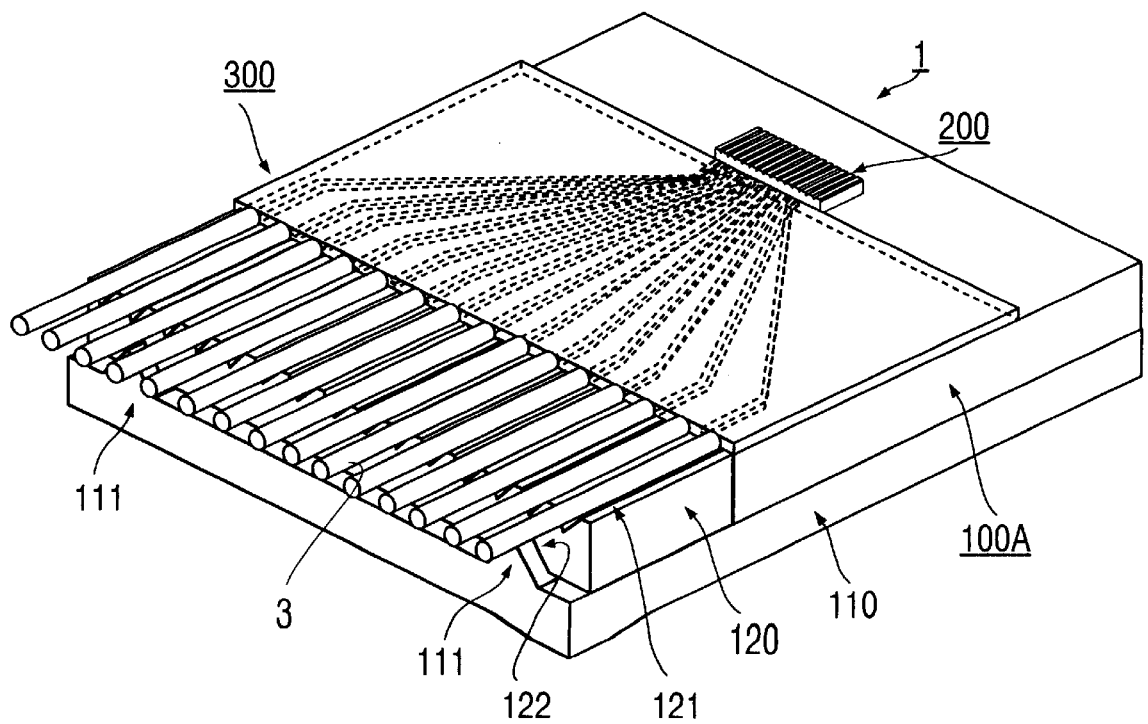
FIG. 28B is a schematic perspective view of the optical coupler shown in FIG. 28A mounted on a substrate with a plurality of optical fibers, in accordance with a fourteenth preferred embodiment of the present invention.

FIG. 28B is a schematic perspective view of a fourteenth preferred embodiment of the present invention, in which the optical coupler in the eleventh preferred embodiment (FIG. 25) is connected with a plurality of the optical fibers 3. FIG. 28A is a schematic perspective view of the optical coupler in the fourteenth preferred embodiment. This optical coupler has the same structure as the optical coupler in the thirteenth preferred embodiment has. The fourteenth preferred embodiment is similar to the thirteenth preferred embodiment except that a plurality of optical fibers 3 are previously set on the fiber guiding grooves 121. As a result, a coupled core 302 and related laser element can be selected by detecting the intensity of the light output from the optical fibers 3. In case of the fourteenth preferred embodiment, it is not necessary to prepare the optical diodes 2 and apparatus attached to the optical diodes 2 as described in the twelfth preferred embodiment (FIG. 26). Since the laser element and the core can be selected by only measuring the light output from the optical fiber, the optical coupler can be inspected simply.

Figure 29:
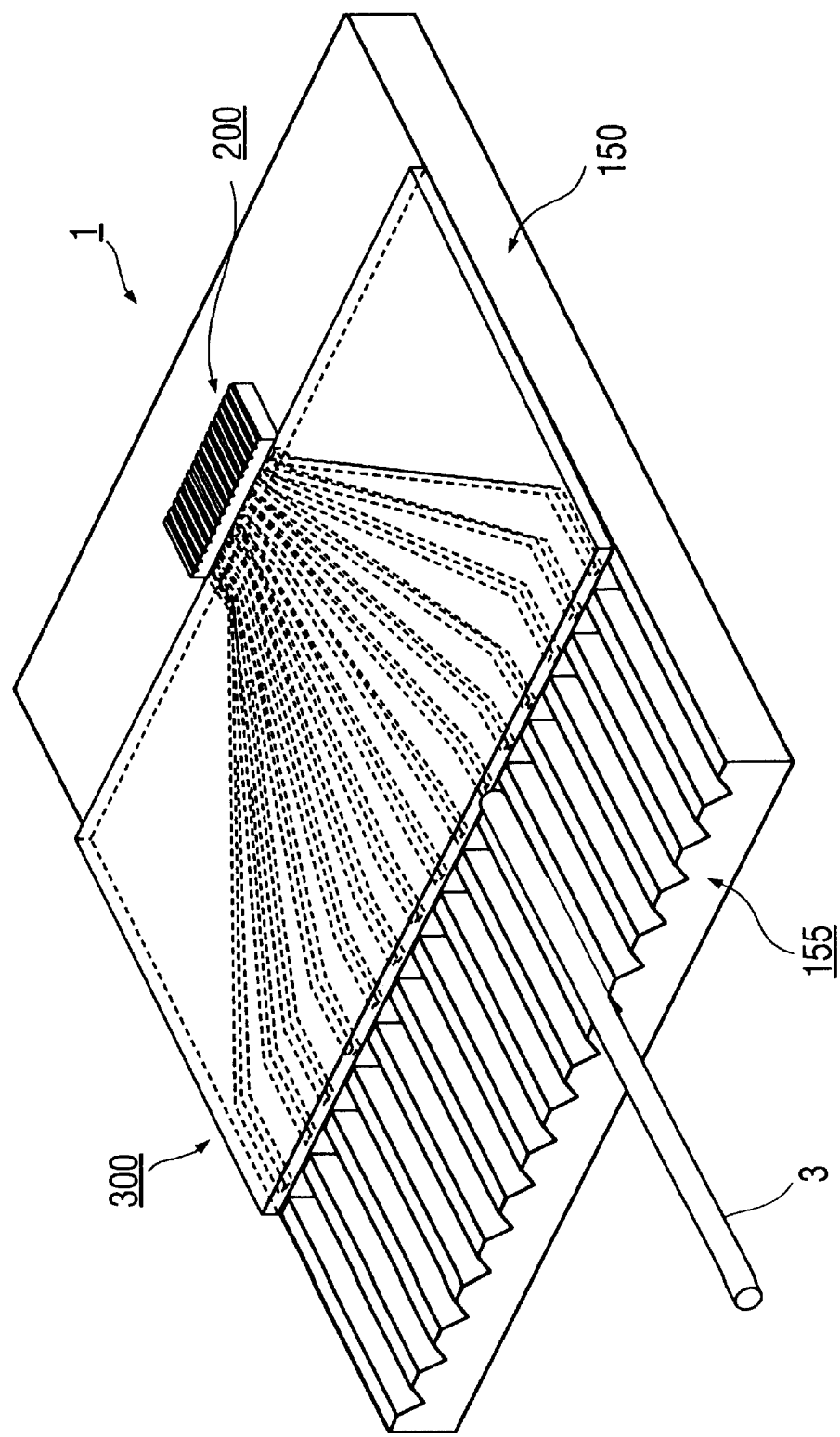
FIG. 29 is a schematic perspective view of an optical coupler of the same kind as shown in FIG. 25, but provided with grooves of the same number as cores, for mounting an optical fiber, in accordance with a fifteenth preferred embodiment of the present invention.

FIG. 29 is a schematic perspective view for illustrating a fifteenth preferred embodiment of the present invention, obtained by modifying the thirteenth preferred embodiment (FIG. 27). In the FIG. 29, the same reference numerals as in FIG. 27 designate the swine parts as in FIG. 27. In the fifteenth preferred embodiment, a common substrate 150 having fiber guiding grooves 155 is used for the optical coupler and the optical fiber 3 instead of using separated substrates 120 and 100A as shown in FIG. 27. By virtue of using only the common substrate 150, there is no necessity to perform position adjustment between the substrates for the optical coupler and the optical fiber. The fifteenth preferred embodiment (FIG. 29) has a merit that the structure thereof becomes simple since the fiber guiding grooves 155 can be formed precisely so as to sufficiently decrease the positioning deviation between the optical fiber 3 and the core 302.

Figure 30:
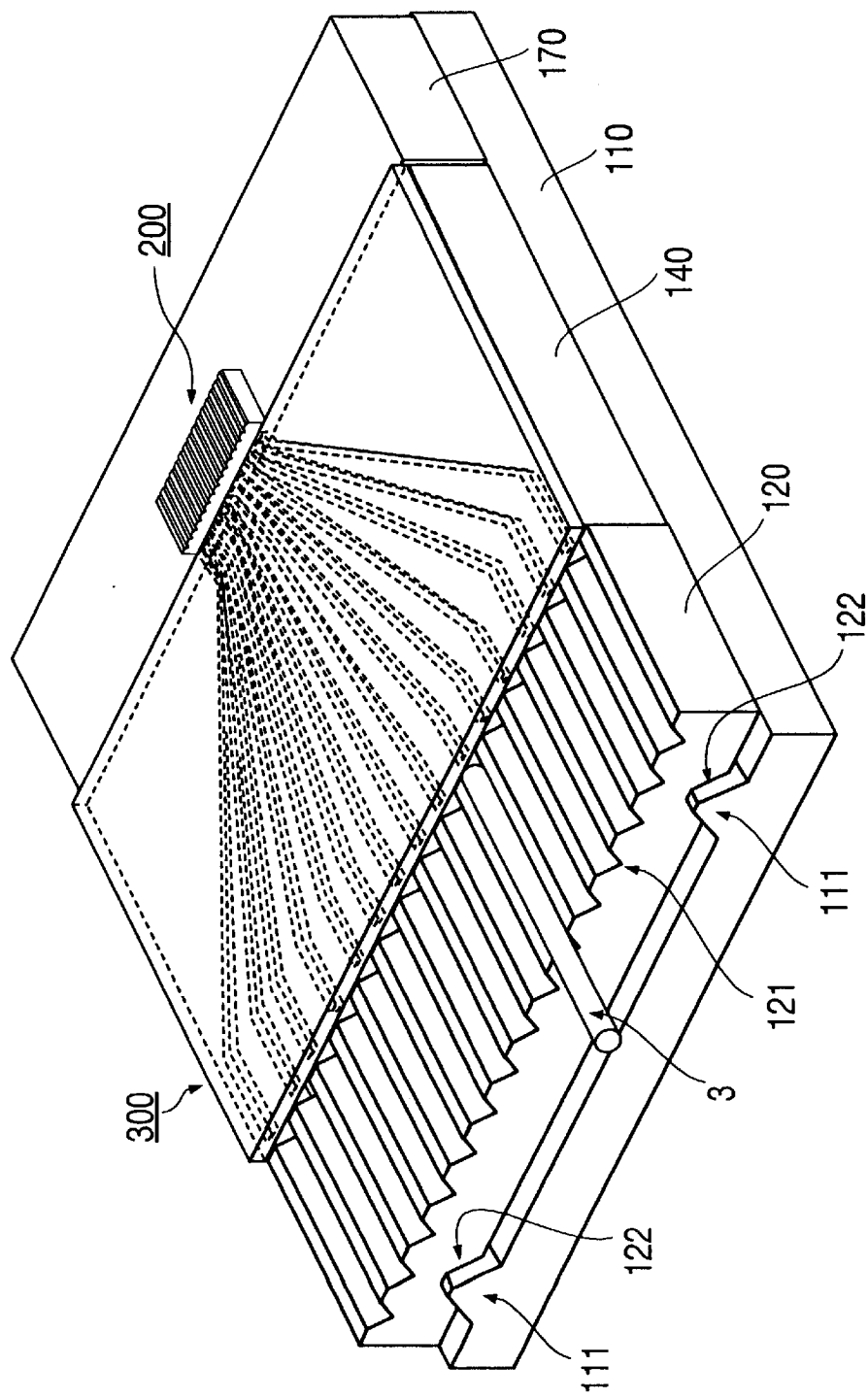
FIG. 30 is a schematic perspective view of an optical coupler of the same kind as shown in FIG. 25, mounted on a common substrate with grooves for mounting an optical fibers, in accordance with a sixteenth preferred embodiment of the present invention.
Figure 31:
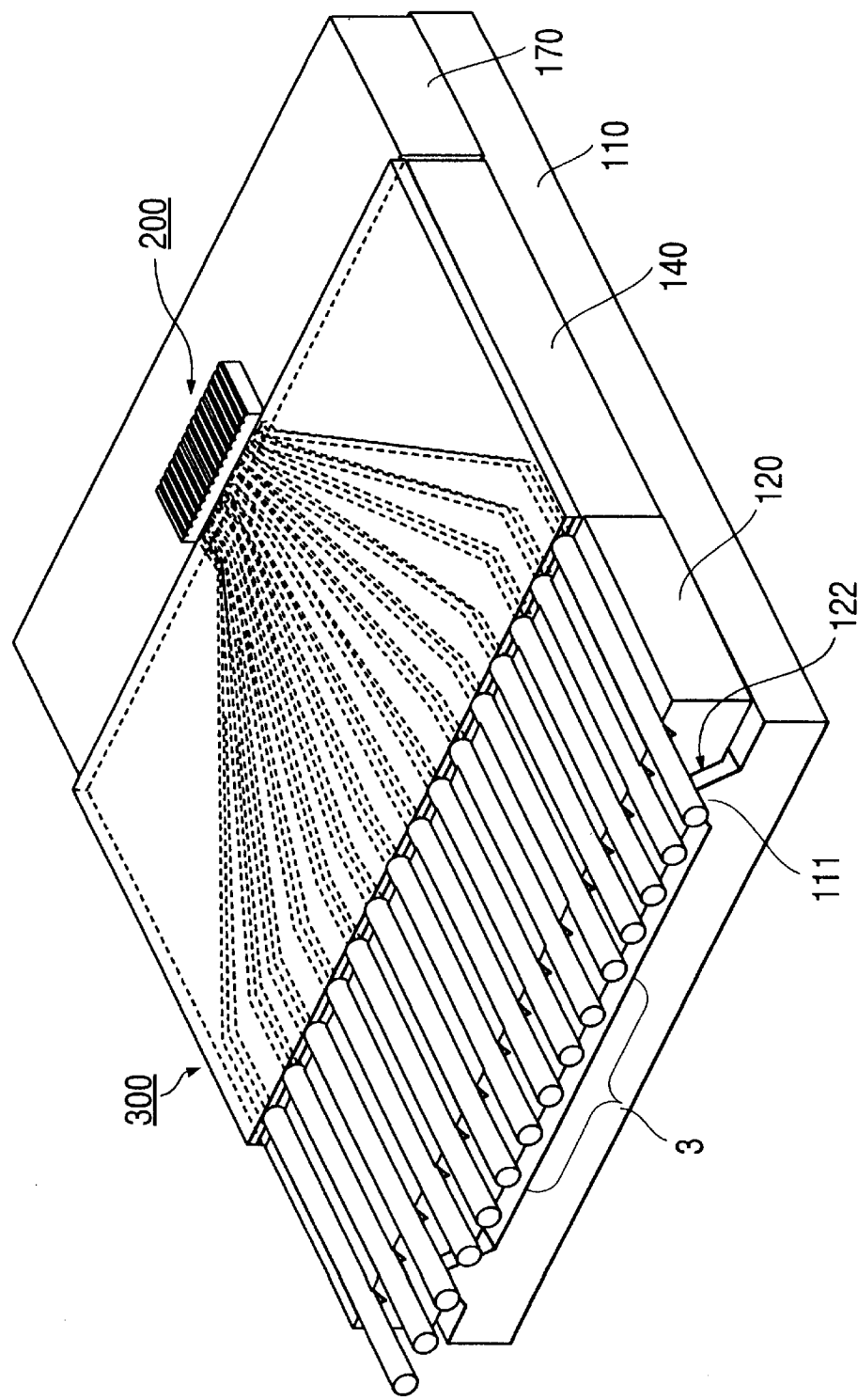
FIG. 31 is a schematic perspective view of the optical coupler shown in FIG. 30, mounted on a common substrate with grooves for mounting a plurality of optical fibers, in accordance with a seventeenth preferred embodiment of the present invention.

FIGS. 30 and 31 are schematic perspective views for illustrating a sixteenth and a seventeenth preferred embodiment of the present invention respectively. The sixteenth preferred embodiment and the seventeenth preferred embodiment are obtained by modifying the thirteenth preferred embodiment (FIG. 27B) and the fourteenth preferred embodiment (FIG. 28B), respectively. In FIG. 30, the same reference numerals as in FIGS. 24B and 27B designate the same parts as in FIGS. 24B and 27B, and in FIG. 31, the same reference numerals as in FIGS. 24B and 28B designate the same parts as in FIGS. 24B and 28B. In the sixteenth and the seventeenth preferred embodiments (FIGS. 30 and 31), the semiconductor laser 200 and the optical waveguide 300 are respectively formed on the substrates 170 and 140, both capable of sliding on the rails 111 formed on the common substrate 110 as in the tenth preferred embodiment. (FIG. 24B). By doing so, the sixteenth preferred embodiment has the swine merits as the tenth and the thirteenth preferred embodiment, and the seventeenth preferred embodiment has the same merits as the tenth and the fourteenth preferred embodiment. In the optical couplers of the sixteenth and the seventeenth preferred embodiment, the same as the tenth preferred embodiment (FIG. 24B), the vertically positioning for the optical fiber can be performed. In the sixteenth preferred embodiment (FIG. 30) and the seventeenth preferred embodiment (FIG. 31), since the rails 111 and the grooves 141 (not depicted in FIGS. 30 and 31, but formed on the bottom surface of the substrate 140) have inclined faces respectively, and if, for example, the width of the grooves 141 is changed, the height of the upper surface of the substrate 140 from the upper surface of the common substrate 110 is changed. Describing this more concretely, the height of the substrate 140 is increased by narrowing the width of the grooves 141 and decreased by widening the width of the grooves 141, as far as the angles made by the inclined faces of the grooves 141 and the rails 111 are kept constant. The same as the height of the substrate 140, the height of the substrate 170 can be changed by changing the width of the grooves 174, not depicted in FIG. 30, formed on the substrate 170. That is, the relative height of the optical waveguide 300 and the semiconductor laser 200 can be adjusted by changing the width of the grooves 141 and/or 174.

Figure 32:
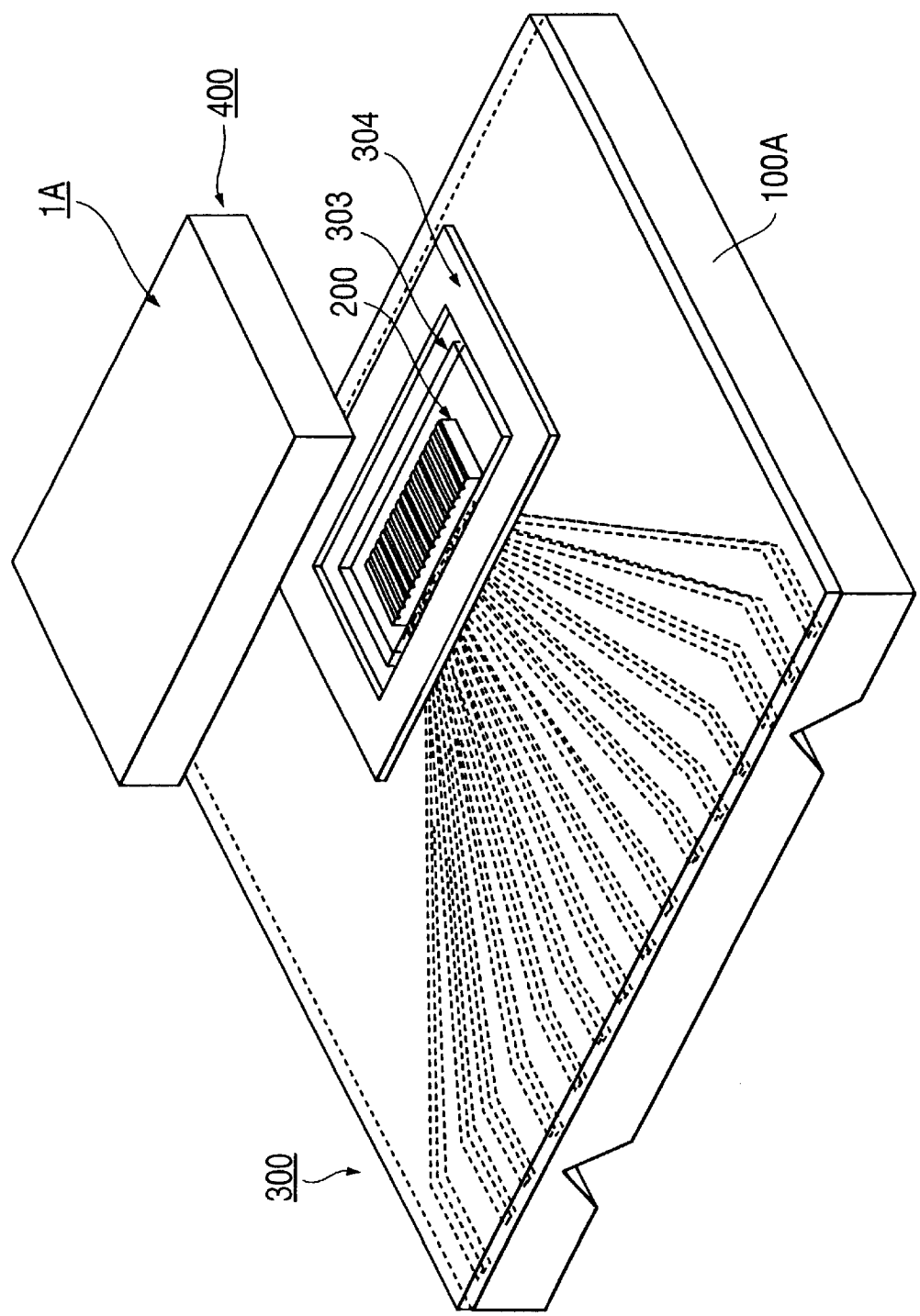
FIG. 32 is a schematic perspective view of an optical coupler of the same kind as shown in FIG. 25, including an air-tightened semiconductor laser, having grooves, in accordance with eighteenth preferred embodiment of the present invention.

FIG. 32 is a schematic perspective view of the optical coupler 1A, for illustrating an eighteenth preferred embodiment of the present invention. The eighteenth preferred embodiment is obtained by modifying the eleventh preferred embodiment (FIG. 25) so that the optical coupler 1A consists of the air-tightened (i.e., hermetically sealed) semiconductor laser 200 and the optical waveguide 300 having the cores 302 arranged in a pitch which gradually increases as the cores 302 come up to the end of the optical coupler 1A, the same as the optical waveguide 300 in the eleventh preferred embodiment. In FIG. 32, the same reference numerals as in FIGS. 17A and 25 designate the same parts as in FIGS. 17A and 25. In FIG. 32, the structure and the fabrication method of the hermetically sealed semiconductor laser 200 is the same as those in the third preferred embodiment (FIGS. 17A and 17B).

Figure 33:
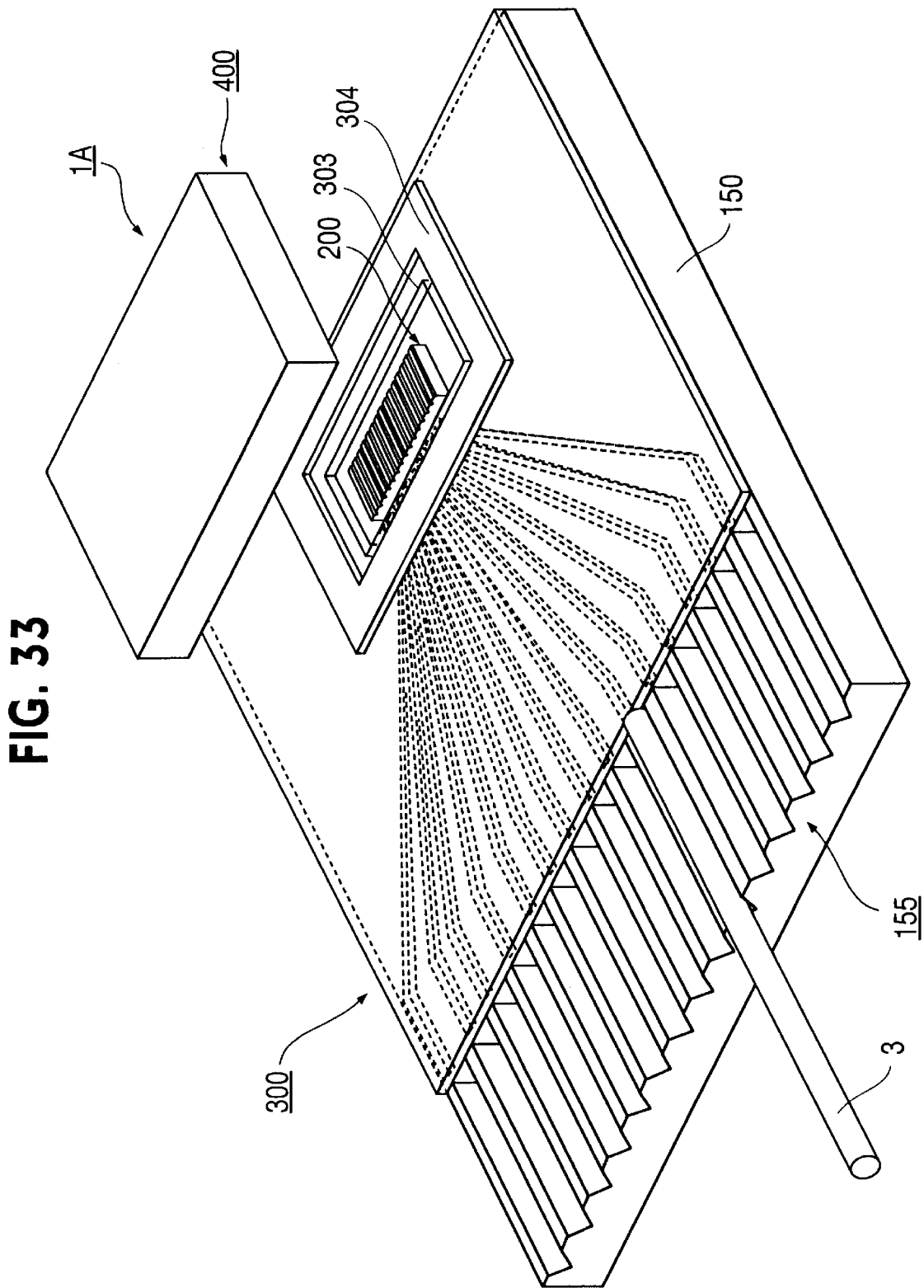
FIG. 33 is a schematic perspective view of an optical coupler provided with grooves for mounting an optical fiber, in accordance with a nineteenth preferred embodiment of the present invention.

FIG. 33 is a schematic perspective view of the optical coupler 1A coupled with the optical fiber 3, for illustrating a nineteenth preferred embodiment of the present invention. The nineteenth preferred embodiment is obtained by applying the hermetically sealed semiconductor laser 200 to the fifteenth preferred embodiment (FIG. 29). In FIG. 33, the same numerals as in FIG. 29 designate the same parts as in FIG. 29. The feature of the nineteenth preferred embodiment is the same as that of the fifteenth preferred embodiment.

The same as the case of the optical axis alignment of the optical coupler and optical fiber described above, the vertical direction adjustment is important for optical axis alignment of both of the semiconductor laser 200 and the optical waveguide 300 in the optical coupler. FIGS. 34 to 43 illustrate means to perform the optical axis alignment in the vertical direction, of the semiconductor laser and the optical waveguide in the optical coupler. The optical axis alignment in the vertical direction will be simply called "axis vertical alignment" hereinafter.

Figure 34:
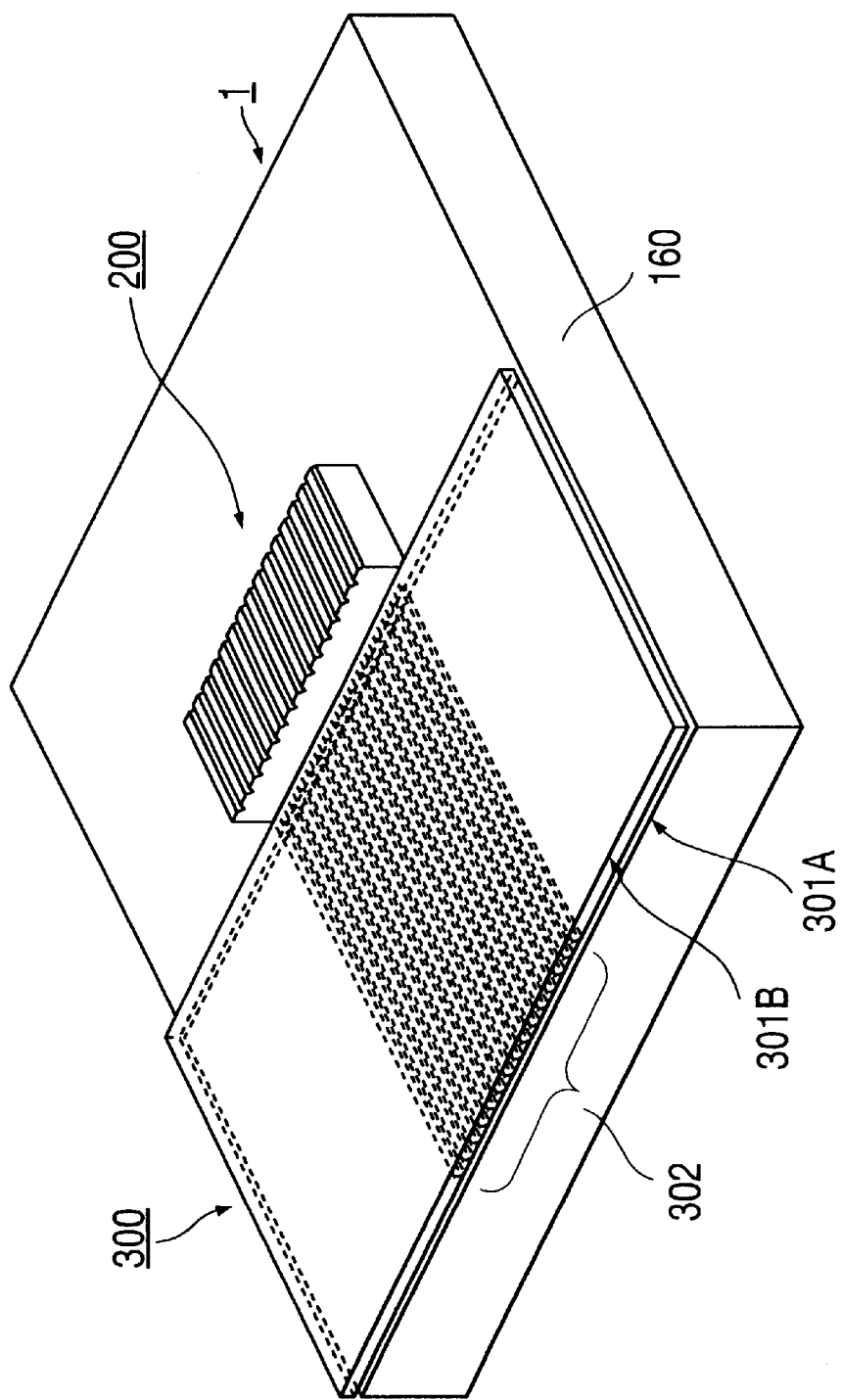
FIG. 34 is a schematic perspective view of an optical coupler having a quartz substrate and a thin under-cladding layer, in accordance with a twentieth preferred embodiment of the present invention.

FIG. 34 is a schematic perspective view illustrating the optical coupler 1 of a twentieth preferred embodiment of the present invention. In FIG. 34, the same reference numeral as in FIG. 15 designates the same part as in FIG. 15. In FIG. 34, the optical coupler 1 consists of a substrate 160 made of quartz and the optical waveguide 300 and the semiconductor laser 200 formed on the substrate 160. The optical waveguide 300 is composed of the under-cladding layer 301A the cores 302 and the over-cladding layer 301B. The refractive index of the substrate 160 is 1.46 and that of the under-cladding layer 301A and the over-cladding layer 301B is 1.55 respectively, and the relative refractive index difference between the over-cladding layer 301B and the core 302 and between the under-cladding layer 301A and the core 302 is 0.5%. Polyimide is used for the cladding layers 301A and 301B and the cores 302.

Figure 12A:
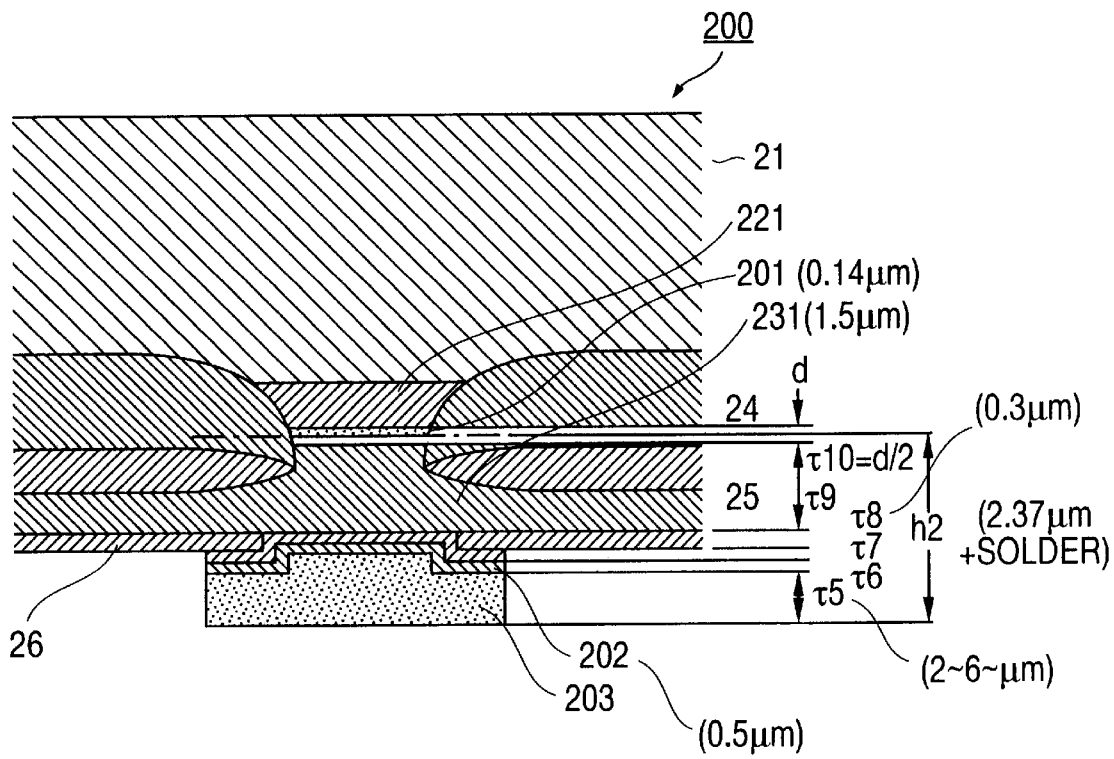
FIG. 12A is a partial vertical section of a semiconductor laser intended to be bonded.
Figure 12B:
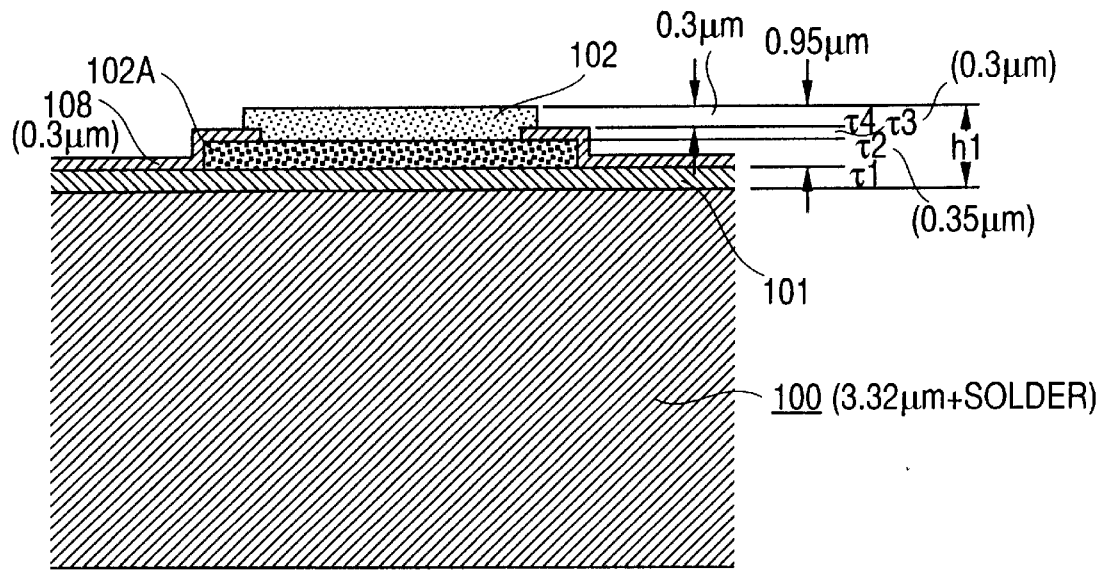
FIG. 12B is a partial vertical section of a bonding pad formed on a substrate, ready to be fixed with the semiconductor laser shown in FIG. 12A, by bonding.

In the twentieth preferred embodiment, since the under-cladding layer 301A can be thinned because of the small refractive index of the substrate 160, a height of the cores 302 from the upper surface of the substrate 160 can be adjusted so as to coincide with a height of the laser element. When the thickness of the under-cladding layer 301A is set to 4 $\mu$m and that of the cores 302 is set to 5 $\mu$m, the height, which becomes 6.5 $\mu$m in this case, of the optical axes of the cores 302 can be made equal to the height, which is 5.32 $\mu$m–9.32 $\mu$m, of the optical axes of the laser elements. In this case, since the height of the optical axes of the cores 302 is as low as 6.5 $\mu$m, a difference between the height of the cores 302 and the height of the laser elements becomes so small as less than ±0.4 $\mu$m which is smaller than a positional deviation allowed in the optical coupler. When the thickness of the solder bump 203, not depicted in FIG. 34 but shown in FIG. 12A, is changed, the height of the semiconductor laser 200 can be adjusted. Describing this more concretely, when the thickness of the solder bump 203 is adjusted to be within the range of 2~6 $\mu$m, the height of the laser 200 can be changed within the range of 5.32~9.32 $\mu$m. Therefore, if the thickness of the solder bump 203 is adjusted to 3.18 $\mu$m for example, the height of the semiconductor laser 200 becomes 6.5 $\mu$m, which results in making the height of the laser elements equal to the height of the core 302. For information to the above example. since ±5% fabrication error must be allowed for forming the core 302 and the laser element, the fabrication error on the height of the core 302 is less than 0.4 $\mu$m (more correctly, 0.325 $\mu$m) and the fabrication error on the height of the laser element is also 0.325 $\mu$m. As a result, the total fabrication error on the height of the core 302 and the laser element becomes 0.65 $\mu$m. The value of 0.65 $\mu$m is smaller than the allowable error for the optical axis alignment. The allowed positional deviation is ±1 $\mu$m, so that required coupling efficiency can be obtained even though there are some errors in manufacturing. The twentieth preferred embodiment is effective not only as to the axis vertical alignment of the arrays of the laser element and the cores but also as to the axis vertical alignment of a single laser element and core as shown in FIG. 35.

Figure 35:
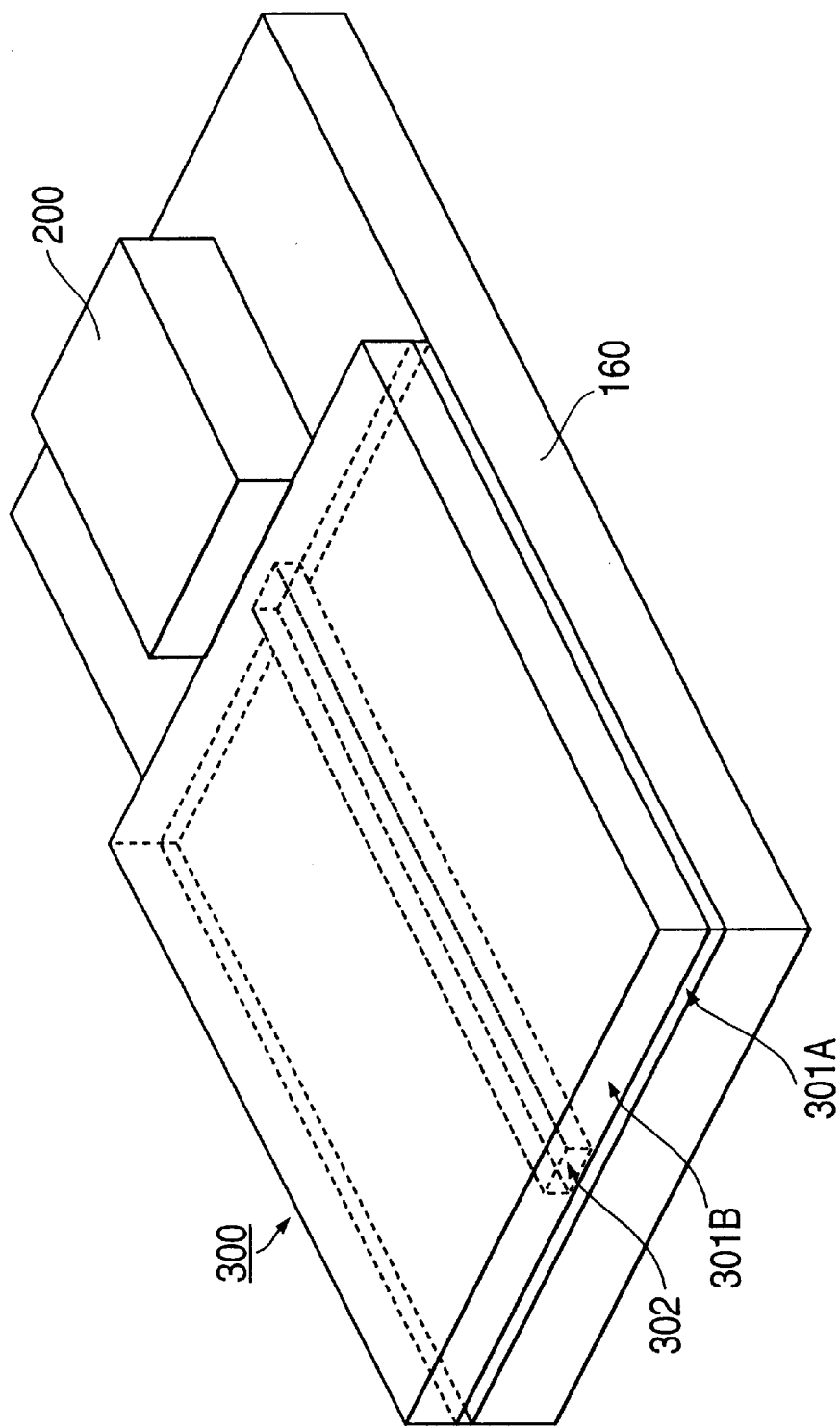
FIG. 35 is a schematic perspective view of an optical coupler including a single laser element and core, in accordance with a twenty first preferred embodiment of the present invention;.

FIG. 35 is a schematic perspective view of an optical coupler of a twenty-first preferred embodiment of the present invention, including a single laser element and core. In the twenty first preferred embodiment, the axis vertical alignment of the laser element and core can be performed easily by controlling a fabrication process of the optical coupler. In FIG. 35, the same reference numerals as in FIG. 34 designate the same parts as in FIG. 34. In FIG. 35, the optical coupler consists of the common substrate 160, the semiconductor laser 200 having a single laser element and the optical waveguide 300 having a single core 302. The optical waveguide 300 is fabricated by forming the under-cladding layer 301A, the core 302 and the over-cladding layer 301B on the common substrate 160. The refractive indices of the common substrate 160, the under-cladding layer 301A and the over-cladding layer 301B are same as in the twentieth preferred embodiment (FIG. 34), and the relative refractive index differences between the under-cladding layer 301A and core 302 and between the over-cladding layer 301B and the core 302 are also the same as in the twentieth preferred embodiment.

Figure 36:
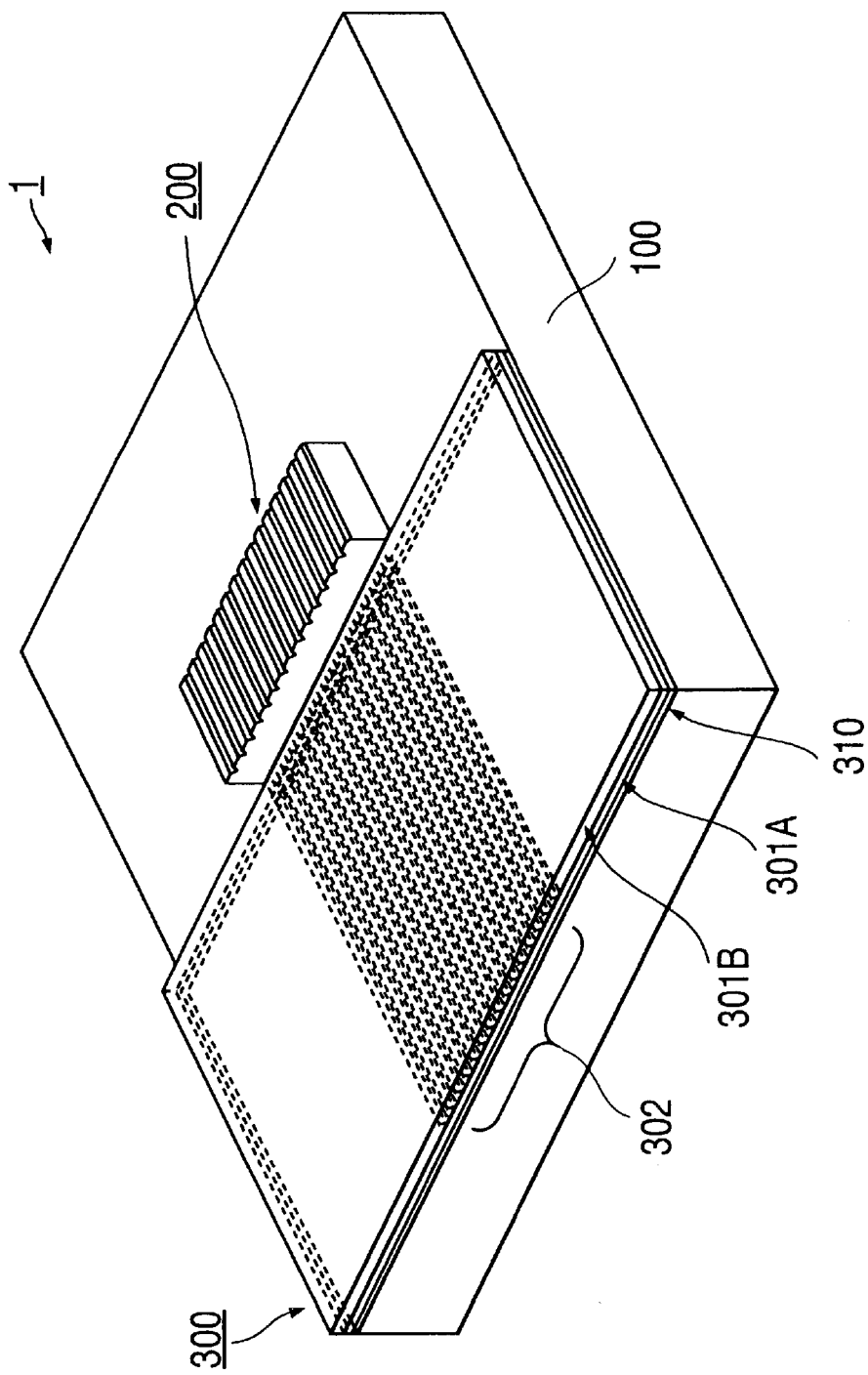
FIG. 36 is a schematic perspective view of an optical coupler including a buffer layer, in accordance with a twenty second preferred embodiment of the present invention.

FIG. 36 is a schematic perspective view of the optical coupler 1 including the arrayed laser elements and cores, for illustrating a twenty-second preferred embodiment of the present invention. In the twenty-second preferred embodiment, the axis vertical alignment of the arrayed laser elements and cores can be performed easily. In FIG. 36, the same reference numeral as in FIGS. 15 and 34 designates the same part as in FIGS. 15 and 34.

In FIG. 36, the substrate 100 is made of silicon, the silicon dioxide layer 101 is formed on the substrate 100 in 2 $\mu$m thickness, a buffer layer 310 is formed on the silicon dioxide layer 101, and the optical waveguide 300 consisting of the under-cladding layer 301A, the core 302 and the over-cladding layer 301B is formed on the buffer layer 310. The bonding pads and the wiring pattern, which are not depicted in FIG. 36, are formed on the silicon dioxide layer 101. The silicon dioxide layer 101 is formed by thermally oxidizing the entire upper surface of the substrate 100 to a 2 $\mu$m thickness. The buffer layer 310 is partially formed on the thermal oxide layer 101 in a 3.2 $\mu$m thickness so as to be only under the optical waveguide 300, by conventional CVD (Chemical Vapor Deposition) method.

In the optical waveguide 300, the refractive indices of the under-cladding layer 301A and the over-cladding layer 301B are each 1.55, the relative refractive index difference between the under-cladding layer 301A (or the over-cladding layer 301B) and the core 302 is 0.5%, the cross sectional size of each of the cores 302 is 6 $\mu$m×6 $\mu$m, and the thickness of the under-cladding layer 301A is 2 $\mu$m. The refractive index of the buffer layer 310 is equal to or less than that of the under-cladding layer 301A.

Figure 37A:
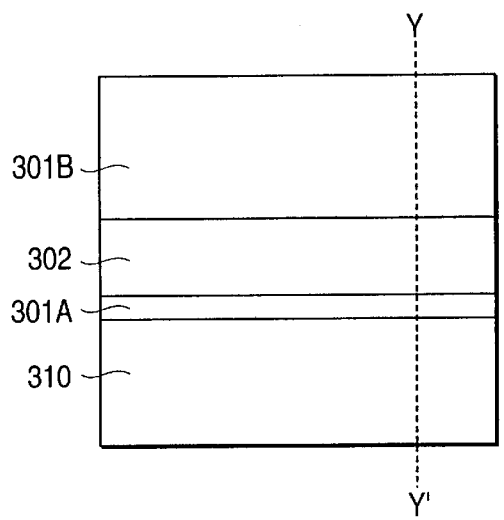
FIG. 37A is a schematic diagram of slab structure in the optical coupler shown in FIG. 36.
Figure 37B:
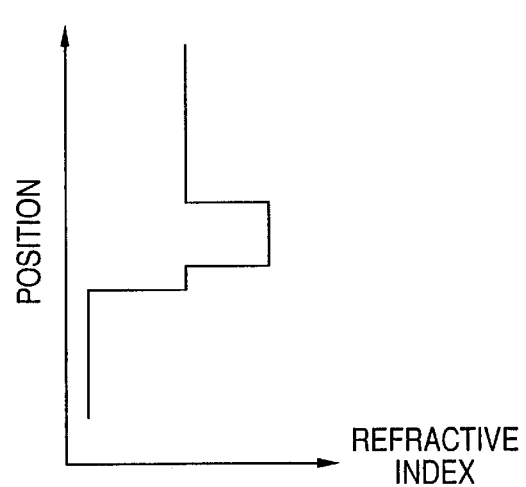
FIG. 37B is a graph for showing a refractive index change appearing across the slab structure shown in FIG. 37A.
Figure 38:
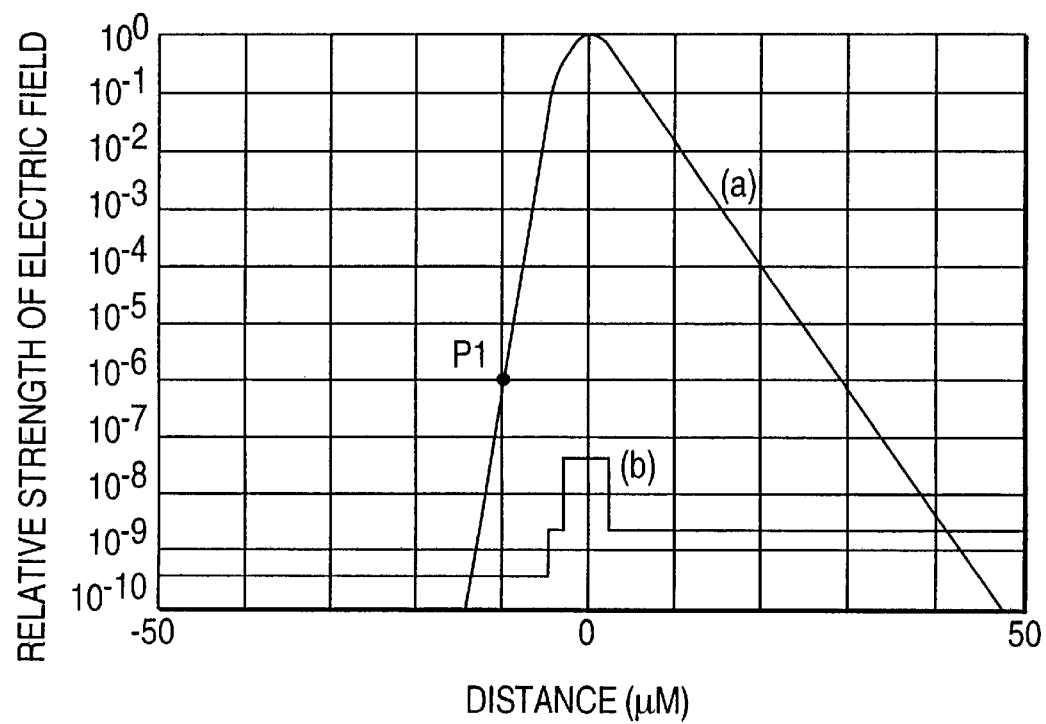
FIG. 38 is a graph for showing electric field strength change appearing across the slab structure, in accordance with a feature of the twenty second preferred embodiment described with reference to FIG. 36.

Since the refractive index of the buffer layer 310 is equal to or lower than that of the under-cladding layer 301A, the intensity of the electric field is steeply decreased at the substrate 100, which will be explained with reference to FIGS. 37A, 37B and 38. FIG. 37A shows the layer structure of the optical waveguide 300 in the twenty-second preferred embodiment. The layer structure will be simply called "slab structure" hereinafter for convenience. In FIG. 37A, reference numeral 310, 310A, 302 and 310B correspond to the buffer layer, the under cladding layer, the core and the over cladding layer respectively. FIG. 37B shows distribution of partial refractive indices appearing at every position on Y-Y' line in FIG. 37A. FIG. 38 is a graph showing relationship between the electric field and the refractive indices in the slab structure of the optical waveguide. In FIG. 38, the horizontal axis indicates distance from the core 302, curve (a) shows the strength distribution of electric field (relative value) appearing along the line Y-Y' line in FIG. 37A, curve (b) shows distribution of the refractive indices the same as in FIG. 37B, and point P1 on the curve (a) indicates the position where the relative strength of the electric field becomes $10^{-6}$ at the side toward the substrate 100 from the core 302.

Figure 61B:
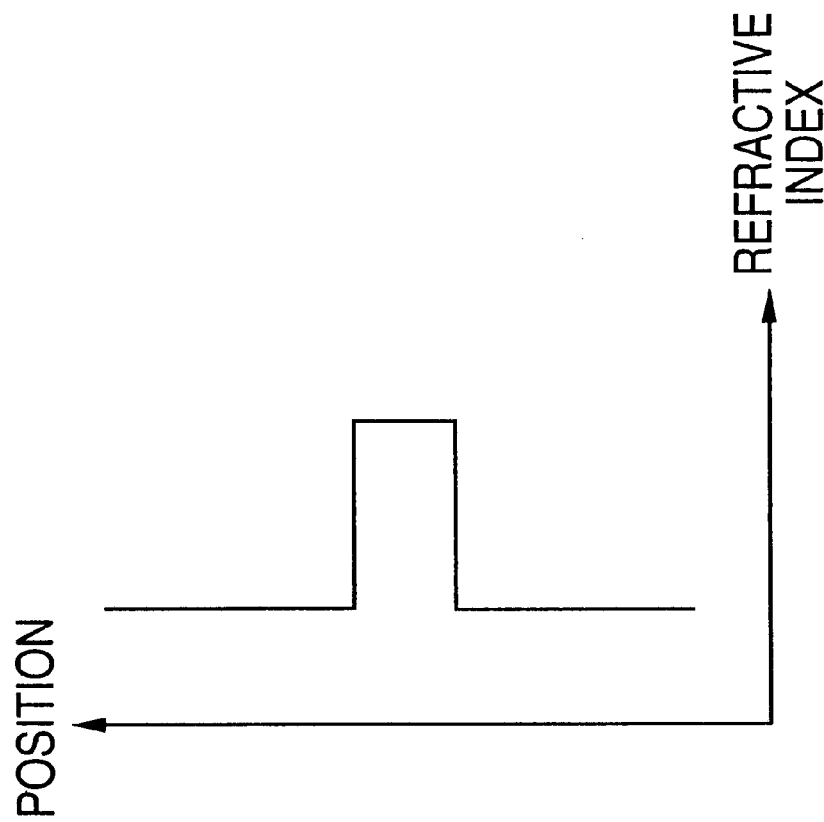
FIG. 61B is a graph for showing a refractive index distribution appearing across the slab structure shown in FIG. 61A.
Figure 61A:
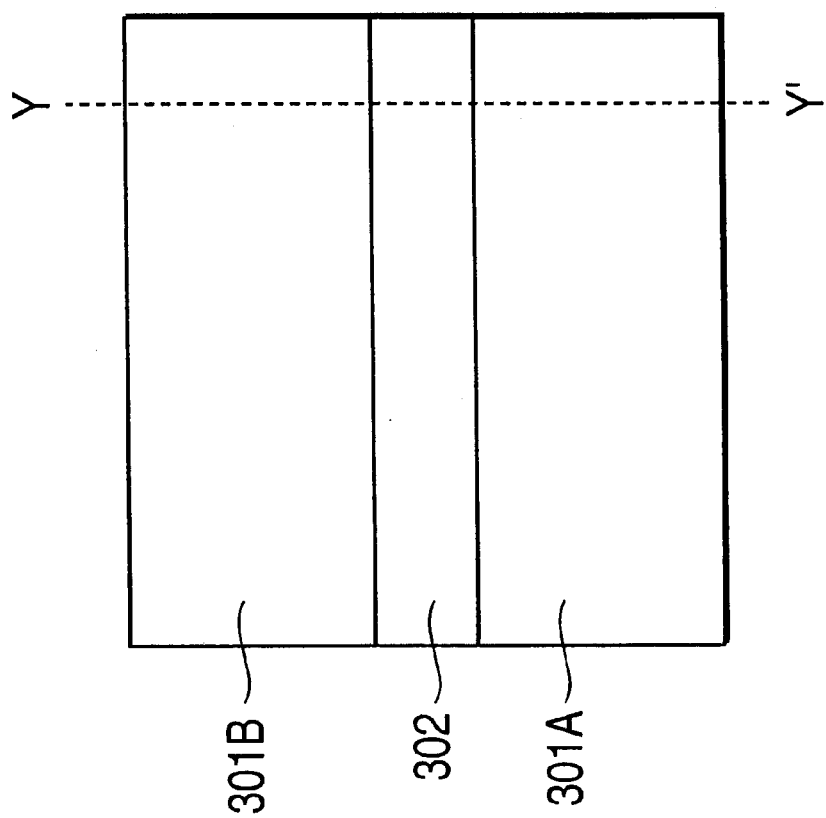
FIG. 61A is a schematic diagram of slab structure of layers, including no buffer layer, of the optical coupler shown in FIG. 34.
Figure 62:
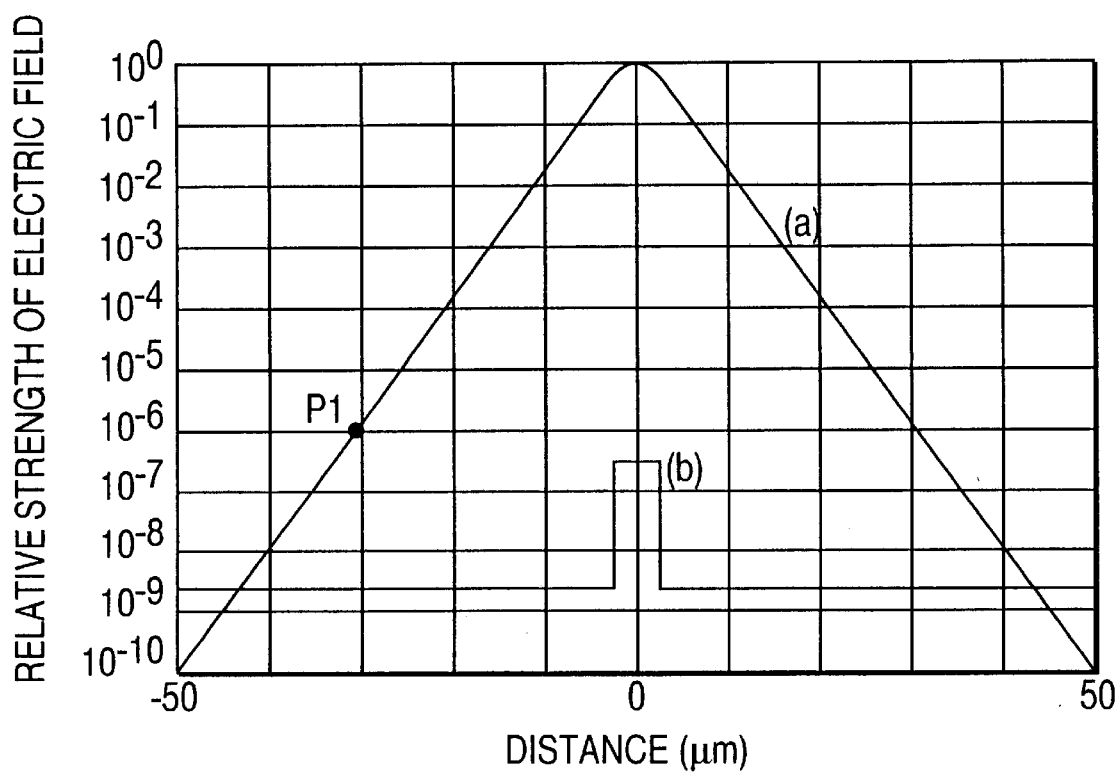
FIG. 62 is a graph for showing distribution of electric field strength distribution and the refractive index distribution across the slab structure shown in FIG. 61A.

As seen from the graph in FIG. 38, even though the under-cladding layer 301 is thin, as shown in FIG. 36, the propagation loss of light guided through the optical waveguide 3 is decreased because the leakage of the electric field due to the light decreases. This phenomenon will be realized clearly by comparing with the phenomenon occurring in an ordinary slab structure haring no buffer layer. FIG. 61A shows the ordinary slab structure of the optical waveguide 3, the same as that in the twenty-second preferred embodiment (FIG. 36). In FIG. 61A, reference numerals 301A, 302 and 310B correspond to the under cladding layer, the core and the over cladding layer respectively. FIG. 61B shows distribution of the refractive indices appearing on Y-Y' line in FIG. 61A. FIG. 62 is a graph showing relationship between the electric field and the refractive indices in the slab structure having no buffer layer. In FIG. 62, curve (a), curve (b) and point P1 are the same as in FIG. 38. Comparing curve (b) in FIG. 38 with that in FIG. 62, it can be realized that the electric field extended to the substrate in FIG. 38 is decreased more steeply than that in FIG. 62. Comparing the position of point $P_1$ in FIG. 38 with that in FIG. 62, it can be realized that the distance from the core to point $P_1$ shown in FIG. 38 is shorter than that in FIG. 62. In other words, by virtue of forming the buffer layer 310, the leakage of light toward the substrate can be decreased.

Furthermore in the twenty-second preferred embodiment (FIG. 36), a total thickness obtained by totaling the thickness of the buffer layer 310 and the under-cladding layer 301A and a half thickness of the core 302 can be made equal to the height of the optical axis of the semiconductor laser 200, by controlling the forming process of the layers. By virtue of changing the thickness of the solder bump 203 shown in FIG. 12A, the height of the optical axis of the semiconductor laser 200 can be adjusted from 5.32 μm to 9.32 μm from the upper surface of the substrate 100. When the height of the optical axis of the semiconductor laser 200 is adjusted to 9.2 μm, the heights of the semiconductor laser 200 and the optical waveguide can be made coincide with each other. Furthermore, since the absolute value of the total thickness is small, an error due to the height of the slab structure can be decreased, which results in making the vertical alignment between the semiconductor laser 200 and the optical waveguide 300 easy. Since silicon is used for the substrate 100, it is possible to form grooves like the grooves 104 in FIG. 20A, by the anisotropic etching, so that the optical coupler in FIG. 36 can be easily coupled to the optical fiber by using the grooves and guide rails provided to the common substrate.

The feature of the twenty-second preferred embodiment can be applied not only to the optical coupler consisting of the arrayed laser elements and cores but also to an optical coupler consisting of a single laser element and core.

Figure 39:
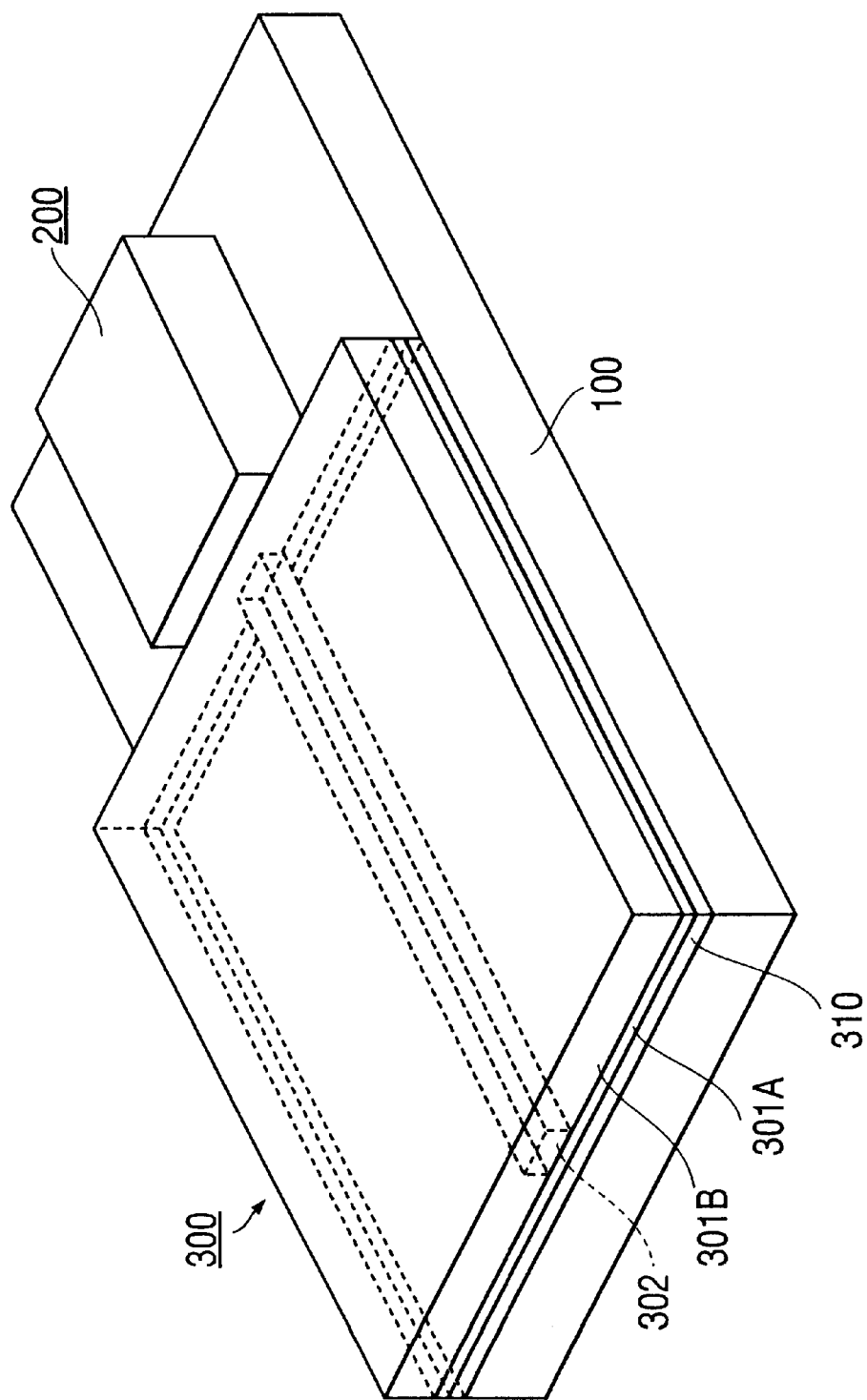
FIG. 39 is a schematic perspective view of an optical coupler including a laser element and core and having the slab structure of layers the same as in FIG. 36, in accordance with a twenty third preferred embodiment of the present invention.

FIG. 39 is a schematic perspective view of an optical coupler illustrating the twenty-third preferred embodiment of the present invention. In the twenty-third preferred embodiment, the optical coupler consists of the semiconductor laser 200 including the single laser element and the optical waveguide 300 including the single core 302. In FIG. 39, the same reference numerals as in FIG. 36 designate the same parts as in FIG. 36. Material, forming process and dimensions of the layers in the optical coupler of the twenty-third preferred embodiment are the same as those in the twenty-second preferred embodiment (FIG. 36).

Figure 40:
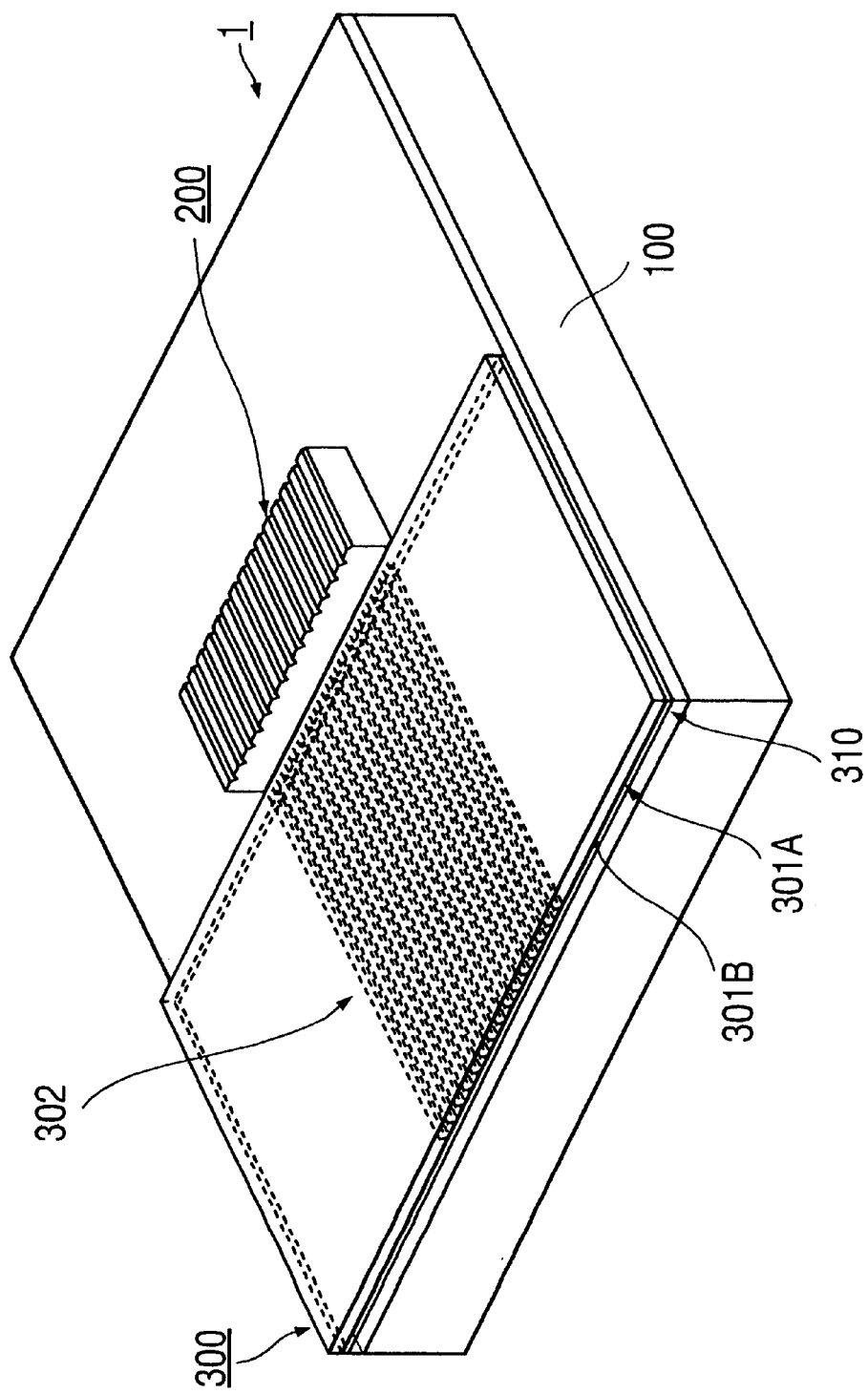
FIG. 40 is a schematic perspective view of an optical coupler in accordance with a twenty fourth preferred embodiment of the present invention.

FIG. 40 is a schematic perspective view of an optical coupler illustrating a twenty-fourth preferred embodiment of the present invention for performing the vertical alignment easily. In FIG. 40, the same reference numerals as in FIG. 36 designate the same parts as in FIG. 36. In FIG. 40, the substrate 100 is made of silicon, the buffer layer 310 is made of silicon dioxide having 3.5 μm thickness and formed all over the substrate 100 (which is different from the twenty-second preferred embodiment), and the optical waveguide 300 is composed of the under-cladding layer 301A, an array of the cores 302 and the over-cladding layer 301B and formed on the buffer layer 310. The under-cladding layer 301A is made from polyimide having 3.5 μm thickness and 1.55 refractive index, the cores 302 are made from polyimide each having a cross-sectional area of 6 μm×6 μm and a relative refractive index difference of 0.5%, with respect to the under-cladding layer 301A, and the over-cladding layer 301B is made also from polyimide having 15 μm thickness and a refractive index of 1.55. The bonding pads and the wiring pattern not depicted in FIG. 40 are formed on the buffer layer 310. The buffer liver 310 is the silicon dioxide film as described above, and is formed by: forming thermal oxide layer having 2 μm thickness by thermally oxidizing the silicon substrate 100; and forming silicon dioxide film on the thermal oxide layer by CVD.

In the twenty-fourth preferred embodiment (FIG. 40), the same as the twenty-second preferred embodiment (FIG. 36), since the refractive index of the buffer layer 310 is lower than that of the under-cladding layer 301A, the electric field is steeply decreased at the substrate 100. As a result, even though the under-cladding layer 301 is thin, the light radiated from the core 302 to the substrate 100 is steeply decreased at the substrate 100. Furthermore, a total thickness of the undercladding layer 301A and a half thickness of the core 302 can be made equal to the height of the optical axis of the semiconductor laser 200, by adjusting the height of the solder bump 203 (see FIG. 12A) so that the optical axis of the semiconductor laser 200 coincides with the height (6.5 μm) of the cores 302 of the optical waveguide 300. That is, usually, the above total thickness is around 6.5 μm and the axis height is in between 5.32 μm and 9.32 μm, so that the optical axis of the semiconductor laser 200 can be adjusted so as to be equal to the optical axis of the cores 302 by adjusting the height of the solder bump 203. Furthermore, since the absolute value of the total thickness is small, an error due to the height of the slab structure can be decreased, which results in making the vertical alignment of the semiconductor laser 200 and the optical waveguide 300 easy. Since silicon is used for the substrate 100, it is possible to form grooves like the grooves 104 in FIG. 20A, by anisotropic etching, so that the optical coupler in FIG. 36 can be easily coupled to the optical fiber by using the grooves and guide rails provided to the common substrate.

The feature of the twenty-fourth preferred embodiment can be applied not only to the optical coupler consisting of the arrayed laser elements and cores but also to an optical coupler consisting of a single laser element and core.

Figure 41:
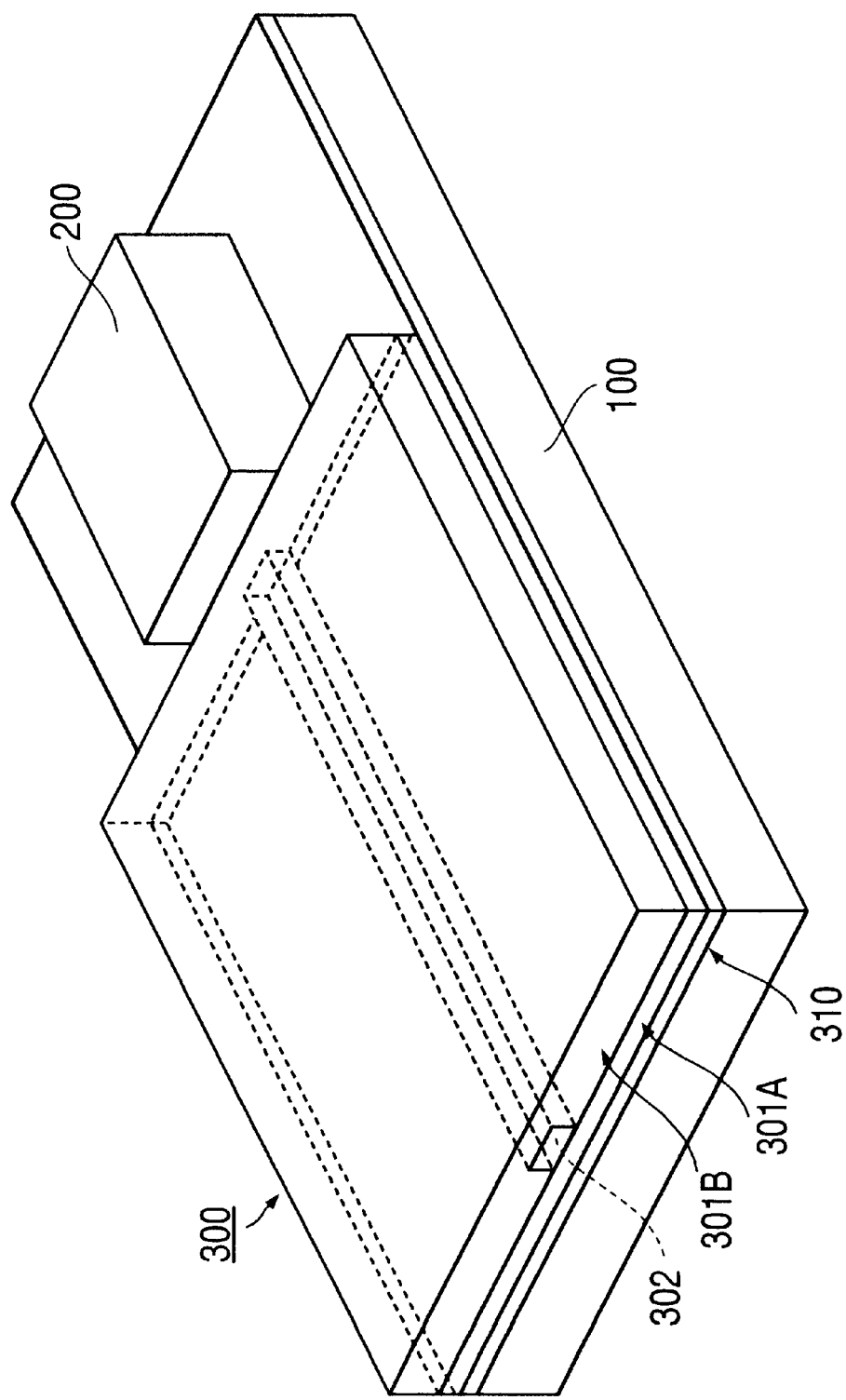
FIG. 41 is a schematic perspective view of an optical coupler including a single laser element and core and having the same feature as of the twenty fourth preferred embodiment, in accordance with a twenty fifth preferred embodiment of the present invention.

FIG. 41 is a schematic perspective view of an optical coupler illustrating the twenty-fifth preferred embodiment of the present invention. In the twenty-fifth preferred embodiment, the optical coupler consists of the semiconductor laser 200 including the single laser element and the optical waveguide 300 including the single core 302. In FIG. 41, the same reference numerals as in FIG. 40 designate the same parts as in FIG. 40. Material, forming process and dimensions of the layers in the optical coupler of the twenty-fifth preferred embodiment are the same as those in the twenty fourth preferred embodiment (FIG. 40).

Figure 42:
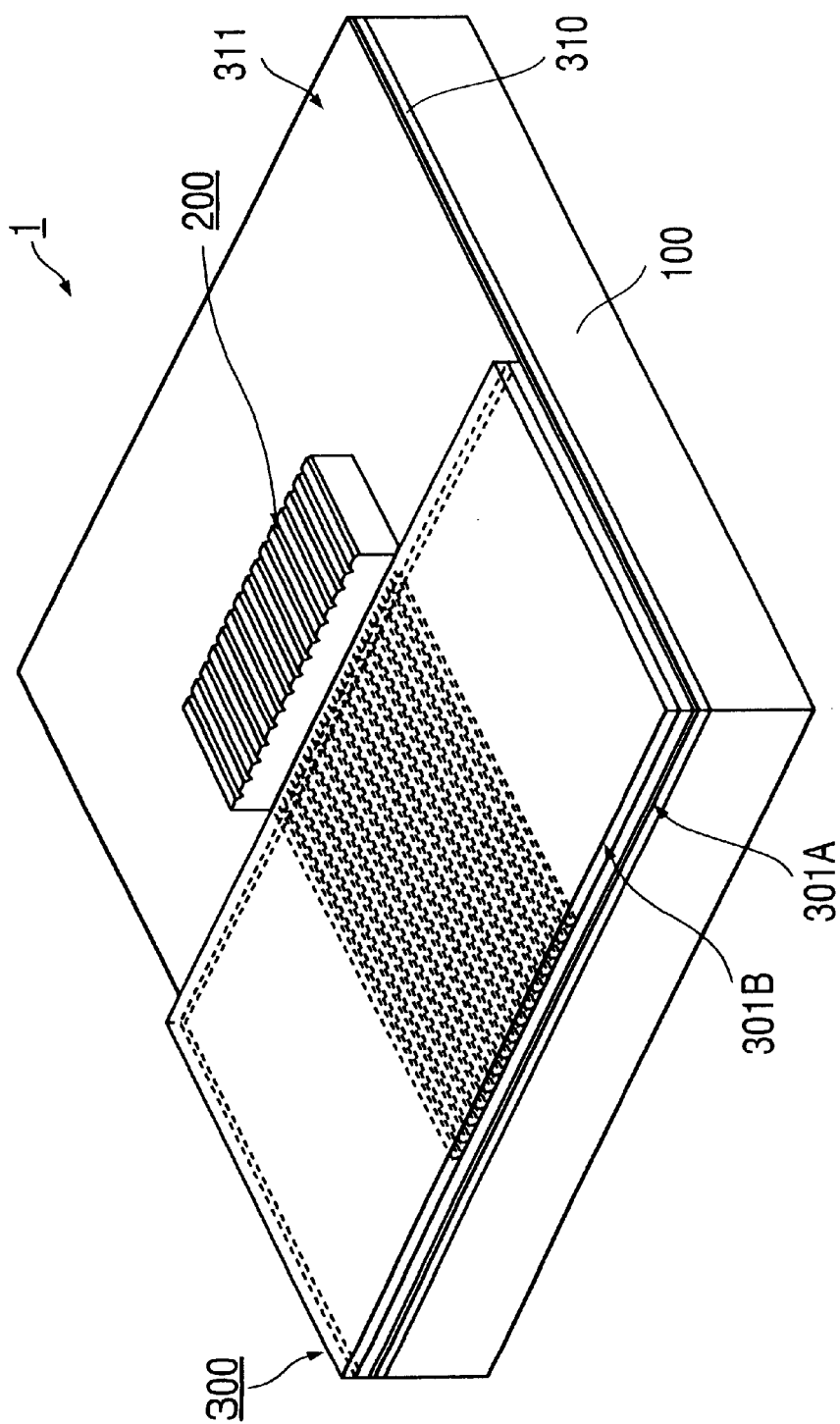
FIG. 42 is a schematic perspective view of an optical coupler having slab structure of layers for making optical axis alignment in the vertical direction easy, in accordance with a twenty sixth preferred embodiment of the present invention.

FIG. 42 is a schematic perspective view of an optical coupler for illustrating a twenty-sixth preferred embodiment of the present invention. The twenty-sixth preferred embodiment is also for making the vertical alignment easy. In FIG. 42, the same reference numerals as in FIG. 40 designate the same parts as in FIG. 40. In FIG. 42, the substrate 100 is made of silicon, the buffer layer 310 made from polyimide in 20 μm thickness is formed on the substrate 100, a silicon nitride layer 311 is formed on the buffer layer 310 and the optical waveguide 300, composed of the under-cladding layer 301A, the cores 302 and the over-cladding layer 301B which are made from polyimide, is formed on the silicon nitride layer 311. The bonding pads for bonding the semiconductor laser 200 and the wiring pattern, which are not depicted in FIG. 40, are formed on the silicon nitride layer 311. Herein, the buffer layer 310 is polyimide having the same composition as that of the polyimide used for the under-cladding layer 301A, and the cladding layers 301A and 301B and cores 302 use the same materials and have the same dimensions as those in the twenty-fourth preferred embodiment (FIG. 40). The silicon nitride layer 311 is formed on the buffer layer 310 by plasma CVD technique in a 200 nm thickness. The refractive index of the buffer layer 310 can be made less than the refractive indices of the cladding layers 301A and 301B. By virtue of the twenty sixth preferred embodiment, the effect of the vertical alignment can be achieved the same as the case of the twenty-fourth preferred embodiment. In the above, a silicon dioxide layer can be used instead of the silicon nitride layer 311.

The feature of the twenty sixth preferred embodiment can be applied not only to the optical coupler consisting of the arrayed laser elements and cores but also to an optical coupler consisting of a single laser element and core.

Figure 43:
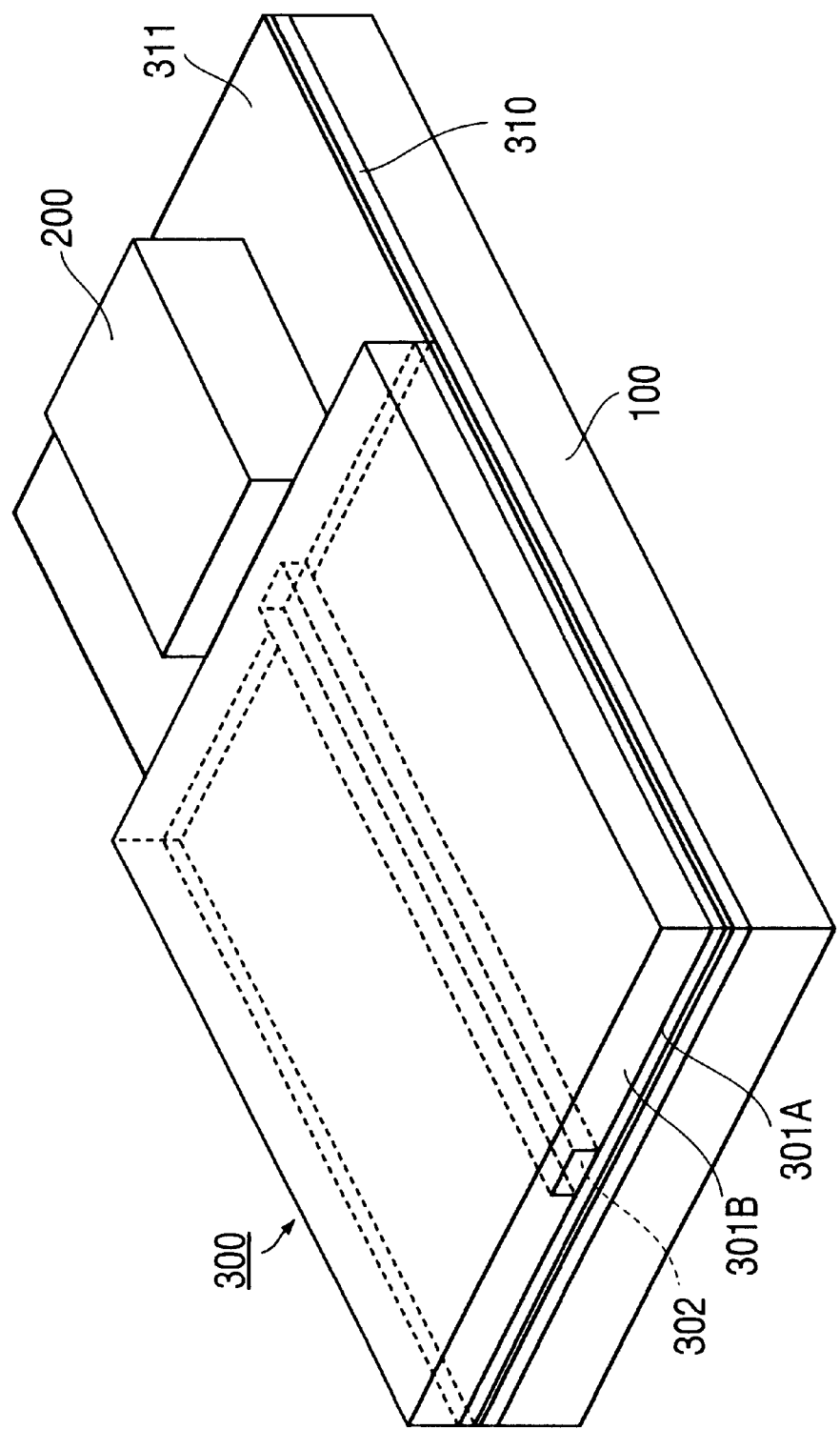
FIG. 43 is a schematic perspective view of an optical coupler including a single laser element and core and having the same feature as of the twenty sixth preferred embodiment, in accordance with a twenty seventh preferred embodiment of the present invention.

FIG. 43 is a schematic perspective view of an optical coupler illustrating the twenty-seventh preferred embodiment of the present invention. In the twenty-seventh preferred embodiment, the optical coupler consists of the semiconductor laser 200 including the single laser element and the optical waveguide 300 including the single core 302. In FIG. 43, the same reference numeral as in FIG. 42 designates the same part as in FIG. 42. Material, forming process and dimensions of the layers in the optical coupler of the twenty-seventh preferred embodiment are the same as those in the twenty sixth preferred embodiment (FIG. 42).

Figure 44:
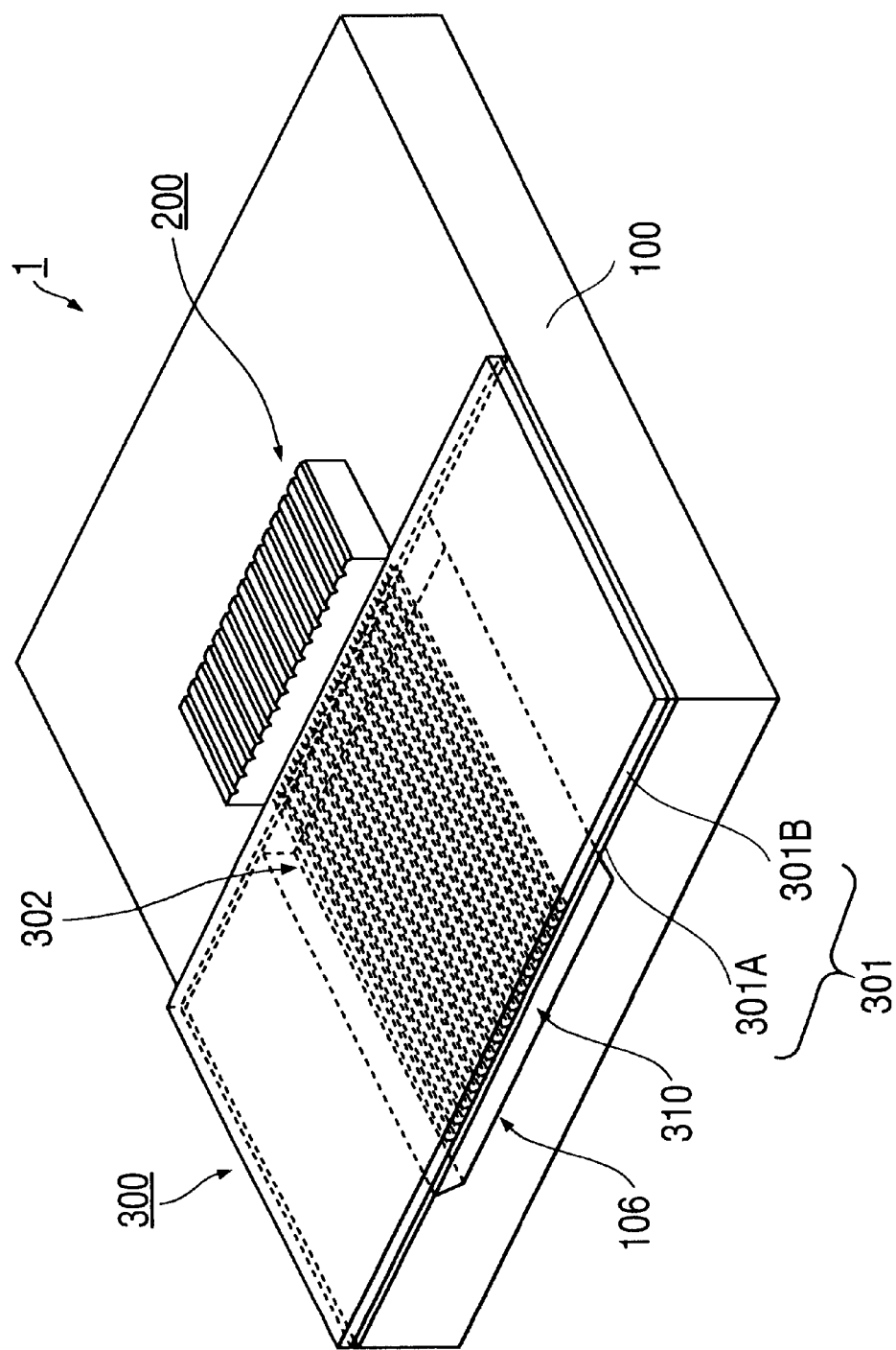
FIG. 44 is a schematic perspective view of an optical coupler having a depression under cores, filled with a buffer layer, in accordance with a twenty eighth preferred embodiment of the present invention.

FIG. 44 is a schematic perspective view of an optical coupler for illustrating a twenty-eighth preferred embodiment of the present invention. The twenty-eighth preferred embodiment is also for easily performing the vertical alignment. In FIG. 44, the same reference numerals as in FIG. 42 designate the same parts as in FIG. 42. In FIG. 44, a depression 106 is formed in the upper surface of the substrate 100 under the cores 302. The depression 106 is filled with material of the buffer layer 310 so that the upper surface of the filled buffer layer 310 is flat and even with the upper surface of the substrate 100. The optical waveguide 300 consisting of the under-cladding layer 301A, the cores 302 and the over-cladding layer 301B is formed on the substrate 100 so that the cores 302 are placed over the buffer layer 310 in the depression 106. The bonding pads for bonding the semiconductor laser 200 on the substrate 100 and the wiring pattern, which are not depicted in FIG. 44, are formed on the upper surface, in an area where the aforementioned depression 106 is not formed, of the substrate 100. The buffer layer 310 is made from silicon dioxide, and material and dimensions of the cladding layers 301A and 341B and the cores 302 are the same as those in the twenty fourth preferred embodiment (FIG. 40).

The optical coupler of the twenty-eighth preferred embodiment is fabricated as follows: in a silicon wafer having a {101}-surface for the substrate 100, the depression 106 is formed by anisotropic etching technique; the depression 106 is filled with material of the buffer layer 106 by sputtering, CVD, or painting, and making the filled material transparent if necessary; when silicon dioxide is used for the buffer layer 310, a heat treatment is usually performed at a temperature more than 1000° C.; the surfaces of the buffer layer 310 and the substrate 100 are evened, by carrying out grinding and polishing so that the surface of the buffer layer 310 becomes flat; an insulation layer, not depicted in FIG. 42, such as a silicon nitride layer, is formed on the surfaces of the substrate 100 and the buffer layer 310; the bonding pads and the wiring pattern, which can not be seen in FIG. 44, are formed on the insulation layer; and the semiconductor laser 200 is mounted on the insulation layer through the bonding pads and the optical waveguide 300 is formed on the insulation layer. The insulation layer is for insulating the wiring pattern from the substrate 100. Other methods and material can be used as the insulating layer if the insulation of them is guaranteed. The thickness of the buffer layer 310 is 10 μm, the thickness of the cladding layers 301A and 301B and the cores 302 is the same as those of the twenty-fourth preferred embodiment (FIG. 40).

In the twenty-eighth preferred embodiment, the vertical alignment for the optical waveguide 300 and the semiconductor laser 200 can be easily performed the same as in the twenty-eighth preferred embodiment. Furthermore, since the semiconductor laser 200 is bonded on the substrate 100 through the insulation layer, excellent heat dissipation of the semiconductor laser 200 can be realized.

In the twenty-eighth preferred embodiment, any kind of material can be used for the buffer layer 310 if the material is transparent and has a refractive index equal to or less than the refractive index of the under-cladding layer 301A. For example, polyimide or other inorganic or organic materials can be used for the buffer layer 310.

Figure 45:
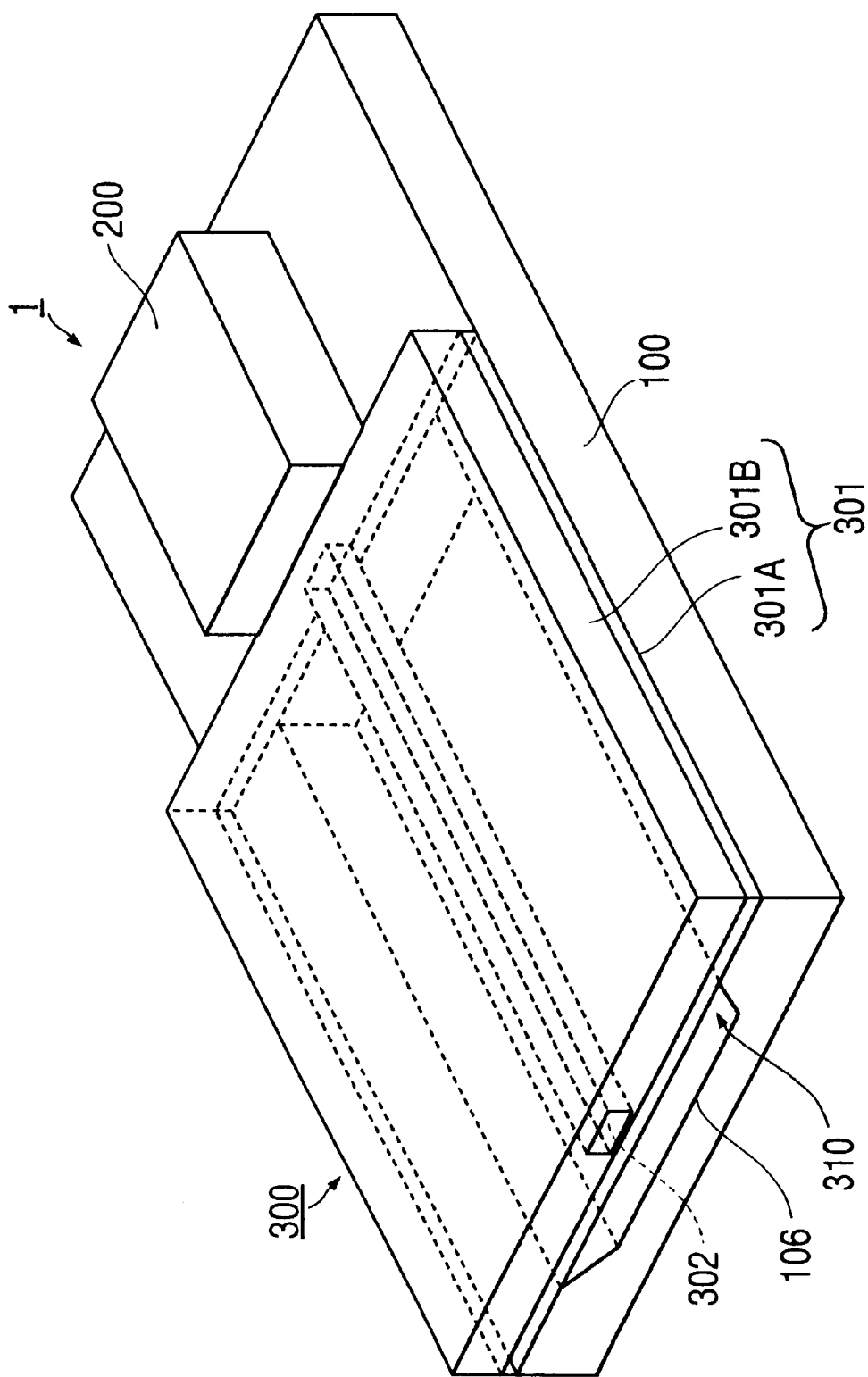
FIG. 45 is a schematic perspective view of an optical coupler including a single laser element and core and having the same feature as of the twenty eighth preferred embodiment, in accordance with a twenty ninth preferred embodiment of the present invention.

The feature of the twenty eighth preferred embodiment can be applied not only to the optical coupler including the arrayed laser elements and cores but also to an optical coupler including a single laser element and core as shown in FIG. 45. FIG. 45 is a schematic perspective view of an optical coupler illustrating a twenty-ninth preferred embodiment of the present invention. The optical coupler in FIG. 45 consists of the semiconductor laser 200 including a single laser element and the optical waveguide including a single core 302. In the twenty ninth preferred embodiment, the vertical alignment between the single laser element and core can be performed as well as done in the twenty eighth preferred embodiment (FIG. 44). In FIG. 45, the materials and the forming processes of the layers are the same as those in FIG. 44.

The structure of the optical waveguide 300 and the implementation method of the semiconductor laser 200, described in the twentieth preferred embodiment (FIG. 34) can be applied to the second, third and fifth preferred embodiments, respectively. Similarly, the structure of the optical waveguide 300 and the implementation method of the semiconductor laser 200 described with reference to FIGS. 35 to 45 embodiments can be applied to the second, third, fourth, sixth to eleventh, and thirteenth to nineteenth preferred embodiments, respectively.

FIGS. 46A, 50, 51A and 51B show the optical waveguides each having a composite core, for illustrating thirtieth, thirty-first and thirty-second preferred embodiments of the present invention. In the optical waveguide having a composite core, which will be called "composite core waveguide" hereinafter, the spot size of a guided mode or a confinement factor is changed as the light is transmitted through the single core waveguide. In these embodiments, the waveguide comprises only one core (i.e., the single core), and is, therefore, referred to as a single core waveguide, or a single composite core waveguide when the core is a composite core, hereinafter. In FIGS. 46A, 46B, 46C, 46D, 46E, 48, 49A and 49B, the same reference numerals as in FIG. 40 designate the same parts as in FIG. 40.

In the thirtieth preferred embodiment shown in FIG. 46A, a spot size of guided light is changed as the light is transmitted through the single core waveguide 300. The single core waveguide 300 in this embodiment has a composite core 302 consisting of a main core 302A and a sub core 302B surrounding the main core 302A, and the refractive index of the main core 302A is relatively high in comparison with of the sub core 302B.

FIG. 46A is a perspective view of the single core waveguide 300 for illustrating the thirtieth preferred embodiment, FIG. 46B is a top plan view of the single core waveguide 300 in FIG. 46A, FIG. 46C is a graph showing distribution of refractive indices along lines $X_1$-$X'_1$ and $X_2$-$X'_2$ in FIG. 46B, FIG. 46D is a vertical sectional view at the center of the core 302 in FIG. 46A, and FIG. 46E is a graph showing distribution of refractive indices along lines $Y_1$-$Y'_1$ and $Y_2$-$Y'_2$ in FIG. 46D. In FIG. 46C, the solid line shows the refractive index distribution along line $X_2$-$X'_2$ and the dotted line shows the refractive index distribution along line $X_1$-$X'_1$, and in FIG. 46E, the solid line shows the refractive index distribution along line $Y_2$-$Y'_2$ and the dotted line shows the refractive index distribution along line $Y_1$-$Y'_1$. In FIG. 46D, curves (1) and (2) show distribution of electric field of the light transmitted in the single core waveguide 300, measured along the lines $Y_1$-$Y'_1$ and $Y_2$-$Y'_2$, respectively.

The main core 302A and the sub core 302B, at a light input end of the single core waveguide 300, are optically coupled to a laser element. The cross sectional shape and size of the sub core 302B are kept constant respectively as a function of a distance along the length of the sub-core 302B, from the light input end thereof to a light output end thereof, opposite to the light input end. On the other hand, the cross sectional shape of the main core 302A is a thin rectangle, which is vertically thin and horizontally wide at the light input end, and the cross sectional size (or extent) of the main core 302A is smaller than that of the sub core 302B at the light input end and is kept constant in a predetermined distance along the length of the waveguide 302 from the light input end thereof but decreases as a function of an increase in the distance, and finally disappears before reaching the light output end of the waveguide 302. As a result, the index distribution is changed as the distance is lengthened from the light input end, as shown in FIGS. 46B and 46C. Further, it is not always necessary to change the area size and shape of the cross section of the main core at the same time. It is allowable only to change the shape, keeping the area size constant. For example, when the shape is changed, a shape of guided mode is changed.

A concrete structure of the single core waveguide 300 is as follows: the refractive index of the cladding layer 301 is 1.55; the relative refractive index difference between the cladding layer 301 and the sub core 302B is 0.5%, the refractive index of the main core 302A is 1.6, the cross sectional dimension of the sub core 302B is 6 μm×6 μm, and the thickness and the width of the main core 301A is 0.8 μm and 3 μm, respectively, at the light input end. The material of the cladding layer 301, sub core 302B and main core 302A is polyimide.

As shown by curves 1 and 2 in FIG. 46D, at a part of the single core waveguide 300, where the main core 302A exists, an optical waveguide consisting of the main core 302A and the sub core 302B is formed. In this case, the main core 302A works as a core and the sub core 302B works as a cladding layer, so that a small spot size of light can be obtained at the part. The sub core 302B works as a core and the cladding layer 301 works as a cladding layer at the part where no main core exists. The spot size, which means the optical beam width of the guided mode of the waveguide, becomes large at the part where no main core exists, because it has a large core and a small refractive index difference. Since the main core 302A has a cross section having a large length horizontally and a small width vertically, the guided mode has a cross section having the same length and width as the cross section of the main core 302A. Usually, the mode of the semiconductor laser has also a large horizontal-length and a small vertical-width, so that the optical waveguide 300 in the thirtieth preferred embodiment (FIG. 46A) is coupled with the semiconductor laser at high coupling efficiency. For example, the spot size is approximately 3.1 μm×5.5 μm at the light input end, however the spot size becomes as large as 6.7 μm in diameter at a part where no main core 302A exists. The spot size at the light input end of the single core waveguide 300 in FIG. 46A is almost equal to a spot size, which is approximately 3 μm×6.8 μm, of the light emitted from the semiconductor laser 200 in FIG. 15 (the second preferred embodiment). Therefore, if a laser element of the semiconductor laser 200 is coupled to the single core waveguide 300 properly, high coupling efficiency can be realized.

Figure 47A:
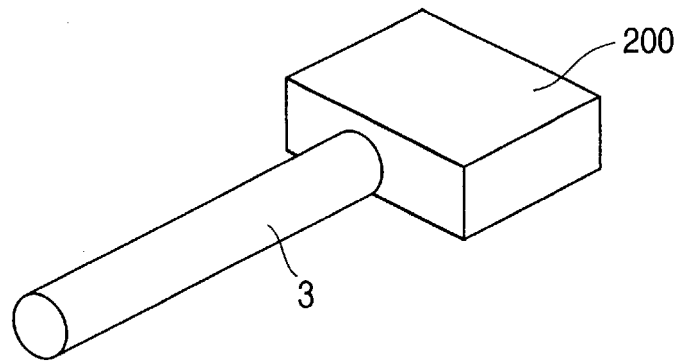
FIG. 47A is a schematic perspective view of a semiconductor laser including a single laser element directly coupled with an optical fiber.
Figure 47B:
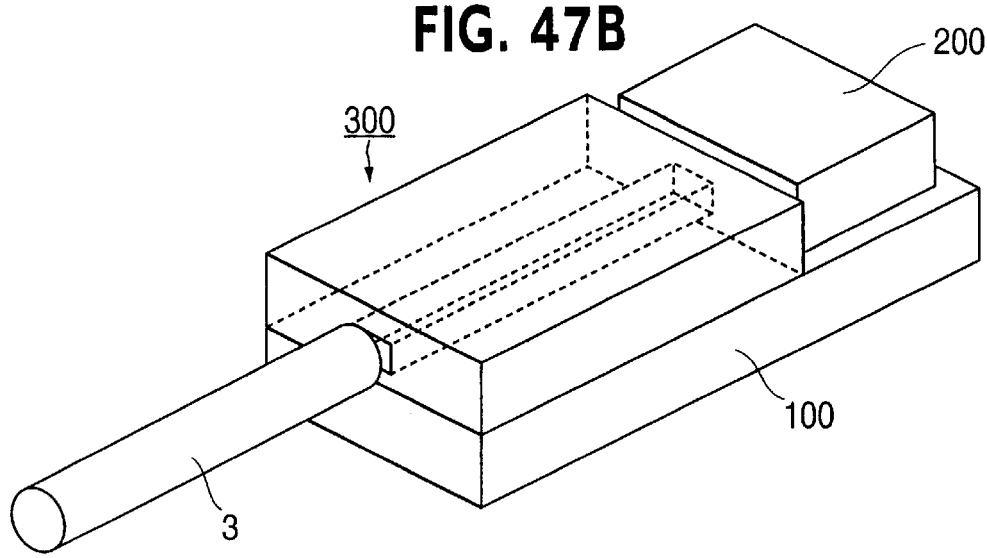
FIG. 47B is a schematic perspective view of the semiconductor laser the same as in FIG. 47A, connected with the optical fiber the same as in FIG. 47A, through an optical wave guide including an ordinary core.
Figure 47C:
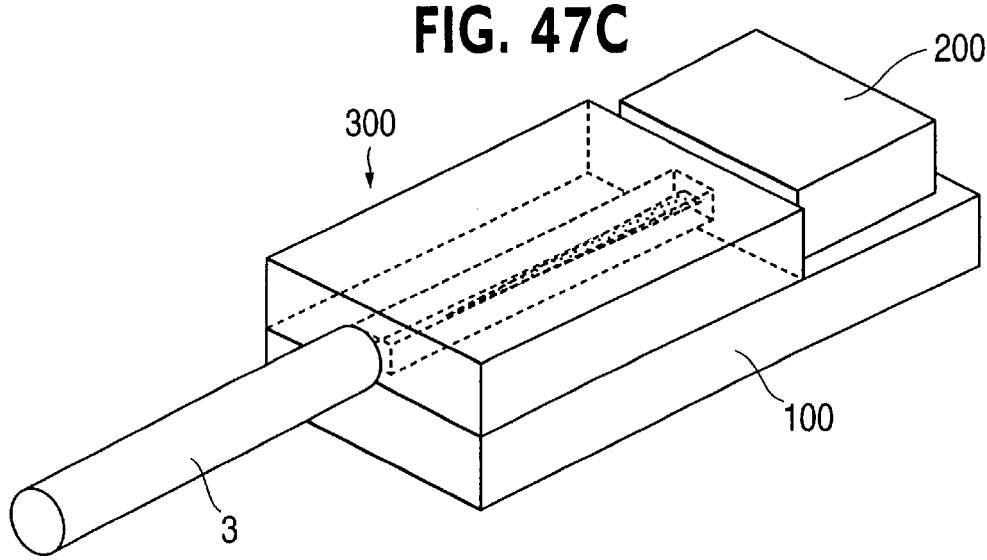
FIG. 47C is a schematic perspective view of the semiconductor laser the same as in FIG. 47A, connected with the optical fiber the same as in FIG. 47A, through an optical wave guide including a tapered shape main core and a sub core.

Furthermore, the single core waveguide 300 can be coupled to an optical fiber well at the light output end of the single core waveguide 300. Therefore, if the single core waveguide 300 of the thirtieth preferred embodiment is applied to the optical coupler in FIG. 15 or 17A (the third preferred embodiment), an optical coupler enabling the semiconductor laser 200 to couple to the optical fiber with a high coupling efficiency can be realized. FIGS. 47A, 47B and 47C show three types of optical couplers for coupling the semiconductor laser 200 to the optical fiber 3. FIG. 47A shows that the semiconductor laser 200 is directly coupled to the optical fiber 3, FIG. 47B shows that the usual optical waveguide 300 is inserted between the semiconductor laser 200 and the optical fiber 3, and FIG. 47C shows that the single core waveguide 300 shown in FIG. 46A is inserted between the semiconductor laser 200 and the optical fiber 3. Referring to the figures, the coupling efficiency between the semiconductor laser 200 and the optical fiber 3 will be compared. When the optical coupling efficiency is measured by watching only the vertical direction, the optical coupling efficiency of 67%, 77% and 95% is obtained in case of FIGS. 47A, 47B and 47C respectively. From the above result, it is clear that the single core waveguide 300 having a corresponding core is very effective to easily obtain a high coupling efficiency between the semiconductor laser 200 and the optical fiber 3.

As described before, in the thirtieth preferred embodiment, polyimide is used for the cladding layer 301, the sub core 302B and the main core 302A. However, other materials such as inorganic or organic material or material obtained by mixing inorganic and organic material can be used.

Thereupon, a case of using other material for the cladding layer 301, the sub core 302B and the main core 302A will be described. For example, a case where polyimide is used for the cladding layer 301 and the sub core 302B and silicon dioxide or silicon nitride is used for the main core 302A will be described below.

In the single core waveguide 300 having a corresponding core shown in FIG. 46A, a silicon nitride layer is formed as the main core 302A by plasma CVD technique. In this case, the refractive index of the cladding layer 301 is 1.55, the relative refractive index difference between the cladding layer 301 and the sub core 302B is 0.5%, the refractive index of the main core 302A is 1.7, the cross sectional dimension of the sub core 302B is 6 μm×6 μm, and the thickness and the width of the main core 302A are 0.19 μm and 4.55 μm respectively at the light input end.

In the above example, the spot size is 3 μm×5.7 μm at the light input end. When the single core waveguide 300 of the above example is used for the optical waveguide 300 in FIG. 15 (the second preferred embodiment) so that the light input end of the single core waveguide 300 is opposite to a selected laser element of the semiconductor laser 200 in FIG. 15, they are optically coupled to each other in 99% coupling efficiency in the vertical direction. Thus, by virtue of using the feature of the thirtieth preferred embodiment, the spot size of the single core waveguide 300 can be easily made to coincide with a spot size of light emitted from the laser element of the semiconductor laser 200 in the vertical direction, so that the optical coupling efficiency between the single core waveguide 300 and the semiconductor laser 200 increases.

Figure 48:
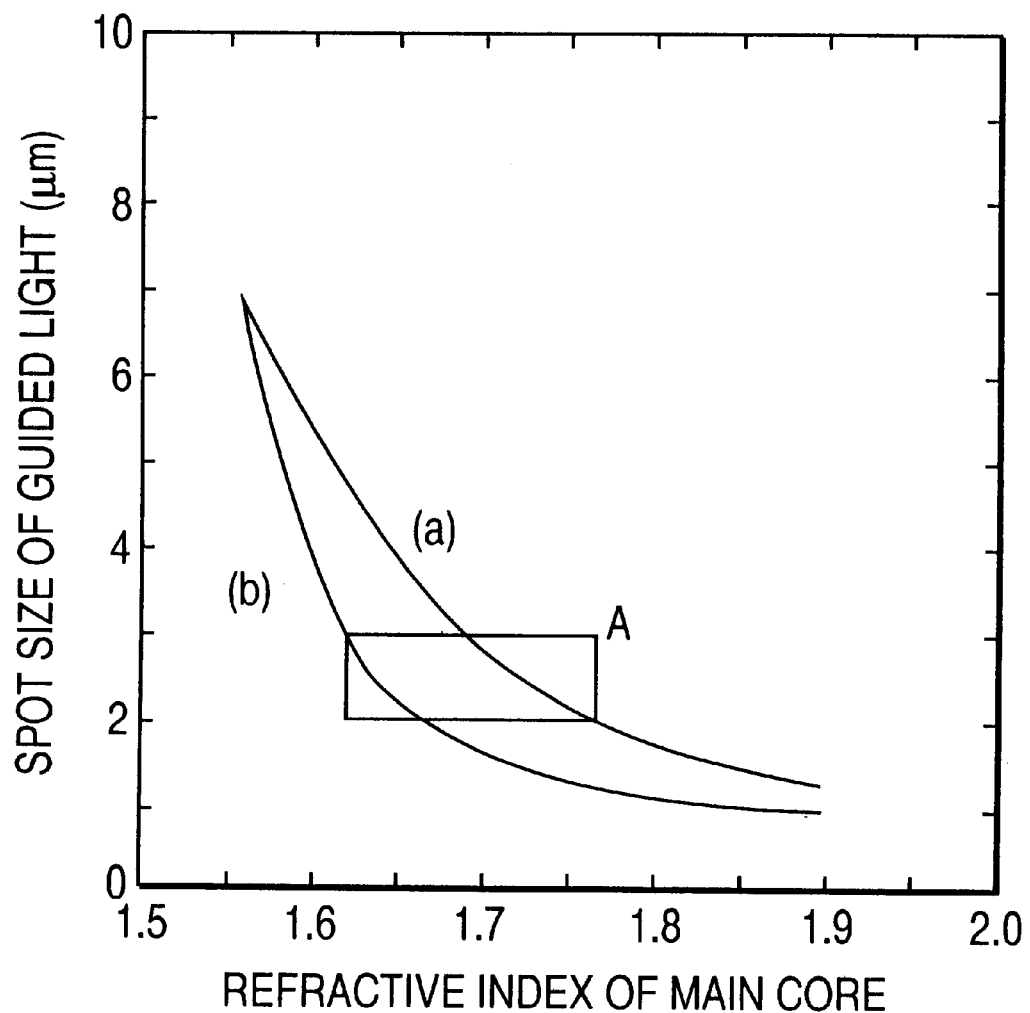
FIG. 48 is a graph for showing a change of a spot size of light transmitting the waveguide, due to a change of a refractive index of the main core in case of changing thickness of the main core, in FIG. 46A.

Next, an example for changing a spot size of light by using the single core waveguide 300 of the thirtieth preferred embodiment (FIG. 46A) will be described with reference to FIG. 48. In case where, in the single core waveguide 300, a relative refractive index difference between the cladding layer 301 and the sub core 302B is 0.5% and a thickness of the sub core 302B is 5 $\mu$m, when a refractive index of the main core 302A is changed between 1.6 to 1.9, a spot size of light at the light output end of the single core waveguide 300 is changed as shown in FIG. 48. In FIG. 48, curve (a) indicates the change of the spot size when the thickness of the main core 302A is 0.2 $\mu$m and curve (b) indicates the change of the spot size when the thickness of the main core 302A is 0.5 $\mu$m. From FIG. 48, it can be realized that the spot size is changed the range in between 1 $\mu$m to 7 $\mu$m by changing the refractive index of the main core 302A.

Figure 49:
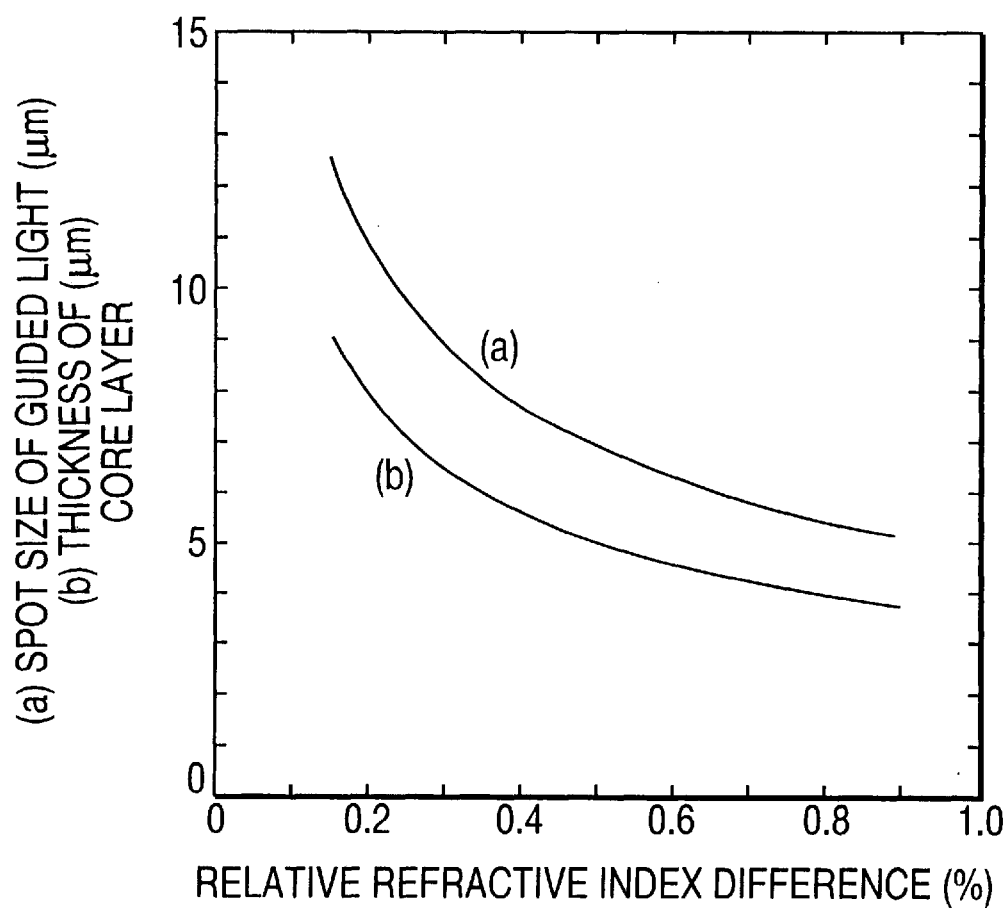
FIG. 49 is a graph for showing a change of the spot size, due to a change of a relative refractive index difference in case of changing thickness of the main core, in FIG. 46A.

Furthermore, when the refractive index and the cross sectional size of the sub core 302B are changed, the spot size can be changed at a part of the single core waveguide 300 which includes no main core 302A. FIG. 49 is a graph showing the above feature. In FIG. 49, curve (a) indicates the change of the spot size in a case where the relative refractive index difference between the core 302 and the cladding layer 301 (refractive index: 1.55) in a waveguide, having a slab structure as shown in FIG. 15, is changed. Further, when the relative refractive index difference between the core 302 and the cladding layer 301 is changed, the thickness of the core 302 must be also changed. Therefore, the thickness of the core 302 is also indicated by graph (b) in FIG. 49. From FIG. 49, it can be realized that the spot size can be changed as much as 5 $\mu$m~12 $\mu$m by changing the refractive index and the thickness of the sub core 302B. If the spot size is enlarged, the coupling efficiency between the optical waveguide and the optical fiber is increased, which means that the coupling tolerance increases also.

By virtue of changing the size and the refractive index of the main core 302A and the sub core 302B, thus, an optical waveguide enabling changing of the spot size over wide range can be realized. As a result, an optical coupling structure having a high coupling efficiency and a large coupling tolerance can be formed. For example, when the spot size is changed within range A shown in FIG. 48, a coupling loss due to anode mismatching occurring between the laser element and the optical waveguide can be tremendously reduced.

Figure 50:
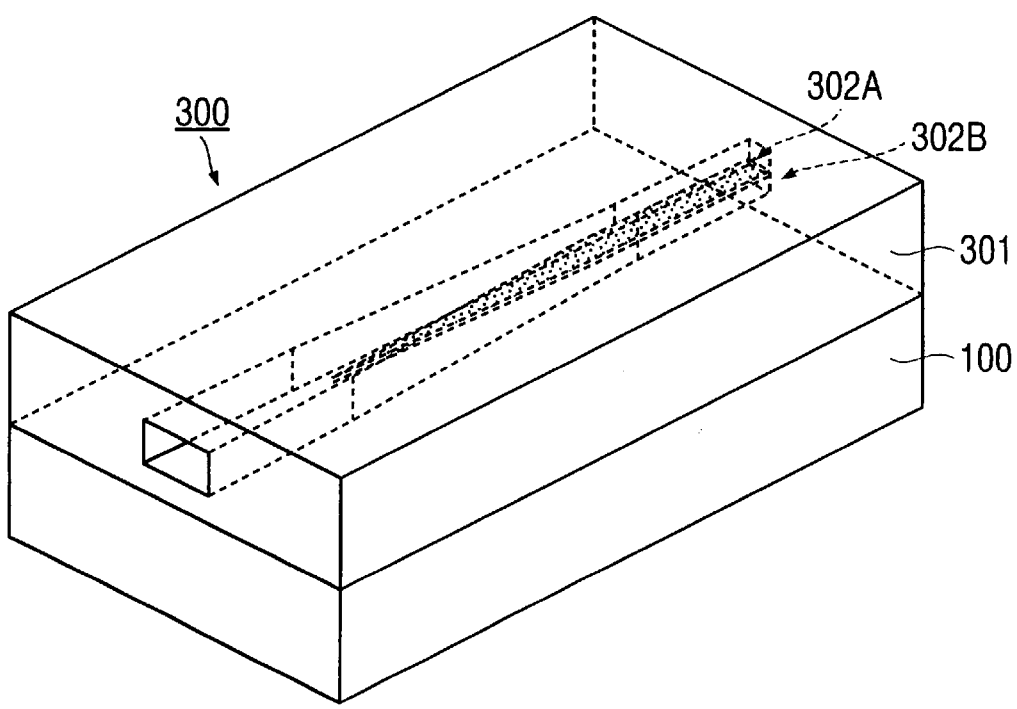
FIG. 50 is a schematic perspective view of an optical waveguide having a tapered main core and a sub core having different width partially, in accordance with a thirty first preferred embodiment of the present invention.
Figure 51A:
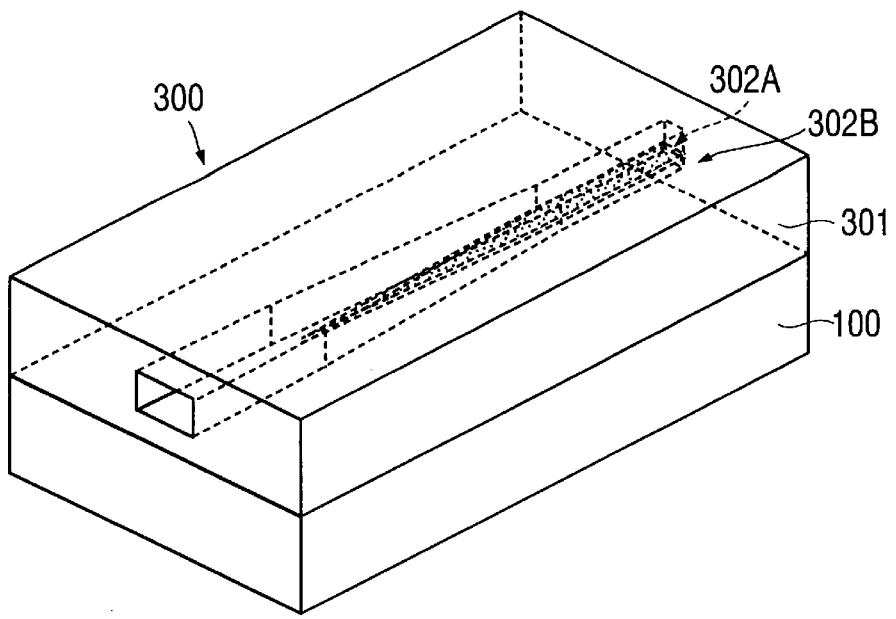
FIG. 51A is a schematic perspective view of an optical waveguide having a tapered main core and a sub core having different width partially, in accordance with a thirty second preferred embodiment of the present invention.
Figure 51B:
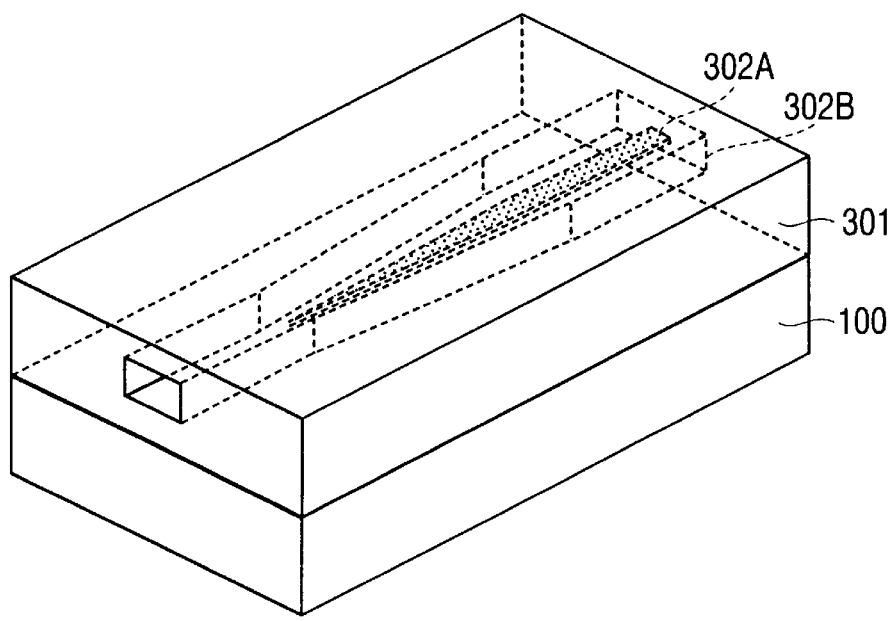
FIG. 51B is a schematic perspective view of an optical waveguide having a tapered main core and a sub core having different width partially, in accordance with a thirty third preferred embodiment of the present invention.

FIGS. 50, 51A and 51B show another type of optical waveguide for changing the light spot size as light is transmitted through the optical waveguide. FIGS. 50, 51A and 51B are perspective views illustrating a thirty-first, a thirty-second and a thirty-third preferred embodiment of the present invention respectively.

FIG. 50 shows another type of single core waveguide 300 in which the width of the sub core 302B is equal to the width of the main core 302A at the light input end. (Incidentally, the sub core 302B is wider than the main core 302A in the horizontal direction in case of FIG. 46A.) Using such waveguide, the spot size becomes smaller at the light input end, so that the coupling efficiency increases when the single core waveguide of the thirty-first preferred embodiment is coupled to a laser element emitting light having a small spot size in the horizontal direction.

FIG. 51A shows another type of single core waveguide 300 in which the width of the sub core 302B is wider than the width of the main core 302A at the light input end and narrower than the width of the sub core 302B at the light output end. (Incidentally, the width of the sub core 302B is constant in all range front the light input end to the light output end in case of FIG. 46A.) Using such waveguide, the horizontal spot diameter becomes a middle value of the horizontal spot diameters of the cases in FIGS. 46A and 50, at the light input end.

FIG. 51B shows still another type of single core waveguide 300 in which the width of the sub core 302B is relatively wide at the light input side. (Incidentally, the width of the sub core 302B is constant over the entire range, from the light input end to the light output end, in the case of FIG. 46A.) Using such a waveguide, the horizontal spot diameter becomes relatively large, so that the coupling efficiency increases when the waveguide is coupled to the laser element emitting light having a relatively large spot diameter.

Figure 52A:
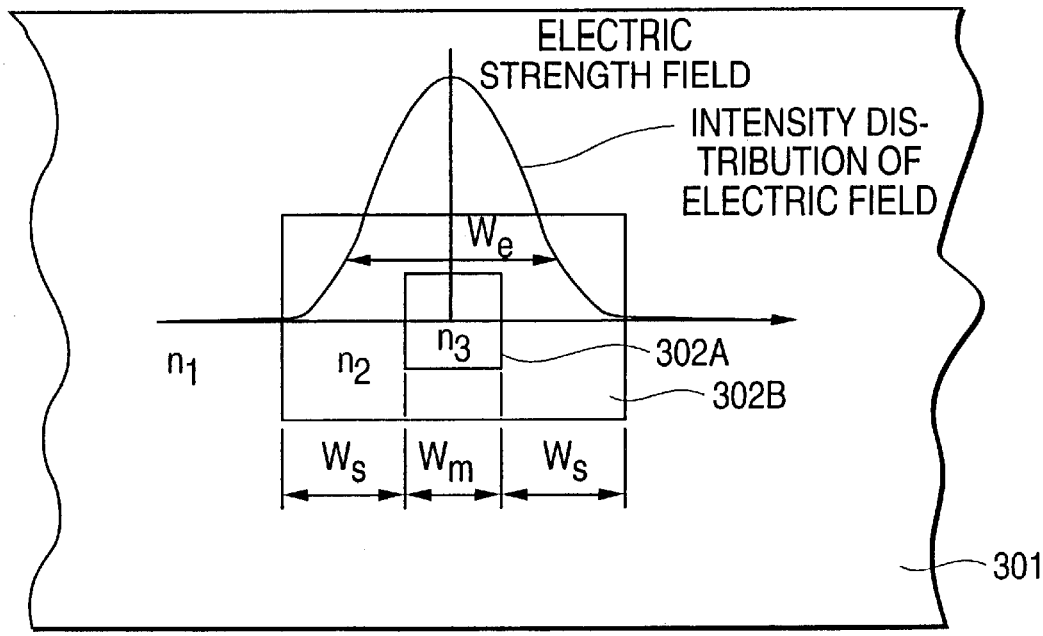
FIG. 52A shows a cross section of a single core waveguide and the electric field distribution in the cross section.
Figure 52B:
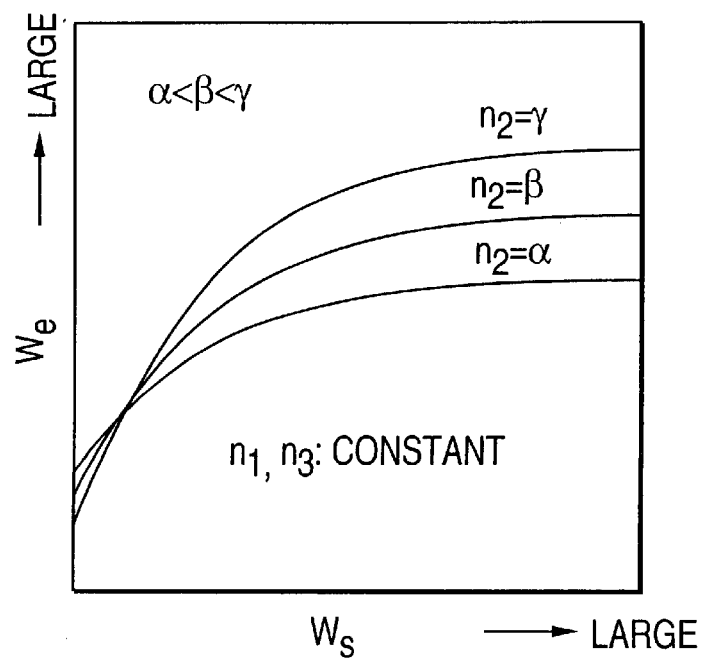
FIG. 52B is a graph for showing the relation between the spot size of the transmitted tight beam and the width of the sub core in the single core waveguide shown in FIG. 52A.

FIGS. 52A and 52B are graphs qualitatively explaining the effect of the thirty-first embodiment (FIG. 50), the thirty-second embodiment (FIG. 51A) and the thirty-third embodiment (FIG. 51B). FIG. 52A shows a typical cross section of the single core waveguide 300 with an electric field distribution around the waveguide. In FIG. 52A, the refractive index of the cladding layer 301, the sub core 302B and the main core 302A is marked as $n_1$, $n_2$ and $n_3$ respectively, and the width of the main core 302a is indicated by $W_m$ the width deference between the sub core 302B and the main core 302A is indicated by $W_s$. Furthermore, curve (1) shows an intensity distribution of the electric field of the light guided by the waveguide and the spot size is indicated by $W_e$. FIG. 52B shows the change of the spot size $W_e$ due to the width difference $W_s$ when the refractive index $n_2$ of the main core 302A is changed to $\alpha$, $\beta$ and Y. As shown in FIG. 52B, when the width difference $W_s$ increases, the spot size $W_e$ increases and, when $n_2$ increases $W_e$ also increases. Further, when $W_s$ decreases less than a value, the spot size $W_e$ changes contrary. For example, in the single core waveguide 300 in the thirtieth embodiment (FIG. 46A), when the main core 302A is composed of a silicon nitride layer having a refractive index of 1.7 and 0.19 $\mu$m thickness, the following horizontal spot sizes $W_e$ are obtained from FIG. 52B by changing the width difference $W_s$: when $W_s$ is set to 10 $\mu$m, $W_e$ becomes 6.3 $\mu$m; when $W_s$ set to 0.7 $\mu$m, $W_e$ becomes 5.7 $\mu$m; and when $W_s$ is set to as wide as 20 $\mu$m and main core width $W_m$ is set to 1.5 $\mu$m, $W_e$ becomes 7.2 $\mu$m. Further, in a case where the main core 302A is composed of polyimide having a refractive index of 1.6 and 0.8 $\mu$m thickness, when $W_m$ and $W_s$ are set to 1.6 and 10 $\mu$m respectively, the horizontal spot diameter becomes 6.5 $\mu$m. Adjusting $W_s$ and $W_m$, thusly, the spot size ($W_e$) can be changed over a wide range. By virtue of adjusting the spot size so as to match the semiconductor laser by changing $W_s$ and $W_m$ thusly, an optical coupler having high coupling efficiency can be realized.

The features of the thirtieth, (FIG. 46A), the thirty-first (FIG. 50), the thirty-second (FIG. 51A) and the thirty-third preferred embodiment (FIG. 51B) can be applied to the optical waveguides 300 in the second (FIG. 15), the third (FIG. 17A), the (FIG. 18A) fourth preferred embodiments, the sixth (FIG. 20A) to the eleventh (FIG. 25), and the thirteenth (FIG. 27A) to the twenty ninth (FIG. 45) preferred embodiments.

Figure 53A:
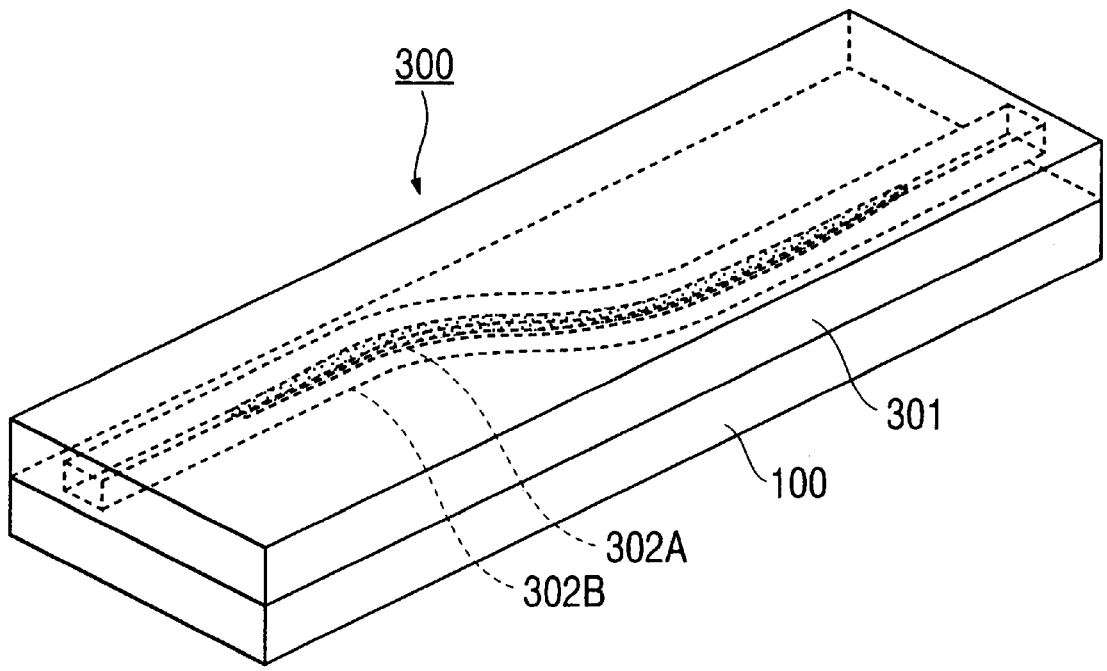
FIG. 53A is a schematic perspective view of a single core optical waveguide having a bent core, in accordance with a thirty fourth preferred embodiment of the present invention.
Figure 53B:
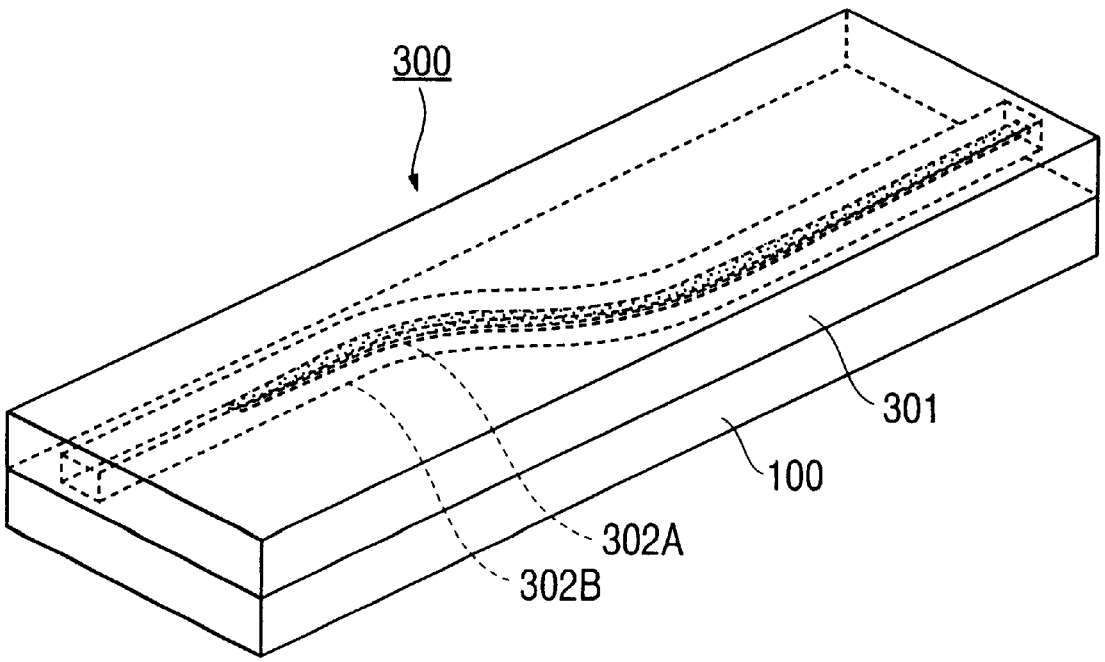
FIG. 53B is a schematic perspective view of a single core optical waveguide having a bent core, in accordance with a thirty fifth preferred embodiment of the present invention.

FIGS. 53A and 53B show a single core waveguide 300 having a bent core and capable of being applied to the single core waveguide 300 in the thirtieth preferred embodiment (FIG. 46A). FIGS. 53A and 53B are schematic perspective views of a single core waveguide 300 for illustrating the thirty-fourth and thirty-fifth preferred embodiments of the present invention respectively. In FIGS. 53A and 53B, the same reference numerals as in FIG. 46A designate the same parts as in FIG. 46 A. In FIG. 53A, a main core 302A extends from a central, bent part and therefrom toward input and output ends of the single core waveguide 300, so as to have equivalent optical characteristics, respectively, when looking from the light input end, and from the light output end toward the central bent part thereof. In FIG. 53B, a main core 302A extends from the light input (or output) end to a bent part of the single core waveguide 300. In other words the composite core comprising the main core 302A has a rotationally symmetric structure. This is the same in the waveguide 300 of FIGS. 54A and 54B, even though FIGS. 54A and 54B waveguide 300 has no composite core structure, but is not correct in the FIG. 53B waveguide 300.

In the single core waveguides 300 in FIGS. 53A and 53B, light is confined at the bent part, so that loss due to radiation of light can be reduced even though the radius of curvature of the bent part is small. Further in FIG. 53B, a light spot becomes small in size at the end where the main core 302 exists, so that the coupling efficiency with the semiconductor laser is increased. For example, when the feature of the thirty fourth and the thirty-fifth preferred embodiments is applied to the optical waveguides 300 in the eleventh (FIG. 25) preferred embodiment and the thirteenth (FIG. 27B) to the nineteenth (FIG. 33) preferred embodiments, the optical couplers in these embodiments can be made in a small size. Further, when the feature of the thirty fifth preferred embodiment (FIG. 53B) is applied to the above embodiments of FIG. 25 and FIGS. 27B to 33 such that the end, where the main core 302A exists, of the single core waveguide 300 is coupled with the semiconductor laser, the spot sizes of both devices coincide with each other, which results in increasing the coupling efficiency between them.

Figure 54A:
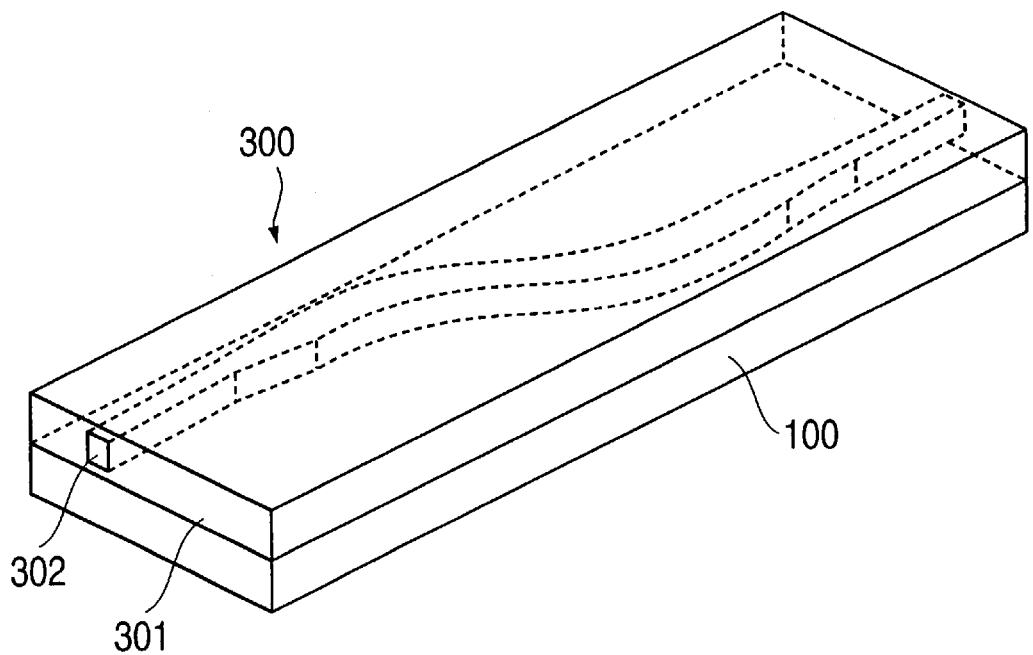
FIG. 54A is a schematic perspective view of a single core optical waveguide having a bent core, in accordance with a thirty sixth preferred embodiment of the present invention.

FIG. 54A is a schematic perspective view of a single core waveguide 300 for illustrating a thirty-sixth preferred embodiment of the present invention. The single core waveguide 300 in the thirty sixth embodiment includes a bent core whose width changes lengthwise. In FIG. 54A, the same reference numerals as in FIG. 46A designate the same parts as in FIG. 46A. In FIG. 54A, the core 302 has a bent part surrounded by the cladding layer 301. In the single core waveguide 300 of FIGS. 54A and 54B, width of the core 302 is widened at the bent part and in the respective, integral portions at the front and the rear of the bent part such that the light input end side and the light output end side are equivalent to each other in terms of their respective optical characteristics thereof and the core 302.

Figure 54B:
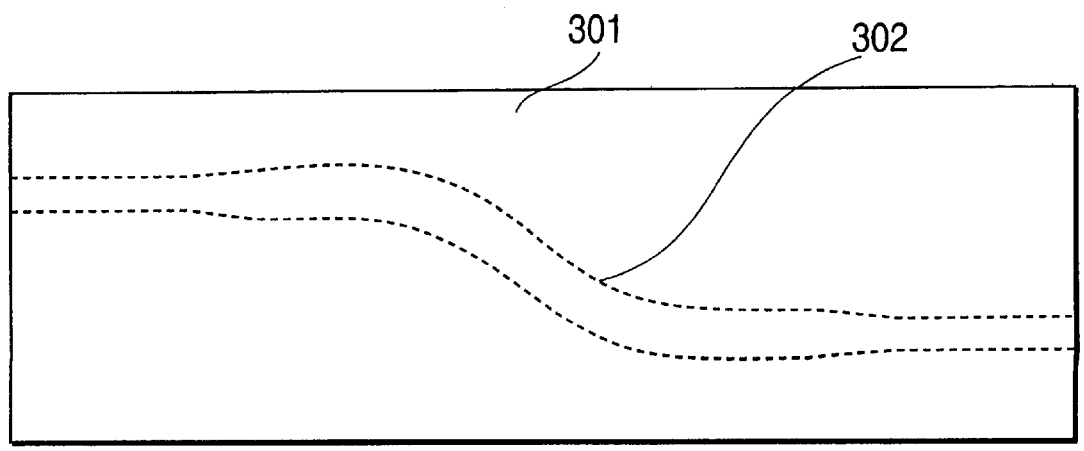
FIG. 54B is a top plan view of the single core optical waveguide shown in FIG. 54A.

FIG. 54B is a top plan view of the single core waveguide 300 in FIG. 54A. In the single core waveguide 300 in FIG. 54A, light transmitted through the waveguide 300 is confined more at the bent part, so the loss due to the radiation of light at the bent part can be reduced even when the radius of curvature of the bent part is small.

Applying the feature of the thirty-sixth embodiment to the optical waveguides 300 in the eleventh (FIG. 25) preferred embodiment and the thirteenth (FIG. 27B) to the nineteenth (FIG. 33) preferred embodiment, the optical couplers in these embodiments can be made in a small size.

Figure 55A:
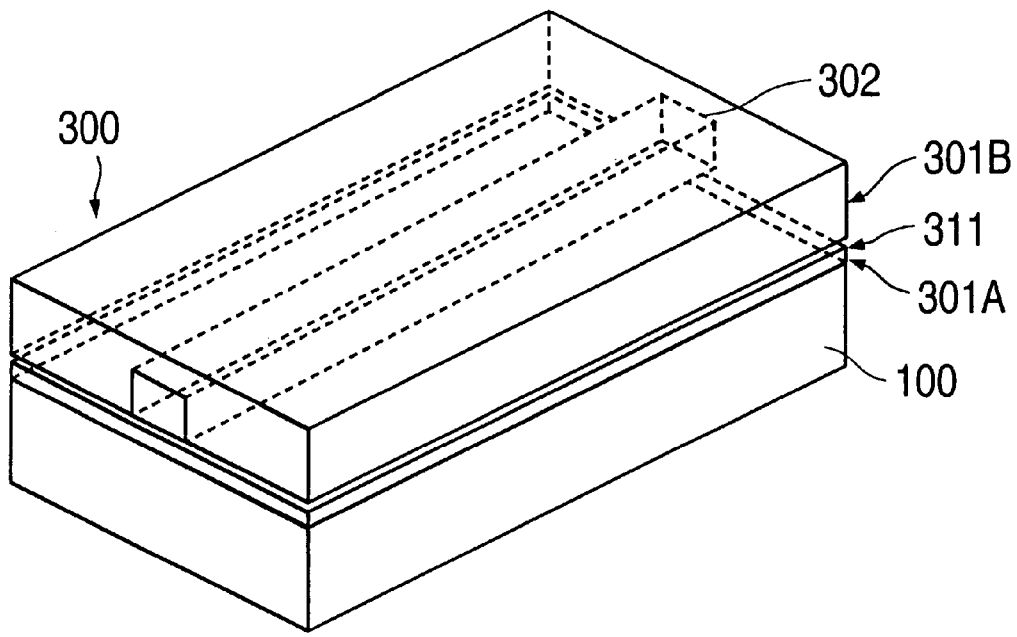
FIG. 55A is a schematic perspective view of a single core waveguide, in accordance with a thirty seventh preferred embodiment of the present invention.
Figure 55B:
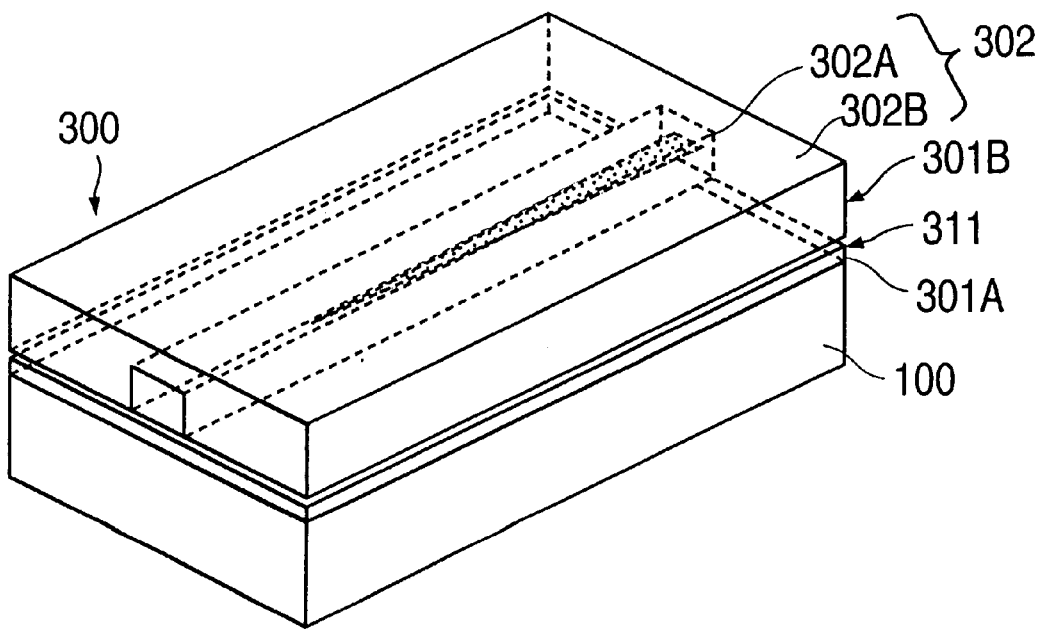
FIG. 55B is a schematic perspective view of a single core waveguide, in accordance with a thirty eighth preferred embodiment of the present invention.
Figure 56A:
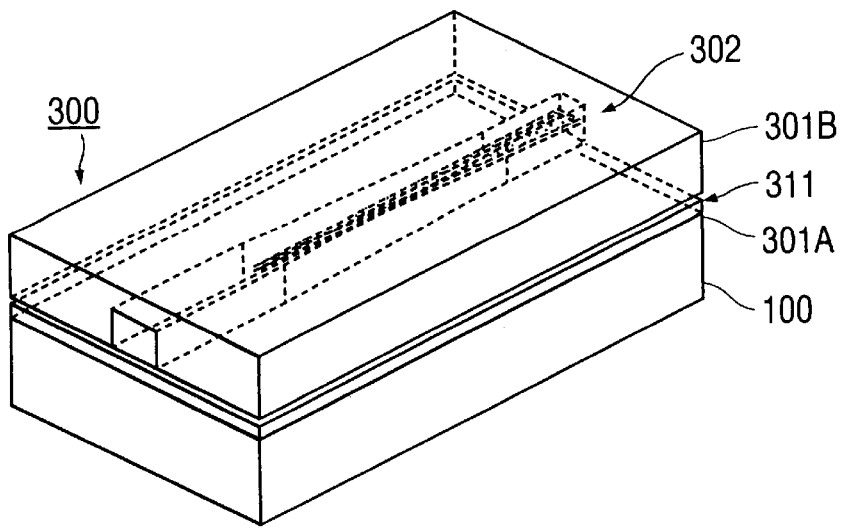
FIG. 56A is a schematic perspective view of a single core waveguide, in accordance with a thirty ninth preferred embodiment of the present invention.
Figure 56B:
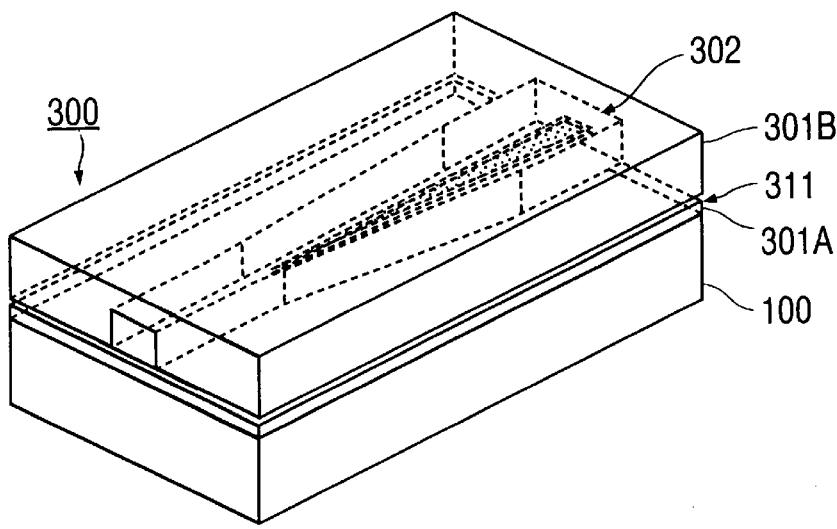
FIG. 56B is a schematic perspective view of a single core waveguide, in accordance with a fortieth preferred embodiment of the present invention.
Figure 56C:
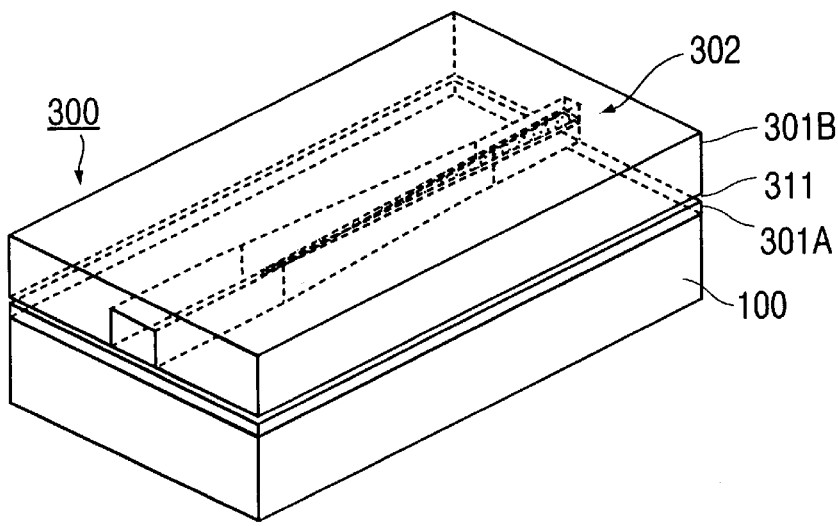
FIG. 56C is a schematic perspective view of a single core waveguide, in accordance with a forty first preferred embodiment of the present invention.

FIGS. 55A, 55B, 56A, 56B and 56C are schematic perspective views of single core waveguides 300 for illustrating thirty-seventh, thirty-eighth, thirty-ninth, fortieth and forty-first preferred embodiments of the present invention respectively. In FIG. 55A, the same reference numerals as in FIG. 47B designate the same parts as in FIG. 47B; in FIG. 55B, the same reference numerals as in FIG. 46A designate the same parts as in FIG. 46A; in FIG. 56A, the same reference numerals as in FIG. 51A designate the same parts as in FIG. 51A; in FIG. 56B, the same reference numerals as in FIG. 41B designate the same parts as in FIG. 41B; and in FIG. 56C, the same reference numerals as in FIG. 50 designate the same parts as in FIG. 50. Each of the single core waveguides 300 in FIGS. 55A, 55B, 56A, 56B and 56C is composed of an under cladding layer 301A made of polyimide, a silicon nitride layer 311 having a thickness less than 200 μm and formed on the under cladding layer 301A by a plasma CVD method, and the core 302 and an over cladding layer 301B formed on the silicon nitride layer 311.

The single core waveguide 300 in FIG. 55A is composed of the single core 302. The single core waveguides 300 in FIGS. 55B, 56A, 56B and 56C are each composed of the composite core 302 consisting of the main core 302A and sub core 302B, and the silicon nitride layer 311 formed between the cladding layer 301 and the core 302, corresponds to that of FIGS. 46A (the thirtieth embodiment), 51A (the thirty second embodiment), 51B (the thirty third embodiment) and 50 (the thirty first embodiment). In each of FIGS. 55A, 55B, 58A, 56B and 56C, a layer is formed on the silicon nitride 311 and patterned by RIE using oxygen gas, for forming the core 302 having a rectangular cross section. In this case, the silicon nitride layer 311 works as an etching stop layer, so that the above forming process can be advanced easily.

Figure 57:
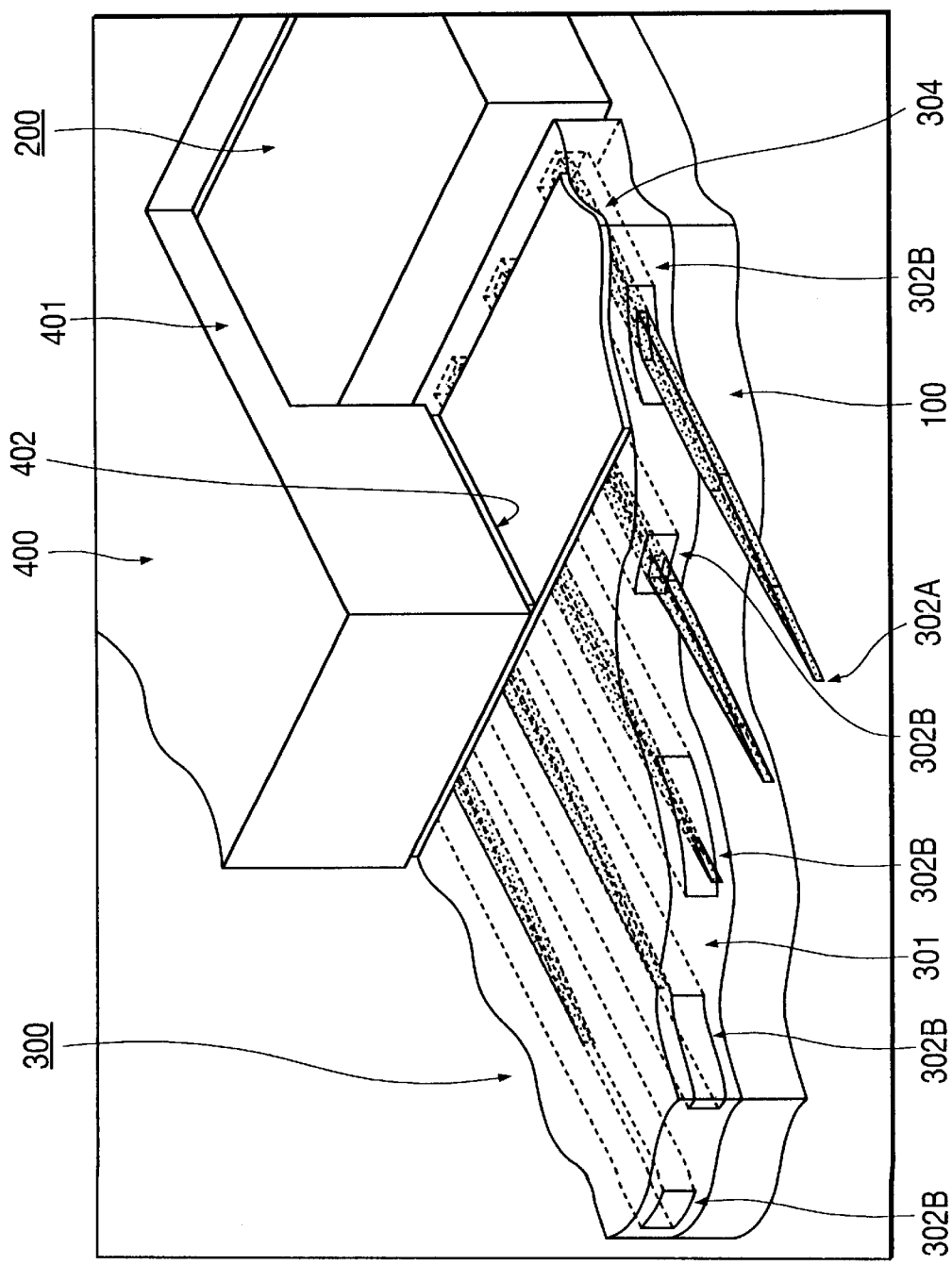
FIG. 57 is a partial schematic perspective view of an optical coupler including a plurality of cores each consisting of a tapered main core and a sub core, in accordance with a forty second preferred embodiment of the present invention.

FIG. 57 is a partial schematic and perspective view of an optical coupler in accordance with a forty-second preferred embodiment of the present invention. The optical coupler in FIG. 57 is obtained by modifying the optical coupler 1A in FIG. 17B (the third embodiment) so that each core 302 of FIG. 17B is changed to the (composite) core 302 of FIG. 46A (the thirtieth embodiment) consisting of the main core 302A and the sub core 302B. In FIG. 57, the same reference numerals as in FIGS. 17A and 17B and 46A designate the same parts as in FIGS. 17A and 17B and 46A. In FIG. 57, the main core 302A of each core 302 is formed under the metal frame 304 so that the end of the main core 302A is placed at the light input end so as to be coupled with the laser element of the semiconductor laser 200 and the main core 302A becomes narrow as the range increases from the light input end to the light output end. Concretely, the refractive indices of the cladding layer 301, the sub core 302B and the main core 302A are 1.55, 1.558 and 1.6 respectively, and the cross sectional size of the sub core 302B is 6 μm×6 μm, the thickness of the main core 302A is 1 μm at the light input end, the width of the main core 302A is 3 μm, and the thickness of each of the under cladding layer 301A and the over cladding layer 301B is 20 μm. By applying the composite core 302 the manner, light transmission loss due to the metal frame 304 can be reduced.

Figure 58:
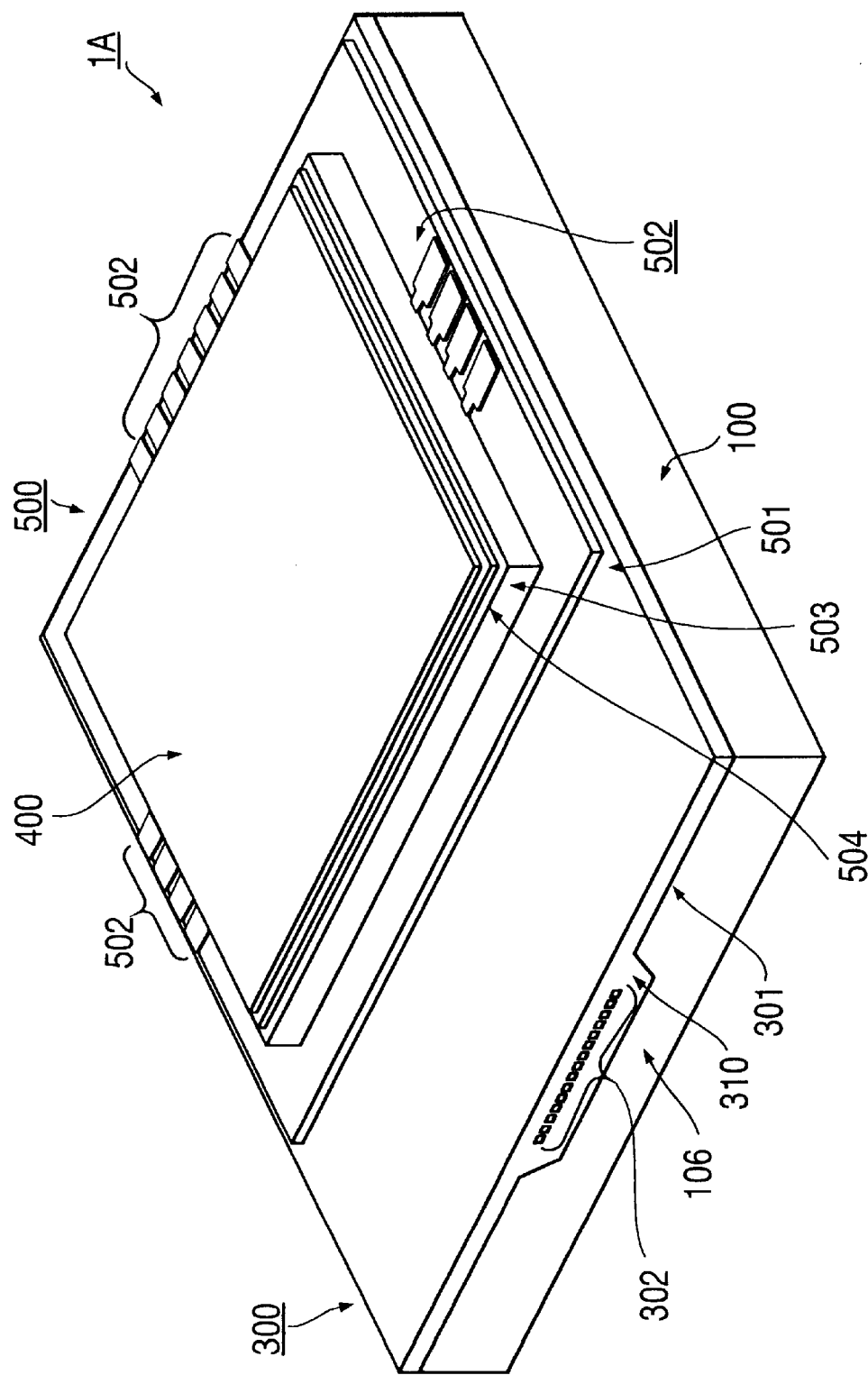
FIG. 58 is a schematic perspective view of an optical coupler, in accordance with a forty third preferred embodiment of the present invention.

FIG. 58 is a schematic and perspective view of an optical coupler in accordance with a forty-third preferred embodiment of the present invention. The optical coupler 1A in FIG. 58 is obtained by applying the buffer layer 310 in FIG. 44 to the optical coupler 1A in FIG. 17A or 18A, so that a separated wiring member 500 for the wiring pattern 502 is formed independently of the fabrication process of the optical coupler 1A. In FIG. 58, the same reference numerals as in FIGS. 17A (or 18A) and 44 designate the same parts as in FIGS. 17A (or 18A) and 44. In FIG. 58, the buffer layer 310 is formed in the depression 106 formed on the substrate 100, and the wiring pattern 502 is formed so that the wiring pattern 502 is inserted between frame shaped ceramic wafers 501 and 503. A frame shaped metal film 504 is formed on the frame shaped ceramic wafer 503, and the cover 400 is welded to the frame shaped metal film 504, for hermetically sealing the semiconductor laser 200, not depicted in FIG. 58, set in a hole 303 (see FIG. 59C).

Figure 59A:
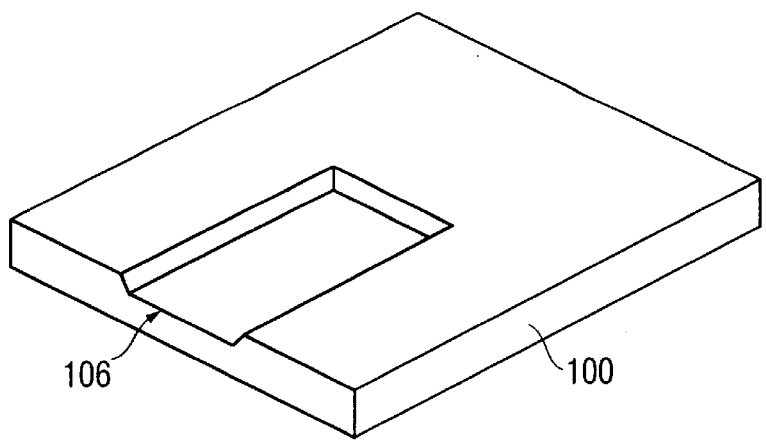
FIGS. 59A, 59B and 59C are schematic perspective views in accordance with a forming process of the optical coupler shown in FIG. 58.
Figure 59B:
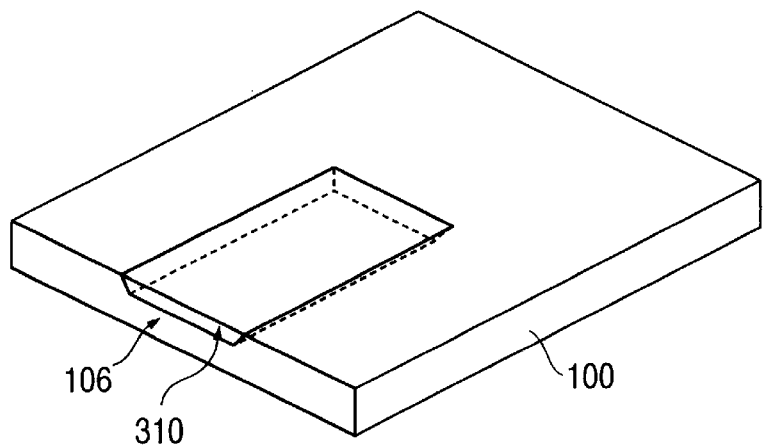
Figure 59C:
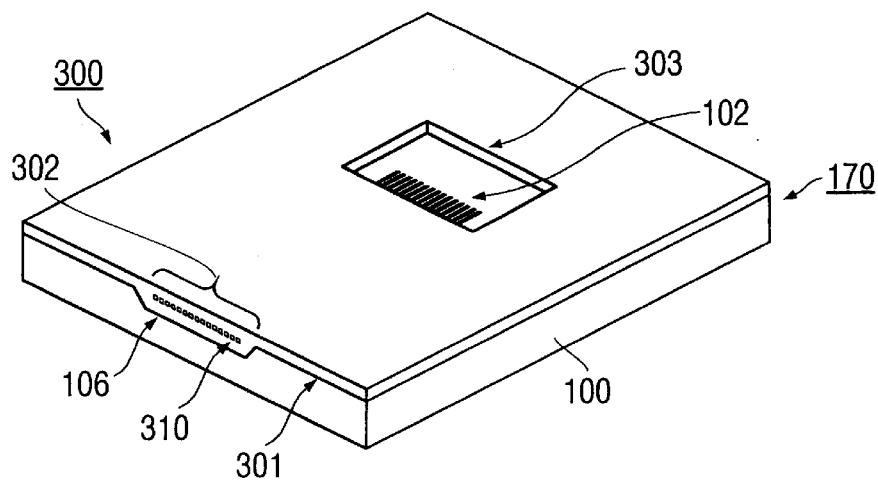

FIGS. 59A, 59B, 59C, 60A, 60B and 60C show a forming process of the optical coupler 1A in FIG. 58. The optical coupler 1A is fabricated as follows. The depression 106 is formed in the substrate 100 by anisotropic etching as shown in FIG. 59A. The substrate 100 is a silicon wafer having {100}-surface. The depression 106 is filled with material such as quartz or polyimide resin and the filled material is ground so that the surface of the filled material is even with the upper surface of the substrate 100 as shown in FIG. 59B. Herein, "material is even with the upper surface of the substrate 100" means that material is filled in the depression 106 and the level of the surface of the filled material is the same as the level of the upper surface of the substrate 100 and the surface of the filled material is formed to a flat smooth surface. Then, as shown in FIG. 59C, the optical waveguide 300, comprising the cladding layer 301 and the cores 302, is formed on the substrate 100 and the filled material so that the cores 302 are positioned above the filled material in the depression 106 and the hole 303 is formed in the optical waveguide 300 so that an edge of the hole 303 coincides with an inner edge of the depression 106. In the hole 303, the upper surface of the substrate 100, the wiring pattern (not depicted in FIG. 59C) and the bonding pads 102 for bonding the semiconductor laser 200 are exposed.

When organic material is used for the optical waveguide 300, the wiring pattern 102A and the bonding pads 102 are formed on the upper surface of the substrate 100 and then material for the optical waveguide 300 is coated on the wiring pattern 102A and the bonding pads 102, and then the waveguide 300 and the hole 302 are formed from the coated material. When material, such as quartz, requiring high temperature treatment is used for the optical waveguide, the wiring pattern 102A and the bonding pads 102 are formed on the upper surface of the substrate 100 in the hole 303 after forming the hole 302 In the optical waveguide 300.

Figure 60A:
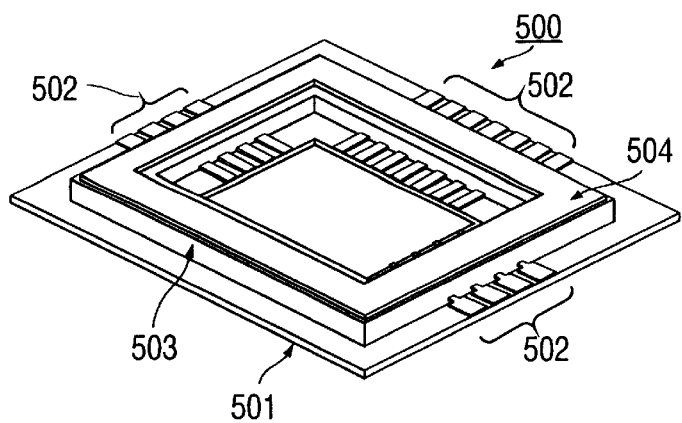
FIGS. 60A, 60B and 60C are schematic perspective views in accordance with a forming process of an air-tightened (i.e., hermetically sealed) semiconductor laser in the optical coupler shown in FIG. 58.

FIG. 60A shows the separated wiring member 500 with the wiring pattern 502. The wiring member 500 is fabricated by forming the wiring pattern 502 on a ceramic substrate 501, putting a ceramic wafer 503 on the wiring pattern 502, and forming the frame shaped metal film 504 on the ceramic wafer 503.

Figure 60B:
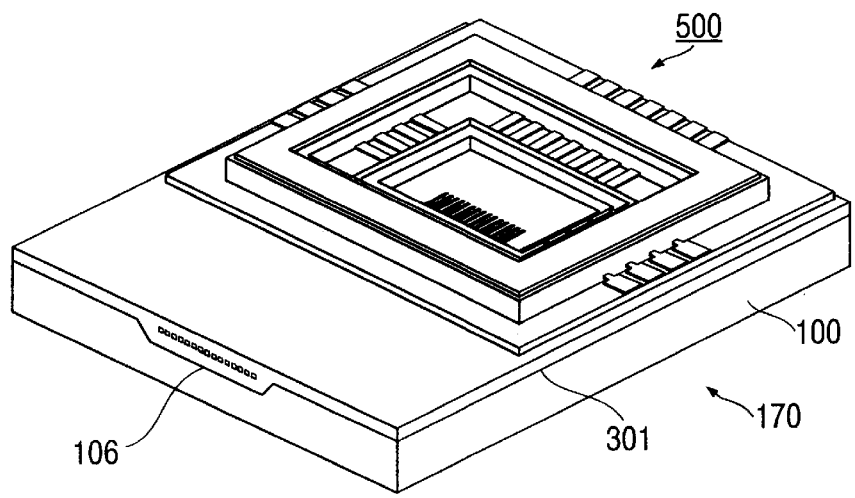
Figure 60C:
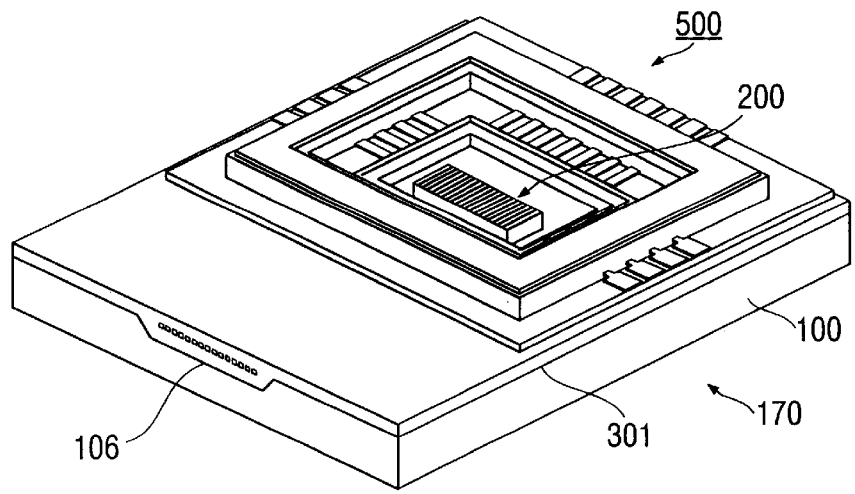

Then, as shown in FIG. 60B, the wiring member 500 in FIG. 60A is affixed to the optical waveguide 300 formed on the substrate 100, and the arrayed semiconductor laser 200 is bonded as shown in FIG. 60C, and the metal cover 400 is welded to the metal film 504. Then, the semiconductor laser 200 is hermetically sealed as shown in FIG. 58.

Sticking the separated wiring member 500 thus, the semiconductor laser 200 can be hermetically sealed, so that the wiring process to form member 500 can be performed with no influence on the waveguide forming process. For example, in case of FIG. 17A or 18A, the material and the forming process of the wiring pattern 103 must be selected respectively in consideration of the forming process of the optical waveguide. However, in the above embodiments shown in FIGS. 58, 59A, 59B, 59C, 60A, 60B and 60C, since the separated wiring member is fabricated independently, the wiring process can be performed with no influence on the waveguide forming process. As a result, a fabrication process for, for example, a well known integrated circuit package can be applied to the fabrication of the separated wiring member 500 in FIG. 58.

What is claimed is:

1. An optical coupling structure comprising:
   a first optical component comprising a plurality of first optical elements arranged in a direction with a first distance therebetween, each of said first optical components having a surface for emitting or receiving an optical beam; and
   a second optical component optically coupled with said first optical component and comprising a plurality of second optical elements arranged in a direction parallel to the direction in which said first optical elements are arranged, with a second distance therebetween, each of said second optical elements having a surface for receiving or emitting an optical beam from, or to a corresponding one of said first optical elements, wherein there is a difference between the first distance and the second distance.

2. An optical coupling structure according to claim 1, wherein the difference between the first distance and the second distance is less than double the tolerance afforded said first and second optical components, as optically coupled each other, when said first and second optical components respectively comprise a single said first optical element and a single said second optical element.

3. An optical coupling structure according to claim 2, further comprising a substrate having an upper surface on which said first optical component and said second optical component are mounted.

4. An optical coupling structure according to claim 3, wherein said first optical component is an optical waveguide comprising a plurality of cores, each having a first refractive index and surrounded by a cladding layer having a second refractive index lower than the first refractive index, said cores comprising said first optical elements.

5. An optical coupling structure according to claim 4, wherein said substrate has a depression formed in the upper surface thereof, and said cores are disposed in an area above said depression.

6. An optical coupling structure according to claim 5, further comprising a buffer layer filling said depression and having a refractive index equal to or less than the refractive index of the cladding layer.

7. An optical coupling structure according to claim 6, wherein the buffer layer has an upper surface which is even with said upper surface of said substrate.

8. An optical coupling structure according to claim 7, wherein the optical waveguide is formed on the buffer layer.

9. An optical coupling structure according to claim 8, wherein the buffer layer is made of inorganic material and the cladding layer and the cores are made of organic material.

10. An optical coupling structure according to claim 6, wherein the buffer layer at least filling up the depression is made of organic material.

11. An optical coupling structure according to claim 5, wherein said depression is filled up with a part of the cladding layer.

12. An optical coupling structure according to claim 11, wherein the cladding layer at least filling up the depression is made of organic material.

13. An optical coupling structure according to claim 4, wherein each of said cores comprises:
- a sub-core having a refractive index higher than the refractive index of the cladding layer; and
- a main core having a refractive index higher than the refractive index of said sub-core, said main core being surrounded by said sub-core, a portion of said main core having a cross section perpendicular to an optical axis passing through said main core, the area size of the cross section of said main core changing gradually along said optical axis.

14. An optical coupling structure according to claim 13, wherein a part of each said sub-core has a cross section perpendicular to an optical axis passing through said main core, and the area size of the cross section changes gradually along the optical axis.

15. An optical coupling structure according to claim 13, wherein a part of each said sub-core has a rectangular shape in a cross section thereof perpendicular to an optical axis passing through said main core, and the shape of the cross section of the sub-core changes gradually along the optical axis.

16. An optical coupling structure according to claim 13, wherein each of said cores comprise a bent portion, and said main core has a uniform cross section perpendicular to an optical axis of said main core at any place in the bent portion.

17. An optical coupling structure according to claim 13, wherein at least one of the cladding layer, the sub-core and the main core is made of an organic material.

18. An optical coupling structure according to claim 13, wherein the main core is made of an inorganic material and the sub-core is made of an organic material.

19. An optical coupling structure according to claim 17, further comprising a thin film made of an inorganic material sandwiched between layers made of organic materials.

20. An optical coupling structure according to claim 4 further comprising:
- a bonding pad on which said second optical component is bonded;
- a hole formed in said optical waveguide, said hole being formed so that an opening of said hole is disposed above the bonding pad, and said hole being formed so that material used for forming said optical waveguide surrounds the second optical component bonded on the bonding pad; and
- a cover enclosing and sealing said hole so as to enclose the second optical component.

21. An optical coupling structure according to claim 20 further comprising a wiring member placed between said optical waveguide and the cover, said wiring member being a frame shaped member and having an inside-hole surrounded by the frame shaped member made of insulation material, and having a wiring pattern formed so as to penetrate the frame shaped member from inside to outside of the frame shaped member, said wiring member being fixed to a margin of the hole in said optical waveguide, and the wiring pattern is electrically connected with the second optical element.

22. An optical coupling structure according to claim 21 further comprising a frame shaped metal member fixed to the margin of the hole, for air-tightening the second optical element set in the hole, by fixing the frame shaped wiring member through said frame shaped metal member.

23. An optical coupling structure according to claim 22, wherein said optical waveguide has the composite core consisting of the main core and the sub core having a refractive index lower than a refractive index of the main core, surrounded by the cladding layer having a refractive index lower than the refractive index of the sub core.

24. An optical coupling structure according to claim 23, wherein the composite core is disposed at least under the frame shaped metal member.

25. An optical coupling structure according to claim 20 further comprising a wiring pattern formed between said substrate and a layer of said material used for forming said optical waveguide so as to penetrate said material used to form said optical waveguide, from inside to outside of said hole.

26. An optical coupling structure according to claim 4, further comprising a buffer layer formed on said upper surface of said substrate, said buffer layer having a refractive index equal to or less than the refractive index of the cladding layer.

27. An optical coupling structure according to claim 26, wherein the optical waveguide is formed on said buffer layer.

28. An optical coupling structure according to claim 27, wherein the cladding layer comprises an under-cladding layer made of an organic material and formed under the cores and an upper-cladding layer made of an organic material and formed on the cores and said under-cladding layer.

29. An optical coupling structure according to claim 28, further comprising a thin inorganic layer inserted between the under-cladding layer and the cores or between the under cladding layer and the upper-cladding layer.

30. An optical coupling structure according to claim 27, wherein said second optical component is formed on said buffer layer.

31. An optical coupling structure according to claim 4, wherein said optical waveguide has at least two ends, each end coupling to an optical component, and a function to change an optical beam width of a guided mode of said optical waveguide while an optical beam travels from one of the ends to the other of the ends of said optical waveguide.

32. An optical coupling structure according to claim 31, wherein said core comprises:
- an optical axis passing through said core from the one end to the other end of said optical waveguide; and
- a portion where an area size of a cross section of said core changes gradually along said optical axis.

33. An optical coupling structure according to claim 32, wherein said optical waveguide comprises a bent portion for bending the guided light beam guided by said optical waveguide, and said optical waveguide includes the core having relatively a large area size and a uniform cross section at least at said bent portion.

34. An optical coupling structure according to claim 4, wherein each of said cores comprises:
- a sub-core having a portion split into two parts and having a refractive index higher than the refractive index of the cladding layer; and
- a main core having a refractive index higher than the refractive index of said sub-core, a first portion of said main core being sandwiched between the two, split parts of said sub-core, a second portion of said main core being surrounded by said sub-core, a cross section of said main core, perpendicular to an optical axis passing through said main core and having an area size which changes gradually along said optical axis at a portion of said main core which is surrounded by said sub-core.

35. An optical coupling structure according to claim 4, wherein said substrate is made of material having a refractive index lower than the refractive index of the cladding layer and being transparent to light transmitted through said optical waveguide.

36. An optical coupling structure, comprising: an optical waveguide having a core with a refractive index; a cladding layer having a refractive index lower than the refractive index of said core and surrounding said core; and at least two ends, each end coupled with an optical component, said optical waveguide having a function to change an optical beam width of a guided mode of said optical waveguide while an optical beam travels from one of the ends to the other of the ends of said optical waveguide.

37. An optical coupling structure according to claim 36, wherein said core comprises:
an optical axis passing through said core from the one end to another end of said optical waveguide;
a sub-core having a refractive index higher than the refractive index of the cladding layer; and
a main core having a refractive index higher than the refractive index of said sub-core and surrounded by said sub-core, said main core having a portion where the area size of the cross section changes gradually along said optical axis.

38. An optical coupling structure according to claim 37, wherein a part of said sub-core has a cross section and the area size of the cross section or the shape of the cross section changes gradually along the optical axis.

39. An optical coupling structure according to claim 37, wherein said waveguide comprises a bent portion for bending a light beam traveling through the sub-core and the main core, and said main core has an uniform cross section at least at said bent portion.

40. An optical coupling structure according to claim 37, wherein at least one of the cladding layer, the sub-core and the main core is made of an organic material.

41. An optical coupling structure according to claim 37, wherein the main core is made of an inorganic material and the sub-core is made of an organic material.

42. An optical coupling structure according to claim 40, further comprising a thin film made of an inorganic material, the thin film being inserted between the cladding layer and the sub-core.

43. An optical coupling structure according to claim 36, wherein said core comprises:
an optical axis passing through said core from one of the ends to another of the ends of said waveguide; and
a portion where the area size of the cross section of said core changes gradually along said optical axis.

44. An optical coupling structure according to claim 43, wherein said core comprises a bent portion, said core in the bent portion having a uniform cross section perpendicular to an optical axis of said core at any place in the bent portion.

45. An optical coupling structure according to claim 36, wherein said core comprises:
an optical axis passing through said core from the one end to the other end of said optical waveguide;
a sub-core branched into two parts and having a refractive index higher than the refractive index of the cladding layer; and
a main core having a refractive index higher than the refractive index of said sub-core, said main core having a portion sandwiched between the branched two parts of said sub-core and a portion where said main core is surrounded by said sub-core, said main core and said sub core having respective cross sections perpendicular to said optical axis, and the area size of the cross section of said main core changes gradually along said optical axis at the portion where said main core is surrounded by said sub-core.

46. An optical coupling structure according to claim 36 further comprising a substrate for forming said optical waveguide thereon.

* * * * *